United States Patent
Masuda

(10) Patent No.: US 8,279,578 B2
(45) Date of Patent: Oct. 2, 2012

(54) HELICAL CAPACITOR AND MANUFACTURING METHOD THEREOF

(75) Inventor: Koichiro Masuda, Minato-ku (JP)

(73) Assignee: NEC Corporation, Tokyo (JP)

( * ) Notice: Subject to any disclaimer, the term of this patent is extended or adjusted under 35 U.S.C. 154(b) by 576 days.

(21) Appl. No.: 12/445,716

(22) PCT Filed: Oct. 16, 2007

(86) PCT No.: PCT/JP2007/070141
§ 371 (c)(1),
(2), (4) Date: Apr. 15, 2009

(87) PCT Pub. No.: WO2008/047777
PCT Pub. Date: Apr. 24, 2008

(65) Prior Publication Data
US 2010/0315759 A1    Dec. 16, 2010

(30) Foreign Application Priority Data

Oct. 16, 2006 (JP) .................. 2006-280922
Mar. 27, 2007 (JP) .................. 2007-081807

(51) Int. Cl.
*H01G 4/06* (2006.01)

(52) U.S. Cl. ............ 361/313; 361/311; 361/321.2; 361/301.5; 361/310

(58) Field of Classification Search ........ 361/311, 361/310, 313, 321.2, 329, 297, 516
See application file for complete search history.

(56) References Cited

U.S. PATENT DOCUMENTS

| | | | |
|---|---|---|---|
| 5,458,989 A * | 10/1995 | Dodge | 429/492 |
| 6,407,720 B1 | 6/2002 | Josypenko | |
| 6,873,518 B2 * | 3/2005 | Masuda et al. | 361/525 |
| 2003/0053286 A1 | 3/2003 | Masuda et al. | |
| 2004/0105218 A1 | 6/2004 | Masuda et al. | |
| 2006/0087795 A1 | 4/2006 | Nagasawa et al. | |

FOREIGN PATENT DOCUMENTS

| | | |
|---|---|---|
| JP | 58-075301 A | 5/1983 |
| JP | 04-108208 A | 4/1992 |

(Continued)

OTHER PUBLICATIONS

Chinese Office Action dated Jul. 3, 2012 issued by the Intellectual Property Office of P.R. China in counterpart Chinese Patent Application No. 201110204591.0.

*Primary Examiner* — Jayprakash N Gandhi
*Assistant Examiner* — Hung Dang
(74) *Attorney, Agent, or Firm* — Sughrue Mion, PLLC

(57) ABSTRACT

[Problem to be Solved] To provide a helical capacitor for controlling a high-frequency power which flows in power lines, and a manufacturing method of the helical capacitor.
[Solution] A helical capacitor is constituted by helically spiraling a belt shape capacitor line 1001 which includes an internal metal body to be a helically spiraled belt-shape internal electrical conductor, a dielectric film covering the internal electrical conductor, and an electrically conductive layer covering the dielectric film. The capacitor line of belt shape 1001 can be wrapped around the internal support body 1200. Internal metal body lead terminals 1311, 1321 are respectively formed at both ends of the internal metal body, and electrically conductive layer lead terminals 1312, 1322 can be respectively formed at both ends of the electrically conductive layer.

32 Claims, 43 Drawing Sheets

FOREIGN PATENT DOCUMENTS

| | | |
|---|---|---|
| JP | 2001-023861 A | 1/2001 |
| JP | 2002-335107 A | 11/2002 |
| JP | 2002-359169 A | 12/2002 |
| JP | 2003-101311 A | 4/2003 |
| JP | 2003-124066 A | 4/2003 |
| JP | 2003-520425 A | 7/2003 |
| JP | 2005-033813 A | 2/2005 |
| JP | 2005-348013 A | 12/2005 |
| JP | 2006-128247 A | 5/2006 |
| WO | 01/52287 A1 | 7/2001 |

* cited by examiner

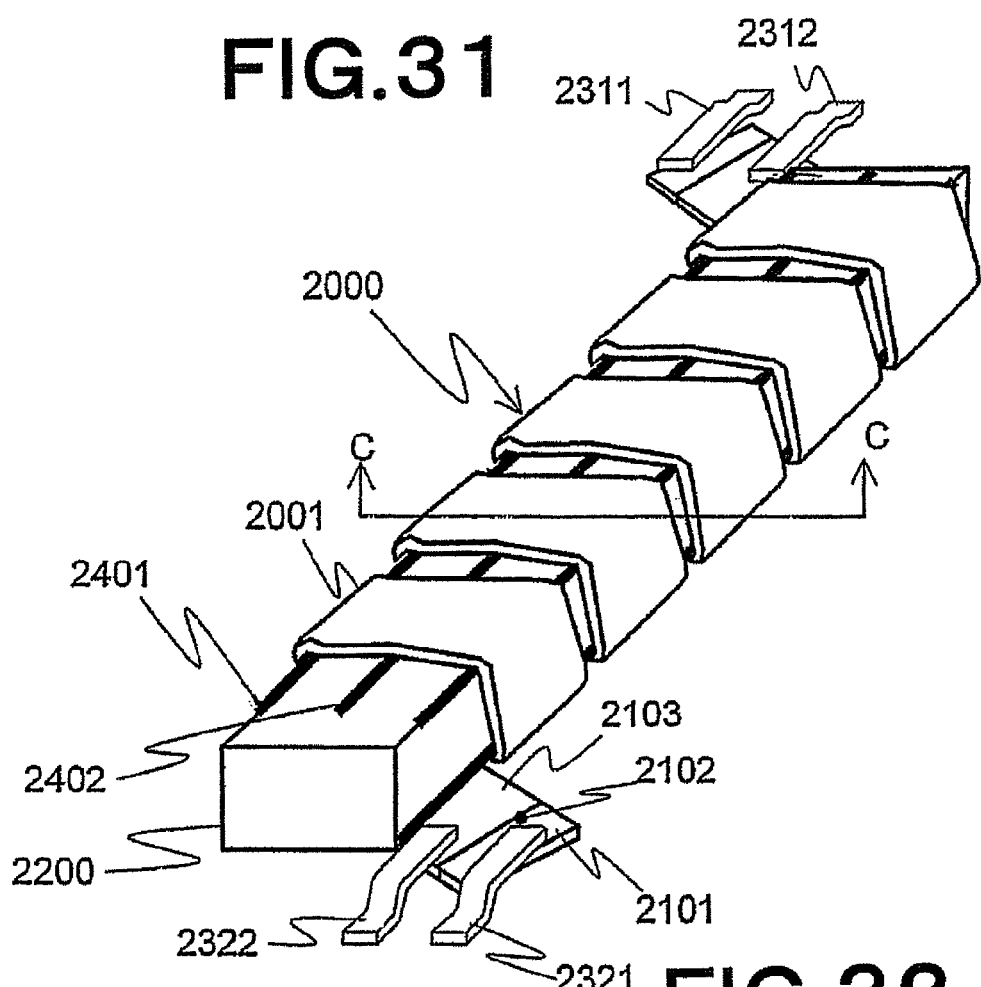
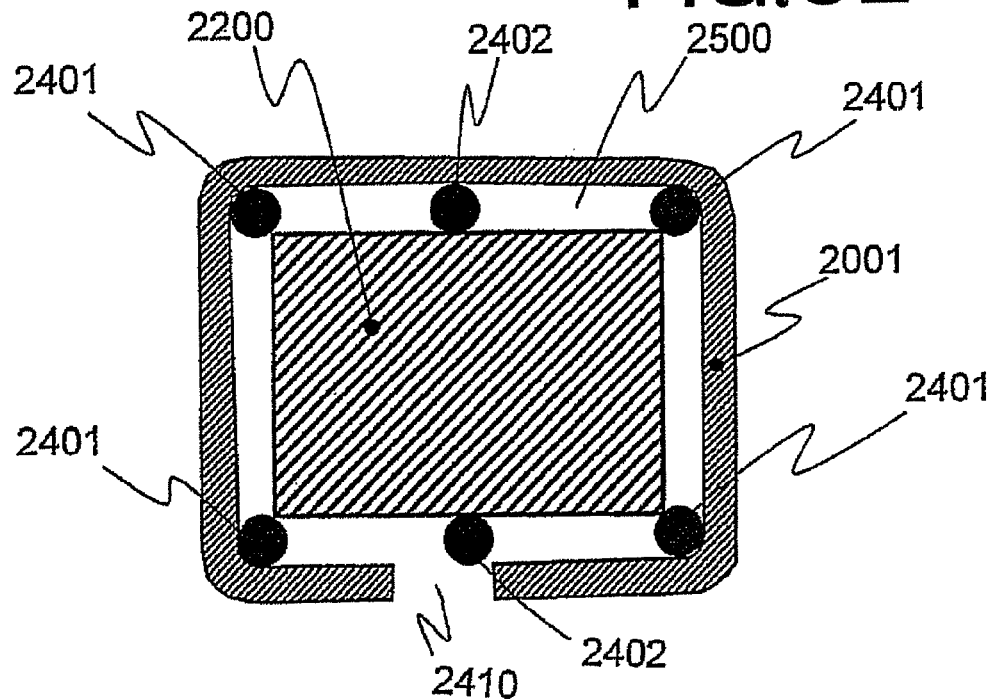

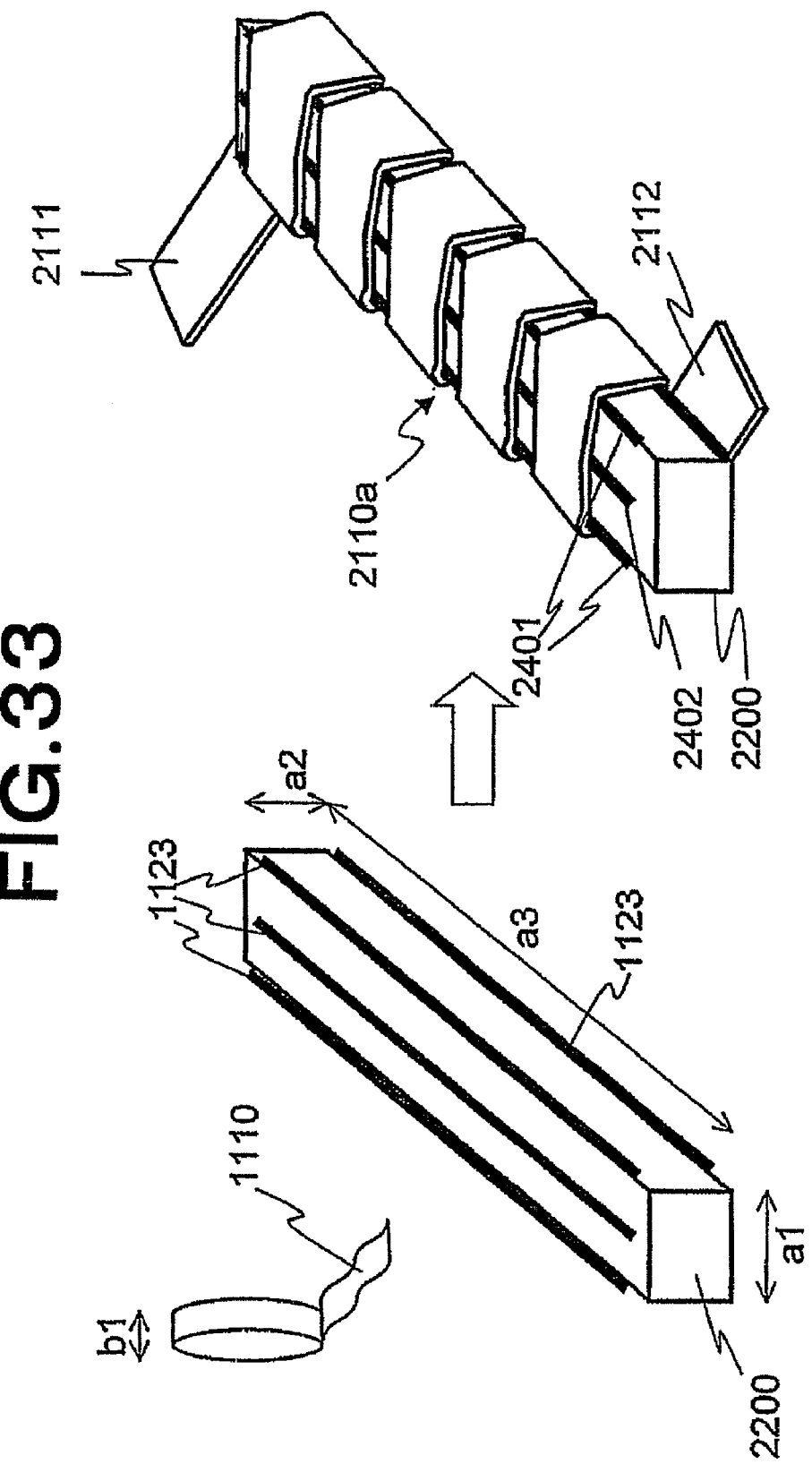

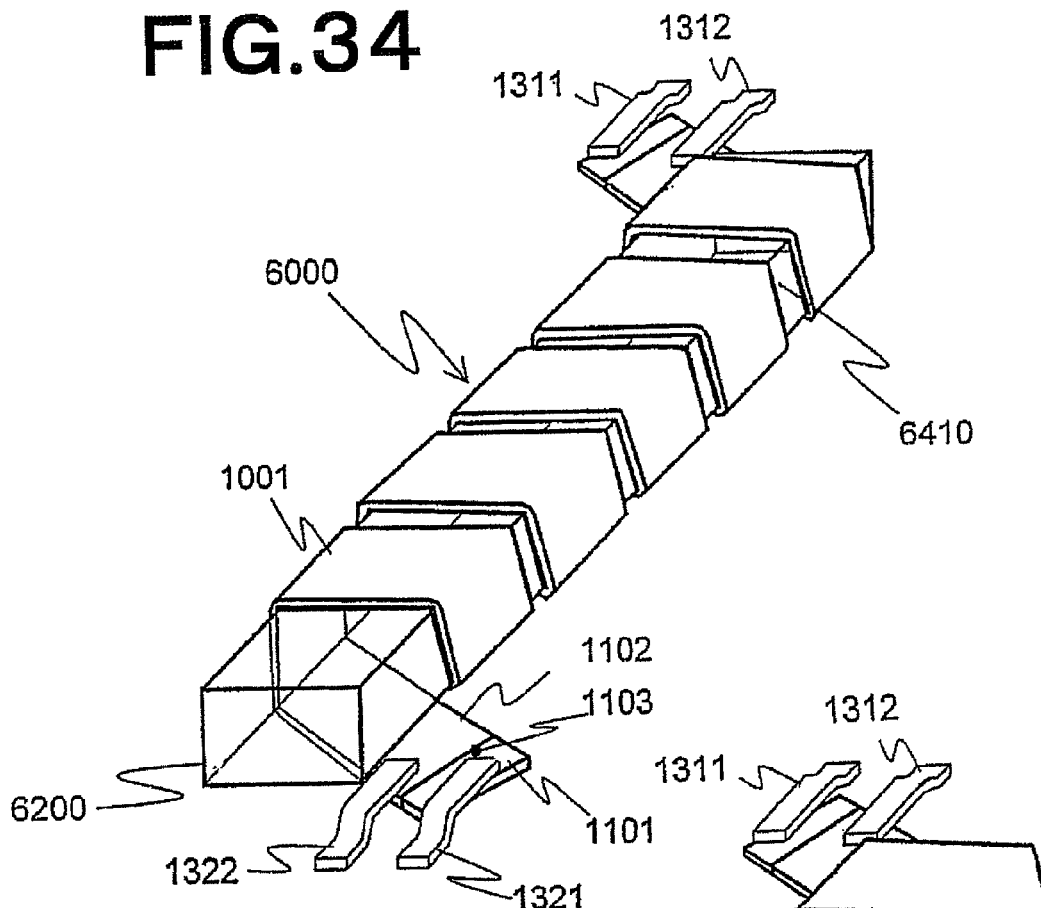
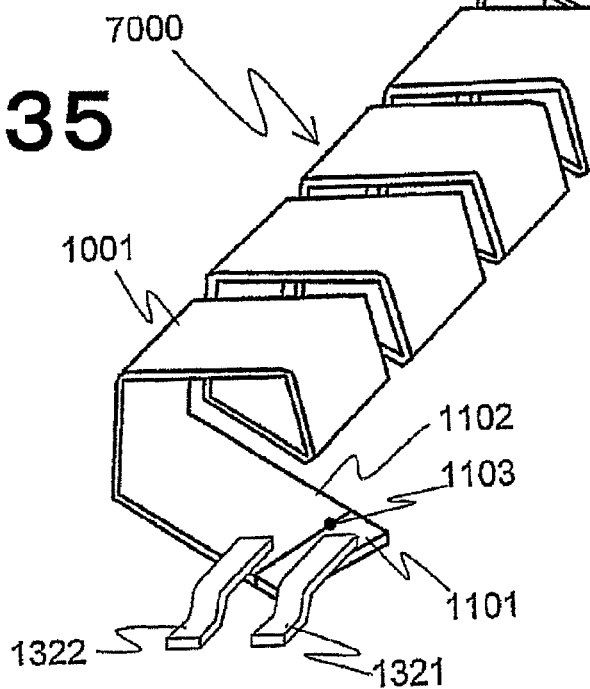

US 8,279,578 B2

HELICAL CAPACITOR AND MANUFACTURING METHOD THEREOF

TECHNICAL FIELD

The present invention relates to a helical capacitor (spiral capacitor) and a manufacturing method thereof, and more specifically, relates to a helical capacitor having a capacitor line of belt shape and a manufacturing method thereof.

This application claims the benefit of priority based on Japanese Patent Application No. 2006-280922 filed on Oct. 16, 2006 and Japanese Patent Application No. 2007-081807 filed on Mar. 27, 2007. The contents of Japanese Patent Application No. 2006-280922 and Japanese Patent Application No. 2007-081807 are included in the contents the description of this application.

BACKGROUND ART

In recent years, as performances and functions of a digital information apparatus such as personal computer and a mobile information terminal such as mobile phone are enhanced, their circuits are extremely speeded up.

When a clock is speeded up to more than 100 MHz, it becomes difficult to sufficiently control noise (high-frequency electromagnetic noise or high-frequency electric vibration) leaking out from LSI to power supply lines on a printed circuit board by using only a laminated ceramic capacitor or a three-terminal capacitor, so that a possibility of malfunction and poor reception due to increasing noise increases.

As a capacitor which can solve the above problem, the applicant of the present invention has already proposed a strip-line capacitor (for example, refer to Patent Document 1, Patent Document 2, and Patent Document 3).

FIG. 51 is a cross-sectional view of a strip-line capacitor disclosed in Patent Document 1, and FIG. 52 is a cross-sectional view taken along the line A-A of FIG. 51.

As shown in FIGS. 51 and 52, a dielectric film 20 made of an oxide is formed on a surface of a metal plate 10 made of aluminum.

An electrically conductive polymer layer 31, an electrically conductive carbon paste layer 32, and a silver paste layer 33 are formed on the dielectric film 20.

An electrically conductive material layer 30 is formed by the electrically conductive polymer layer 31, the electrically conductive carbon paste layer 32, and the silver paste layer 33.

Positive electrode lead terminals 11 and 12 are connected to both longitudinal ends of the metal plate 10. A metal plate 40 made of a copper foil is arranged on one side surface of the electrically conductive material layer 30, and both longitudinal ends of the metal plate 40 are negative electrode lead terminals 41 and 42.

In addition, a filter constituting a transmission line type component in a coaxial structure is disclosed in Patent Document 4.

FIG. 53 is a diagram showing a component disclosed in Patent Document 4, FIG. 53A is a perspective view of the transmission line type component 1, FIG. 53B is a cross-sectional view in a longitudinal direction of the transmission line type component 1, and FIG. 53C is a cross-sectional view taken along the line E-E of FIG. 53B. As shown in FIGS. 53A to 53C, a coaxial line is constituted by arranging a high-dielectric insulating material 4 covering a signal conductor 2 which is a cylindrical internal conductor elongated in an axial direction, and a ground conductor 3 which is a cylindrical external conductor covering the high-dielectric insulating material 4. In order to easily mount this component on a printed circuit board, the signal conductor 2 of the internal conductor is pulled out to the outside of the high-dielectric insulating material 4.

In addition, a capacitor technology for realizing a nonpolar capacitor is disclosed in Patent Document 5.

FIG. 54 is a cross-sectional view of a technology disclosed in Patent Document 5.

An aluminum solid electrolytic capacitor 21 has solid electrolytic capacitor elements 22. Each of the solid electrolytic capacitor elements 22 includes an aluminum foil 23 which is a valve-acting metal on which an etching processing and a chemical conversion treatment for forming a dielectric film are performed. Each of the solid electrolytic capacitor elements 22 is formed by remaining an electrode lead part 25 in the aluminum foil 23, and impregnating an electrically conductive polymer 29 onto the aluminum foil 23 by being separated from the electrode lead part 25 by an insulating resin 27. A lead frame 31 is connected to the electrode lead part 25 of the solid electrolytic capacitor element 22.

By using two solid electrolytic capacitor elements 22, the two solid electrolytic capacitor elements 22 are arranged so that each electrode lead part 25 is placed in the opposite side to each other. The electrically conductive polymers 29 of the solid electrolytic capacitor elements 22 are joined to each other by using TCNQ complex (tetracyanoquinodimethane complex) 33.

Patent Document 1: Japanese Patent Application Laid-Open No. 2003-101311
Patent Document 2: Japanese Patent Application Laid-Open No. 2003-124066
Patent Document 3: Japanese Patent Application Laid-Open No. 2005-033813
Patent Document 4: Japanese Patent Application Laid-Open No. 2002-335107
Patent Document 5: Japanese Patent Application Laid-Open No. 2002-359169

DISCLOSURE OF THE INVENTION

Problems to be Solved by the Invention

Although the strip-line capacitor and transmission line type component which are disclosed in the above mentioned patent documents have a filter structure of three-terminal or four-terminal, a structure formed by a metal layer and a dielectric film has a single layer.

Although it is effective for a transmission type filter to elongate its length in a transmission axis direction, it is difficult to elongate the transmission length more than the element length by the technology shown in the above mentioned patent documents.

Furthermore, it is difficult to realize an element solving the problems and coping with multiple power sources, or a nonpolar element.

Therefore, an object of the present invention is to provide a helical capacitor for controlling a high-frequency power which flows in power lines, and a manufacturing method of the helical capacitor.

Means for Solving the Problems

A helical capacitor according to the present invention includes a helical belt-shape internal electrical conductor, a dielectric film covering the internal electrical conductor, and an electrically conductive layer covering the dielectric film.

A manufacturing method of the helical capacitor according to the present invention which includes a support body and a capacitor line of belt shape is including steps of preparing the support body;

helically wrapping an electrically conductive tape to be an internal electrical conductor around the support body;

forming a dielectric film on the electrically conductive tape;

forming an electrically conductive layer on the dielectric film; and forming an isolation wall for isolation for separating the electrically conductive layer from the internal electrical conductor.

Advantages of the Invention

According to the present invention, by using a capacitor line of belt shape and employing a three-dimensional helical structure, a path length along an axis in which electrical power transmits is elongated. Since a transmission attenuation of high-frequency power increases in proportion to an increase in a path length of the high-frequency power, the transmission attenuation can increase corresponding to an increase of the path length. As a result, compared with a linear line capacitor made of same material, the same amount of transmission attenuation can be obtained by a shorter element length. Furthermore, by helically bending the capacitor line, a propagation of high-frequency waves is inhibited, and a power transmission attenuation characteristic becomes better as the frequency increases.

BRIEF DESCRIPTION OF THE DRAWINGS

FIG. 31 is a perspective view showing a helical capacitor of a fifth embodiment of the present invention.

FIG. 32 is a cross-sectional view taken along the line C-C of FIG. 31.

FIG. 33 is a view for illustrating a manufacturing step of the helical capacitor of the fifth embodiment of the present invention.

FIG. 34 is a perspective view showing a helical capacitor of a sixth embodiment of the present invention.

FIG. 35 is a perspective view showing a helical capacitor of a seventh embodiment of the present invention.

DESCRIPTION OF SYMBOLS

1000, 2000, 3000, 4000, 5000, 6000, 7000 Helical capacitor
1001, 2001, 3001, 4001, 5001 Belt shape capacitor line
1020 Dielectric film
1030 Electrically conductive material layer
1031 Electrically conductive polymer layer
1032 carbon paste layer
1033 Silver paste layer
1101, 5101 Internal metal body exposure part
1102, 5102 Electrically conductive material layer exposure part
1103, 5103 Dike for isolation (Wall for isolation)
1104 Mask
1100 Internal metal body
1110 Aluminum tape
1110a, 1110b, 1110C, 1110d, 1110e, 1110f, 1110g, 1110h, 1110i, 1110j, 1110k Structure body
1111, 1112, 2111, 2112 Aluminum tape end part
1119 Unnecessary electrode part boundary line
1120 Dielectric film
1121 Thermosetting resin tape
1122 Mask resin
1130 Electrically conductive material layer
1200, 2200, 3200, 4200, 5200, 6200 Internal support body
1201 Aluminum quadratic prism
1202 Fluorine resin film
1300, 5300 End part
1311, 1321, 5331, 5341 Internal metal body lead terminal
1312, 1322, 5332, 5342 Electrically conductive material layer lead terminal
1321a, 1322a Lead terminal connection part
1321b, 1322b External circuit connection part
1410, 2410, 3410, 4410, 5410, 5411 Slit
1500 Mold
1501 Case
1801 Personal computer
1802 Motherboard
1803 CPU
1804 Substrate power supply
1911, 1912, 1913, 1914, 1915, 1916 Container
1920 Brush
1930 Dropper
1940 Chemical conversion bath
1941 Variable power source
1942 Positive electrode line
1943 Negative electrode line
1944 Negative electrode plate
1951 Chemical conversion solution
1952, 1955 Cleaning fluid
1953 Oxidant
1954 Monomer solution
1956 Carbon paste liquid
1957 Silver paste liquid
1958 Removing agent
1959 Potting liquid
2401, 2402, 5401.5402 Spacer
5111 Internal metal body exposure part
5112 Electrically conductive material layer exposure part
5113 Dike for isolation
5310, 5320, 5330, 5340 End part

BEST MODE FOR CARRYING OUT THE INVENTION

Hereinafter, a best mode for carrying out the present invention will be described with reference to the accompanying drawings.

Embodiments described below are representative examples.

A First Embodiment

[Description of Configuration]

Figure 1:
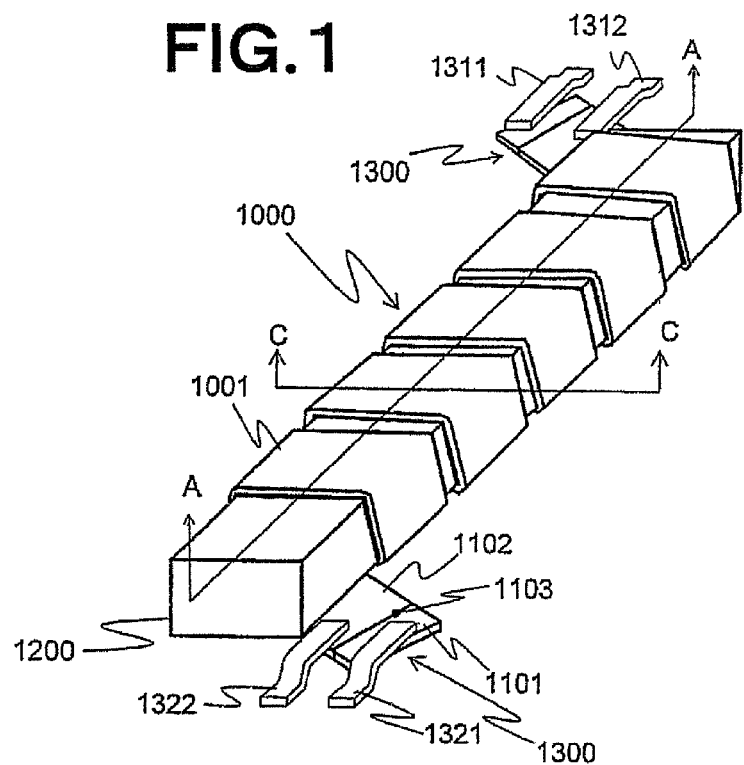
FIG. 1 is a perspective view showing a state in which a helical capacitor of a first embodiment of the present invention is wrapped around a support body.
Figure 2:
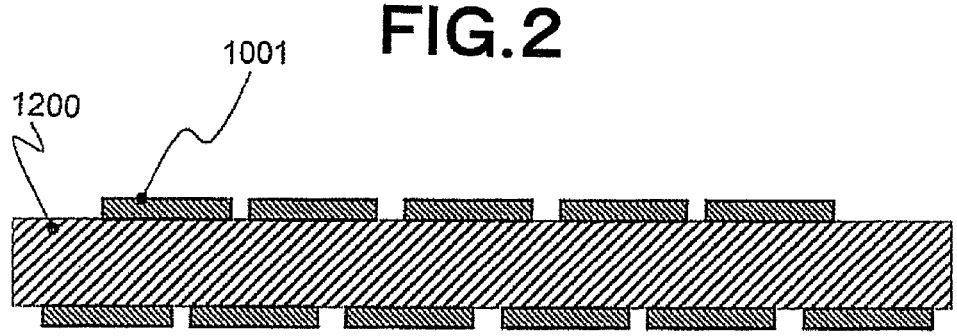
FIG. 2 is a cross-sectional view taken along the line A-A of FIG. 1.
Figure 3:
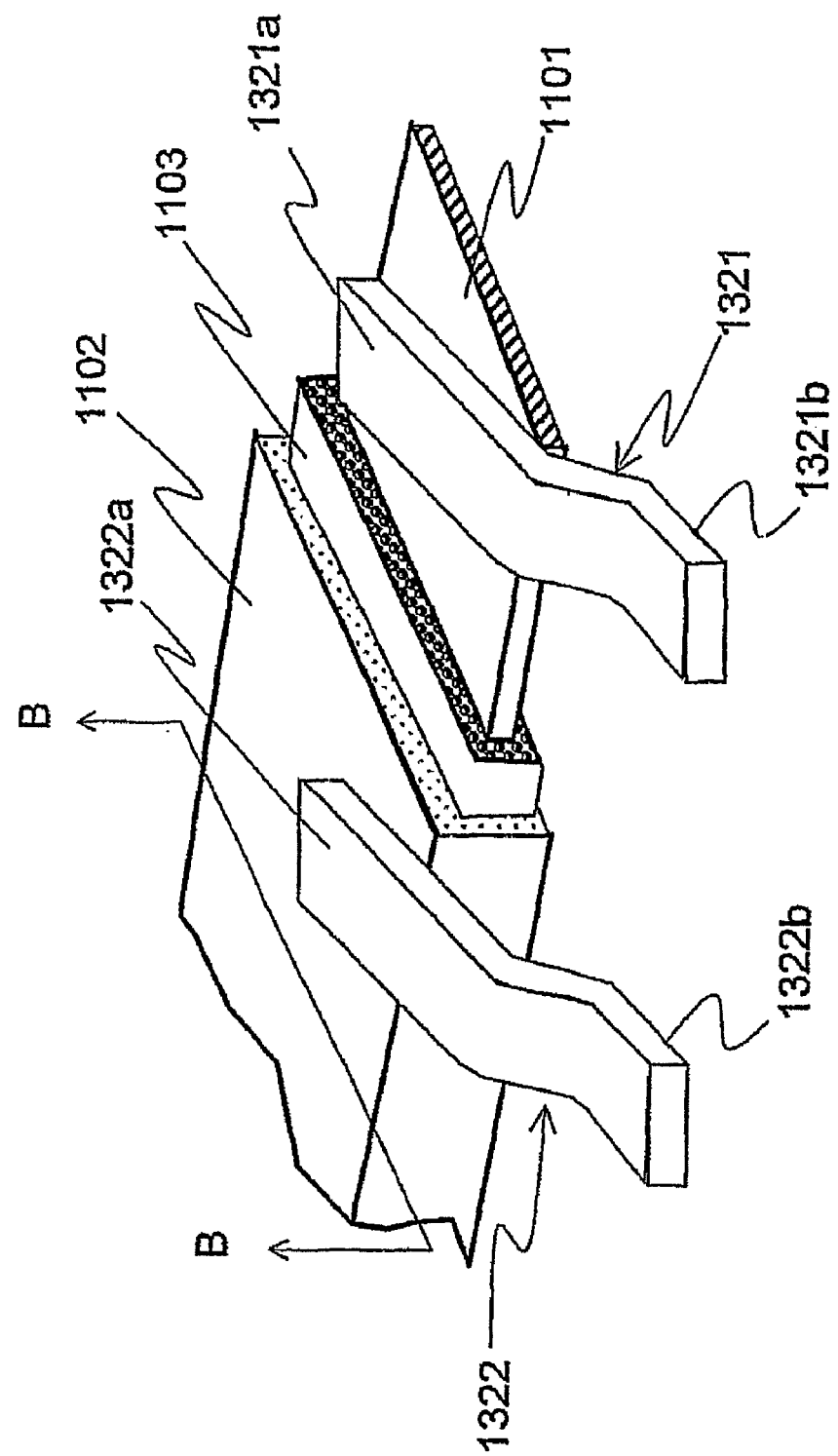
FIG. 3 is an enlarged perspective view of an end part 1300 in FIG. 1.
Figure 4:
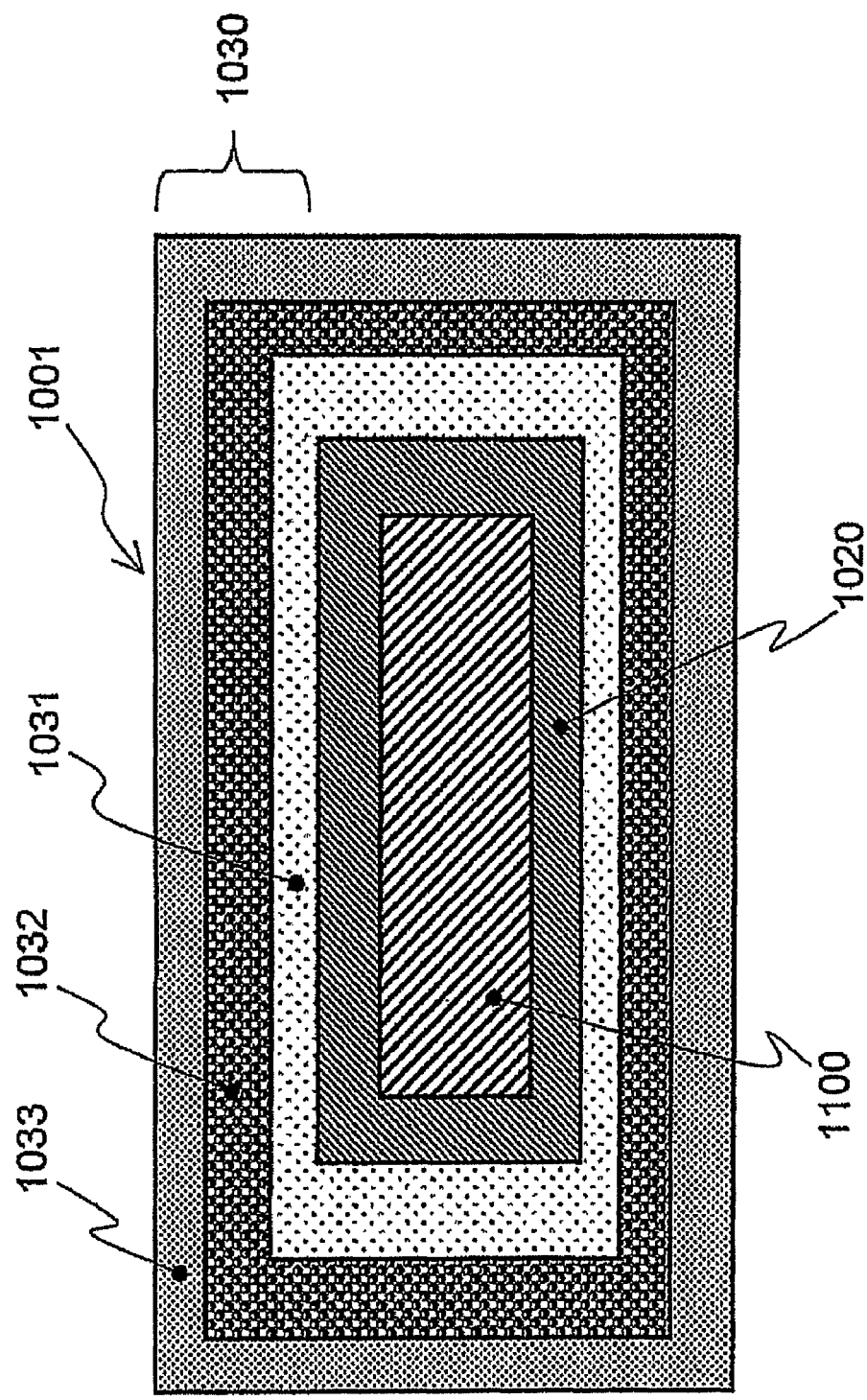
FIG. 4 is a cross-sectional view taken along the line B-B of FIG. 3.
Figure 5:
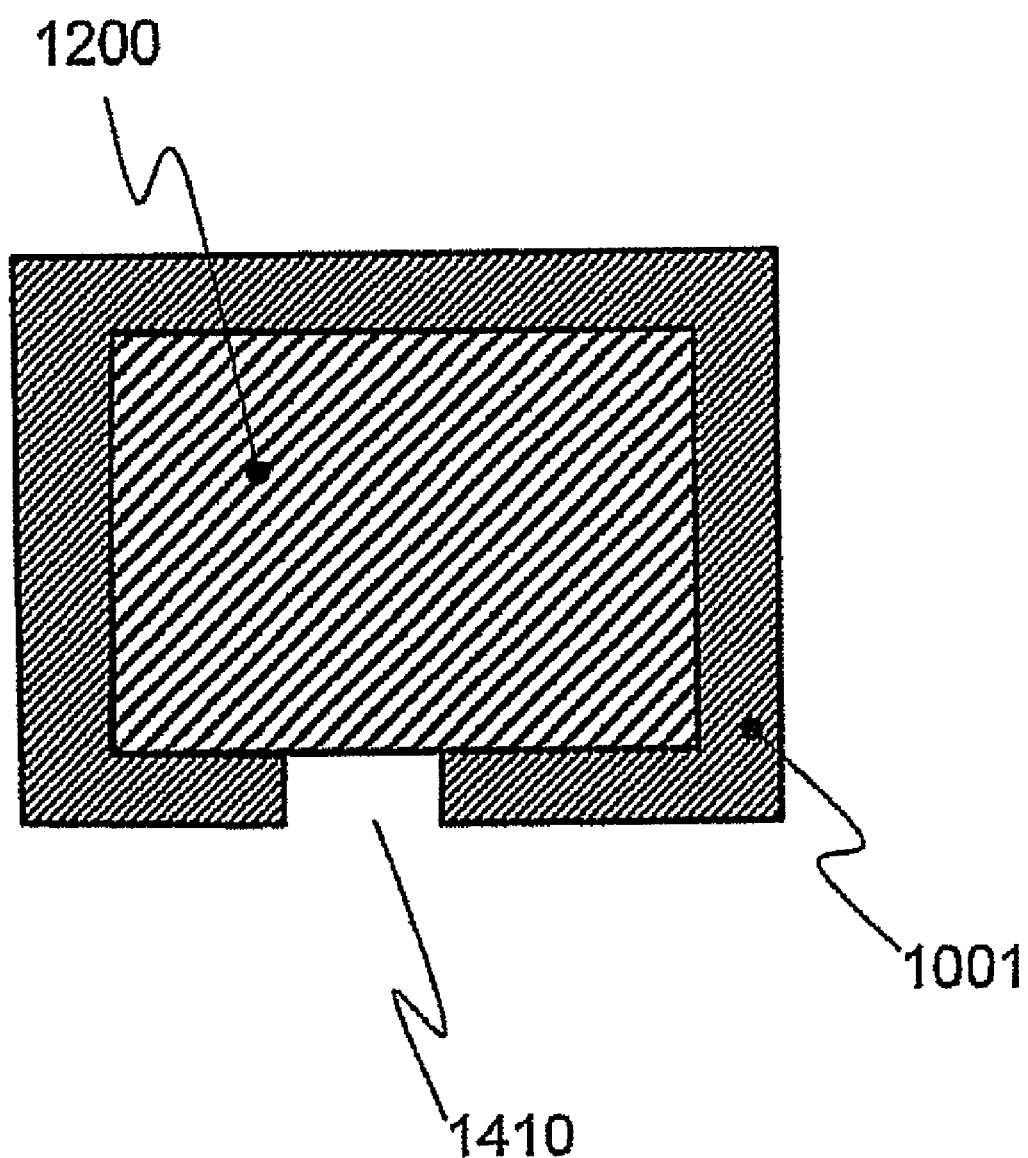
FIG. 5 is a cross-sectional view taken along the line C-C of FIG. 1.
Figure 6:
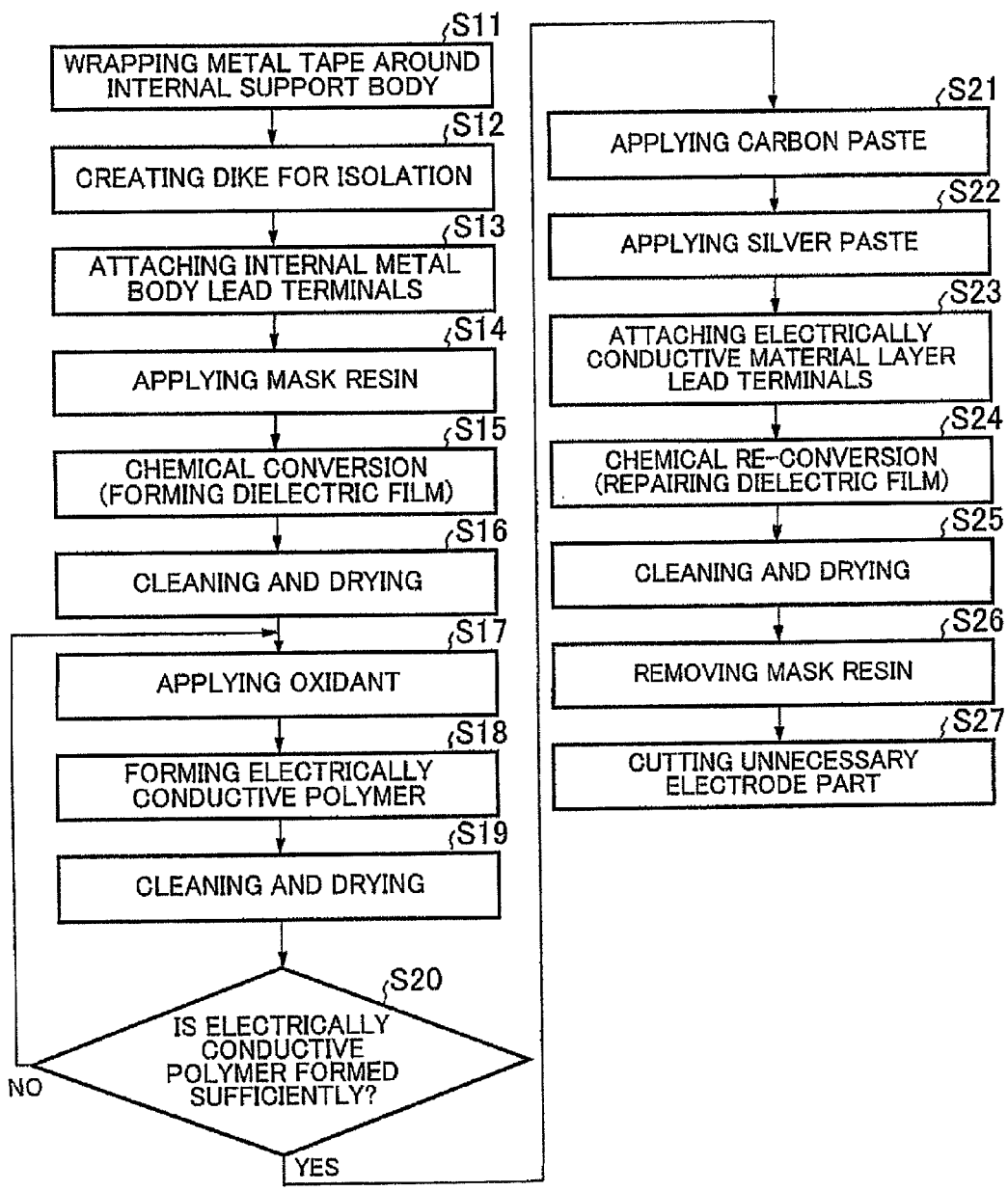
FIG. 6 is a flowchart showing a manufacturing step of the helical capacitor of the first embodiment of the present invention.

FIG. 1 is a perspective view showing a state in which a helical capacitor of a first embodiment of the present invention is wrapped around a support body. FIG. 2 is a cross-sectional view taken along the line A-A of FIG. 1. FIG. 3 is an enlarged perspective view of an end part 1300. FIG. 4 is a cross-sectional view taken along the line B-B of FIG. 3. FIG. 5 is a cross-sectional view taken along the line C-C of FIG. 1. FIG. 6 is a flowchart showing a manufacturing step of this embodiment. FIGS. 7 to 22 are views for illustrating a manufacturing step of this embodiment. FIG. 23 is a block diagram showing an example in which the helical capacitor of this embodiment is connected to an electrical circuit such as a DC power source.

These figures are drawn without reflecting actual thicknesses and length proportions in order to easily recognize constitutional elements.

As shown in FIGS. 1 and 2, in the helical capacitor 1000 of this embodiment, a belt shape capacitor line (capacitor line of belt shape) 1001 is helically wrapped around an internal support body 1200 as a support body. And at both end parts 1300 of the belt shape capacitor line 1001, the helical capacitor 1000 has internal metal body lead terminals (to be internal electrical conductor leading electrodes) 1311 and 1321 which are connected to an internal metal body exposure part 1101, and electrically conductive material layer lead terminals 1312 and 1322 which are connected to an electrically conductive material layer exposure part 1102. Although a width of the belt shape capacitor line is uniform here, it is not necessarily to be uniform.

As shown in FIG. 3, the internal metal body exposure part 1101 and the electrically conductive material layer exposure part 1102 are separated by a isolation dike (dike for isolation) 1103 so that they are not connected electrically to be short-circuited.

A lead terminal connection part 1321a of the internal metal body lead terminal 1321 is connected to the internal metal body exposure part 1101. External circuit connection part 1321b is connected to a pad or a line for connecting to an external circuit.

A lead terminal connection part 1322a of the electrically conductive material layer lead terminal 1322 is connected to the electrically conductive material layer exposure part 1102. External circuit connection part 1322b is connected to a pad or a line for connecting to an external circuit.

As shown in FIG. 4, the belt shape capacitor line 1001 includes an internal metal body 1100 to be an internal electrical conductor, a dielectric film 1020 covering the internal metal body 1100, and an electrically conductive material layer (to be an electrically conductive layer) 1030 covering the dielectric film 1020.

The electrically conductive material layer (to be an electrically conductive layer) 1030 has a three-layer structure in which an electrically conductive polymer layer 1031, a carbon paste layer 1032, and a silver paste layer 1033 are laminated.

As shown in FIG. 5, there is a slit 1410 in a cross-section taken along the line C-C of FIG. 1, and the slit 1410 constitutes a helical capacitor 1000. Although a width of the slit 1410 is uniform here, it is not necessarily to be uniform. For example, in a ninth embodiment which will be described later, an expanded belt shape capacitor line has a zigzag shape. In this case, the slit is not uniform. In this application, "belt shape" is not limited to a linearly extended shape, and includes a shape such as a zigzag shape shown in FIG. 42, for example.

Since the helical capacitor 1000 has a helical shape, when the location of the line C-C shifts in a long axis direction of the internal support body 1200, the location of the slit 1410 also moves along the helix.

Because of this, a length in which electric power transmits is significantly extended compared with a capacitor of straight line shape of a single plate.

Next, a manufacturing step of the first embodiment of the present invention will be described by using a flowchart showing a manufacturing step shown in FIG. 6 and illustrations (FIGS. 7 to 22) of each step. FIGS. 7 to 22 are views, each of which illustrates steps S11 to S27 respectively which will be described below.

[Wrapping a Metal Tape Around an Internal Support Body (Step S11)]

Figure 7:
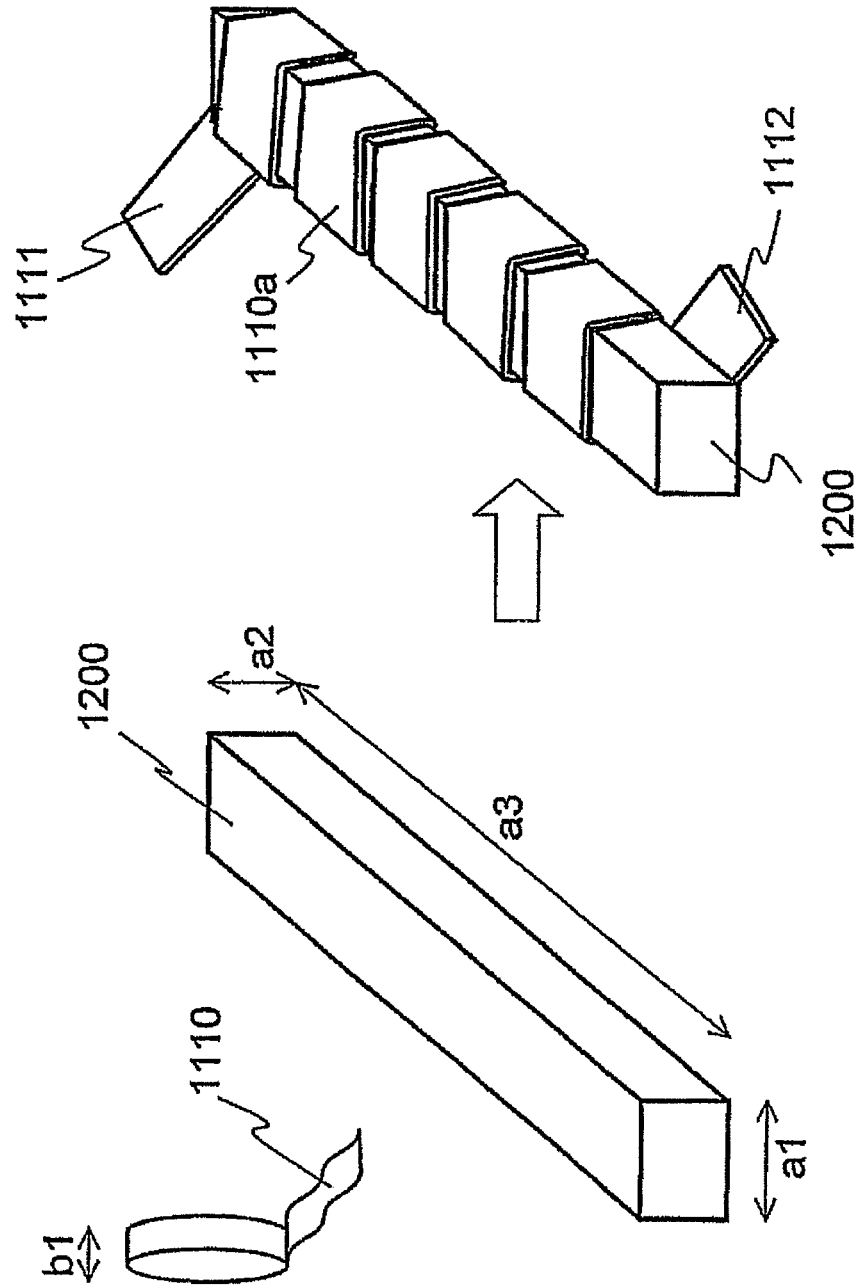
FIG. 7 is a view for illustrating a manufacturing step of the helical capacitor of the first embodiment of the present invention.

FIG. 7 is a view showing this step.

A polyethylene terephthalate (PET) which is an insulating material is fabricated into a shape shown in FIG. 7, and the internal support body 1200 is obtained.

In this embodiment, the width a1 is about 4 mm, the height a2 is about 2 mm, and the length a3 is about 20 mm.

An aluminum tape 1110 which is a rolled metal tape having a width b1 of about 4 mm and a thickness of about 0.1 mm is prepared. The aluminum tape 1110 becomes the internal metal body, and its width is uniform. However, the width need not necessarily be uniform.

Next, the aluminum tape 1110 is helically wrapped around the internal support body 1200.

The length of the aluminum tape end part 1111 is about 50 mm, and the length of the aluminum tape end part 1112 is about 10 mm.

The aluminum tape end part 1111 is cut to be long for the convenience of a latter step mentioned later.

An unnecessary electrode part is cut off at Step S27 "Cutting unnecessary electrode part".

In this way, the structure body 1110a is obtained as the aluminum tape 1110 which is wrapped around the internal support body 1200.

Here, although the internal support body 1200 is PET, it is possible to use a teflon system resin, an epoxy system resin, an acrylic system resin, other industrial plastic, glass, etc., when it is electrically insulating and satisfies thermal and mechanical requirements.

The aluminum tape 1110 need not be rolled, and it can be separated to bar-like shapes.

[Creating a Dike for Isolation (Wall for Isolation) (Step S12)]

Figure 8:
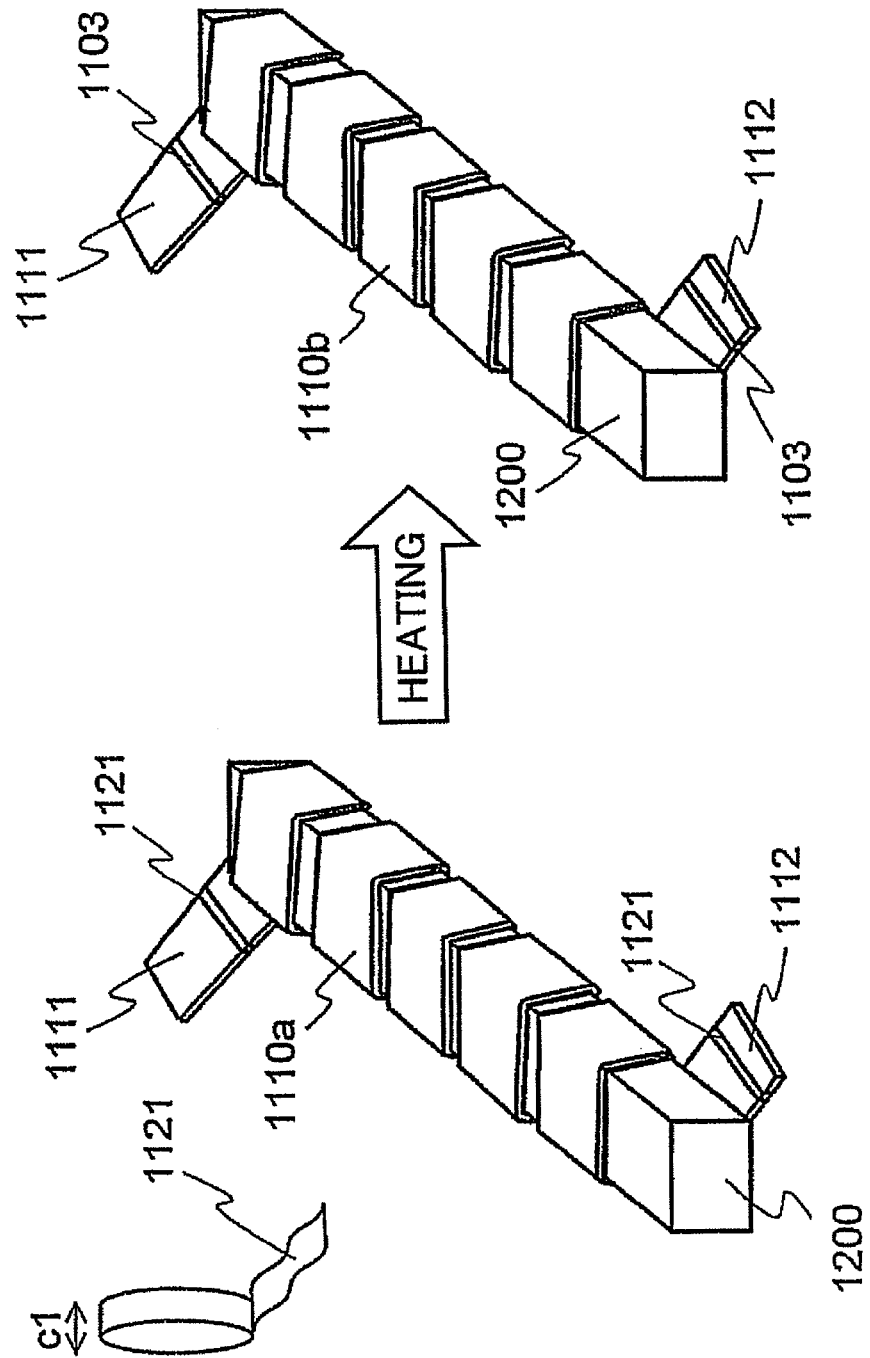
FIG. 8 is a view for illustrating a manufacturing step of the helical capacitor of the first embodiment of the present invention.

FIG. 8 is a view showing this step.

Next, an epoxy system thermosetting resin tape 1121 having a width c1 of about 1 mm is prepared, and the tape is adhered on both sides of aluminum tape end parts 1111, 1112.

The thermosetting resin tape 1121 is heated for about one hour in a dry oven in which the temperature is adjusted to 120 degrees Celsius to be thermally cured, so that the isolation dike (wall for isolation) 1103 is formed.

In this way, the structure body 1110b which includes the isolation dike 1103 is obtained.

Since the condition of thermal curing depends upon a resin and equipment to be used, the condition is not limited to the temperature and time described above.

Since the isolation dike 1103 only have to be electrically insulating, it is possible to use other materials other than an epoxy system thermosetting resin when it meets thermal and mechanical requirements. For example, the other materials are an acrylic system resin and a silicone system resin

[Attaching Internal Metal Body Lead Terminals (Step S13)]

Figure 9:
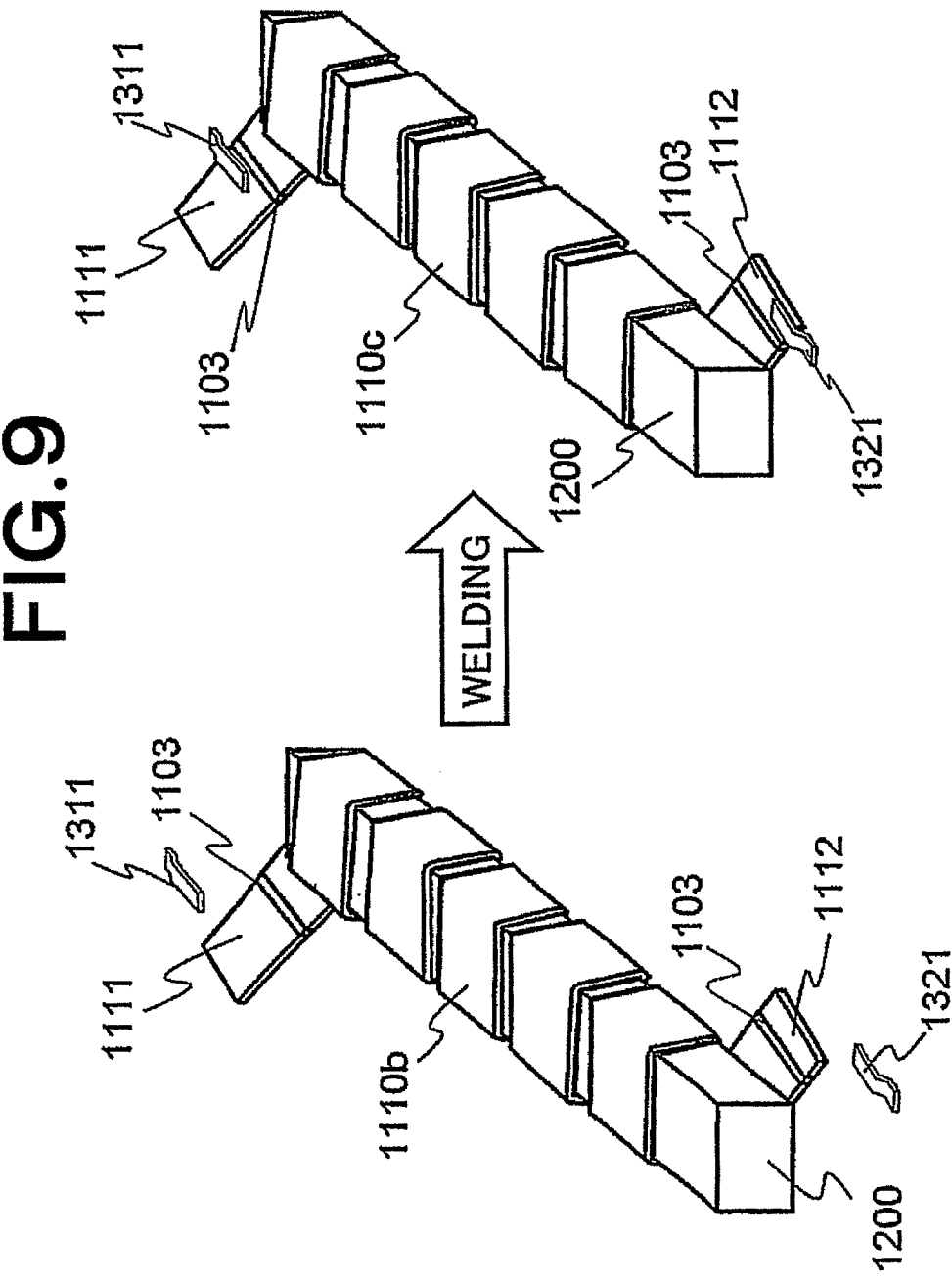
FIG. 9 is a view for illustrating a manufacturing step of the helical capacitor of the first embodiment of the present invention.

FIG. 9 is a view showing this step.

Next, internal metal body lead terminals 1311, 1321 having a width of about 1 mm are prepared, and the lead terminals are welded to the aluminum tape end parts 1111, 1112 by resistance welding.

In this way, the structure body 1110c which includes the internal metal body lead terminals 1311, 1321 is obtained.

The method for attaching the internal metal body lead terminals 1311, 1321 is not limited to resistance welding, and it is possible to use other welding methods such as laser welding and ultrasonic welding, or use an electrically conductive adhesive, a brazing alloy, and so on.

[Applying a Mask Resin (Step S14)]

Figure 10:
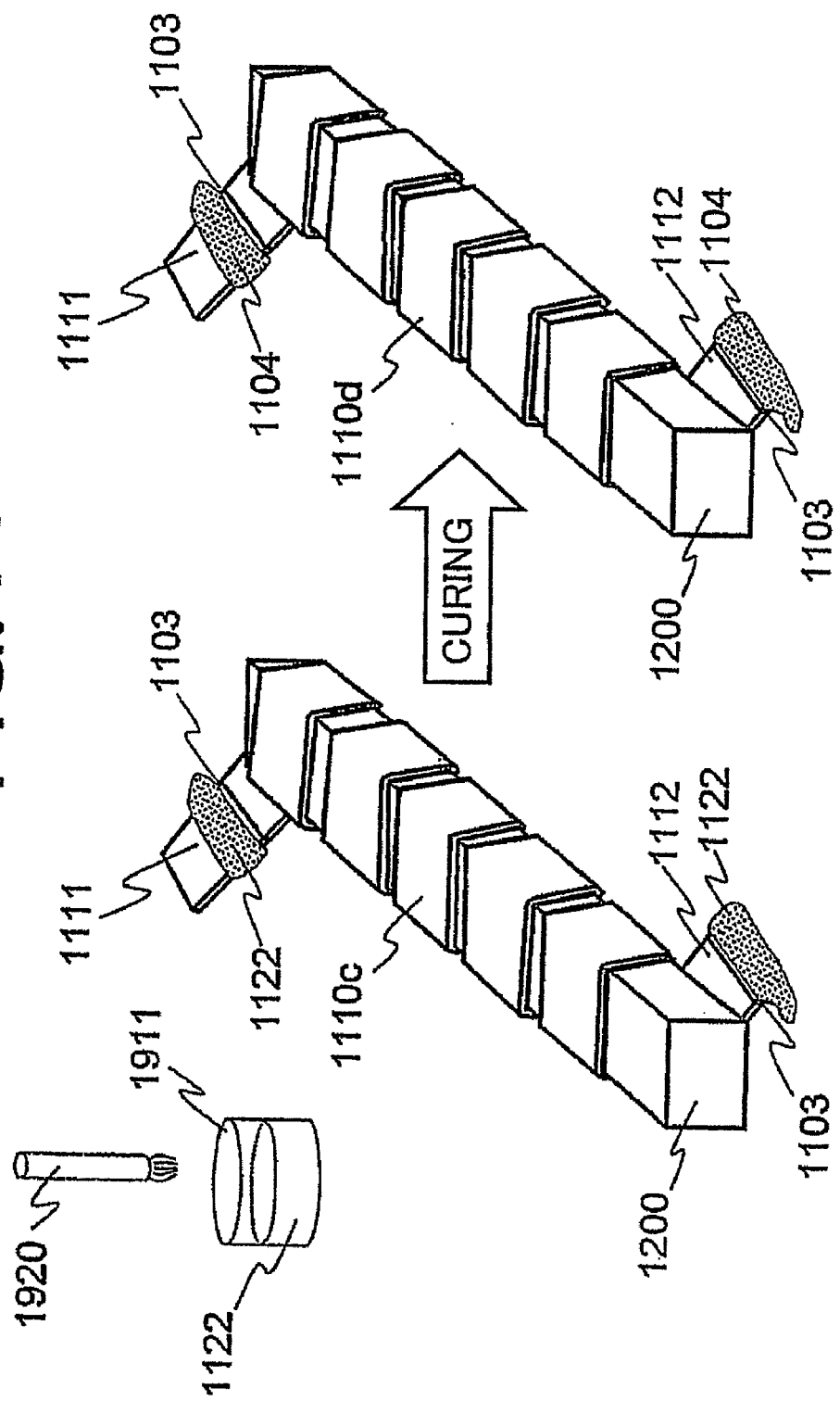
FIG. 10 is a view for illustrating a manufacturing step of the helical capacitor of the first embodiment of the present invention.

FIG. 10 is a view showing this step.

Next, a mask resin 1122 including hexafluoropropylene is prepared in the container 1911.

By using the brush 1920, the mask resin 1122 is applied to the structure body 1110c. An area where the mask resin 1122 is applied is an area where an electrically conductive material layer should not be formed and all areas which can be soaked by a solution in later steps.

The mask resin 1122 is cured at room temperature, so that a mask 1104 is formed.

The mask resin 1122 is not limited to hexafluoropropylene, and it is possible to use other materials if the purpose that an electrically conductive material layer is not formed is achieved, and a method for removing the mask resin 1122 is known.

[Chemical Conversion (Forming a Dielectric Film) (Step S15)]

Figure 11:
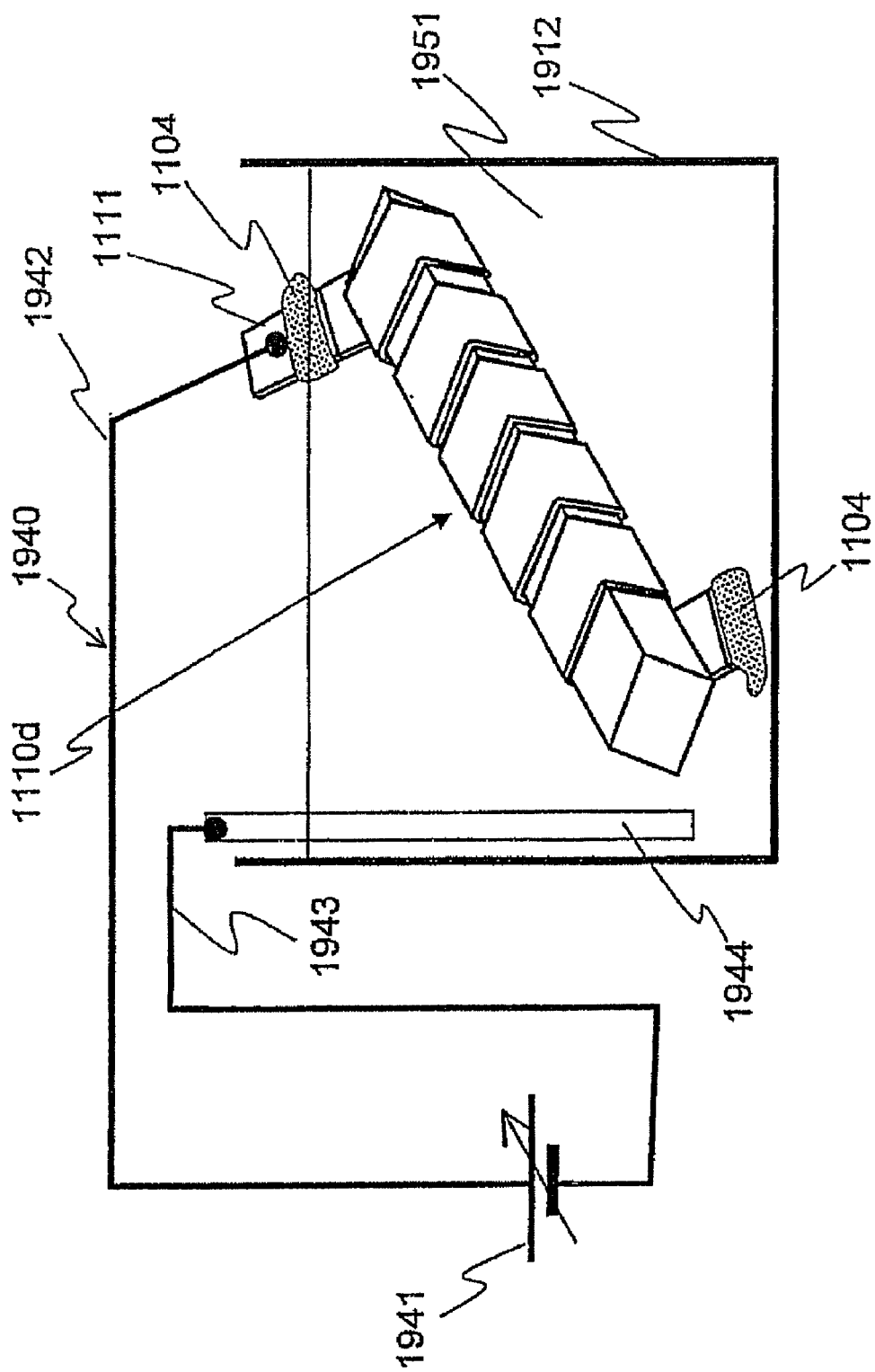
FIG. 11 is a view for illustrating a manufacturing step of the helical capacitor of the first embodiment of the present invention.

FIG. 11 is a view showing this step.

The chemical conversion bath 1940 is constituted by the container 1912, the chemical conversion solution 1951 including an ammonium borate aqueous solution, the variable power source 1941, the positive electrode line 1942 connected to a target aluminum tape end part, and the negative electrode line 1943 connected to the negative electrode plate 1944.

The structure body 1110*d* is dipped into the chemical conversion solution 1951, an output of the variable power source 1941 is gradually increased, and an ultimate output voltage is reached to 4 volt.

In this way, on the surface of the structure body 1110*d* which touches the chemical conversion solution 1951, a metal oxide layer (aluminum oxide) of an applied voltage of 4 volt is formed as the dielectric film 1020. In this way, the structure body 1110*e* whose surface is covered by the dielectric film 1020 is obtained.

[Cleaning and Drying (Step S16)]

Figure 12:
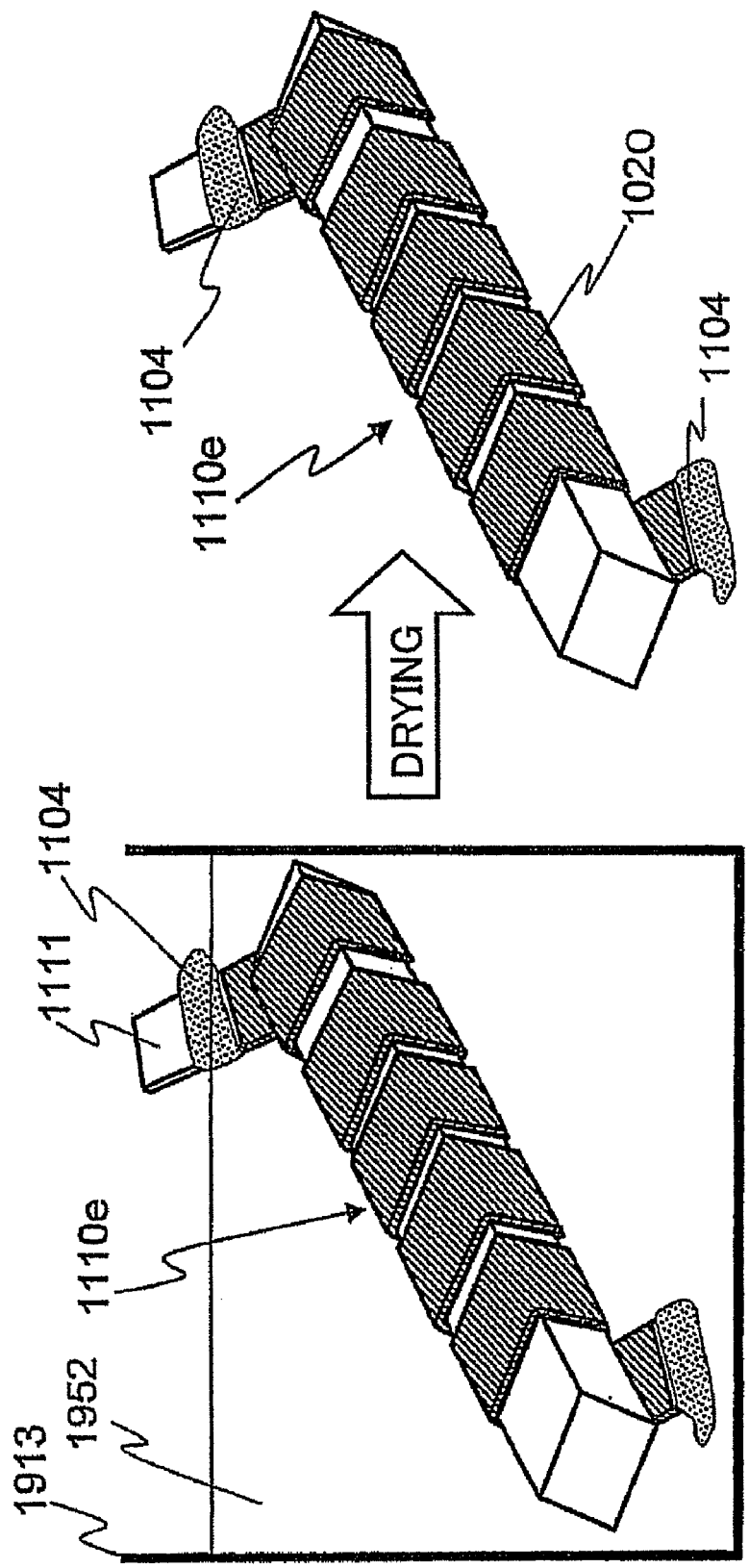
FIG. 12 is a view for illustrating a manufacturing step of the helical capacitor of the first embodiment of the present invention.

FIG. 12 is a view showing this step.

The chemical conversion solution 1951 attached to the structure body 1110*e* is cleaned by the cleaning fluid 1952.

The container 1913 is filled with the cleaning fluid 1952 (water), and the structure body 1110*e* is dipped into the cleaning fluid 1952 for about 10 minutes and cleaned.

The time for dipping is adjusted depending on a size of the container 1913 and a cleanliness of the cleaning fluid 1952.

The cleaning fluid 1952 only has to clean the structure body 1110*e*, and its ingredients are not limited.

After cleaning, by using a dry oven set at 110 degrees Celsius, the cleaning fluid 1952 is evaporated.

Here, the condition of drying is that only the structure body 1110*e* should be dried, and equipment to be used is not limited.

[Applying an Oxidant (Step S17)]

Figure 13:
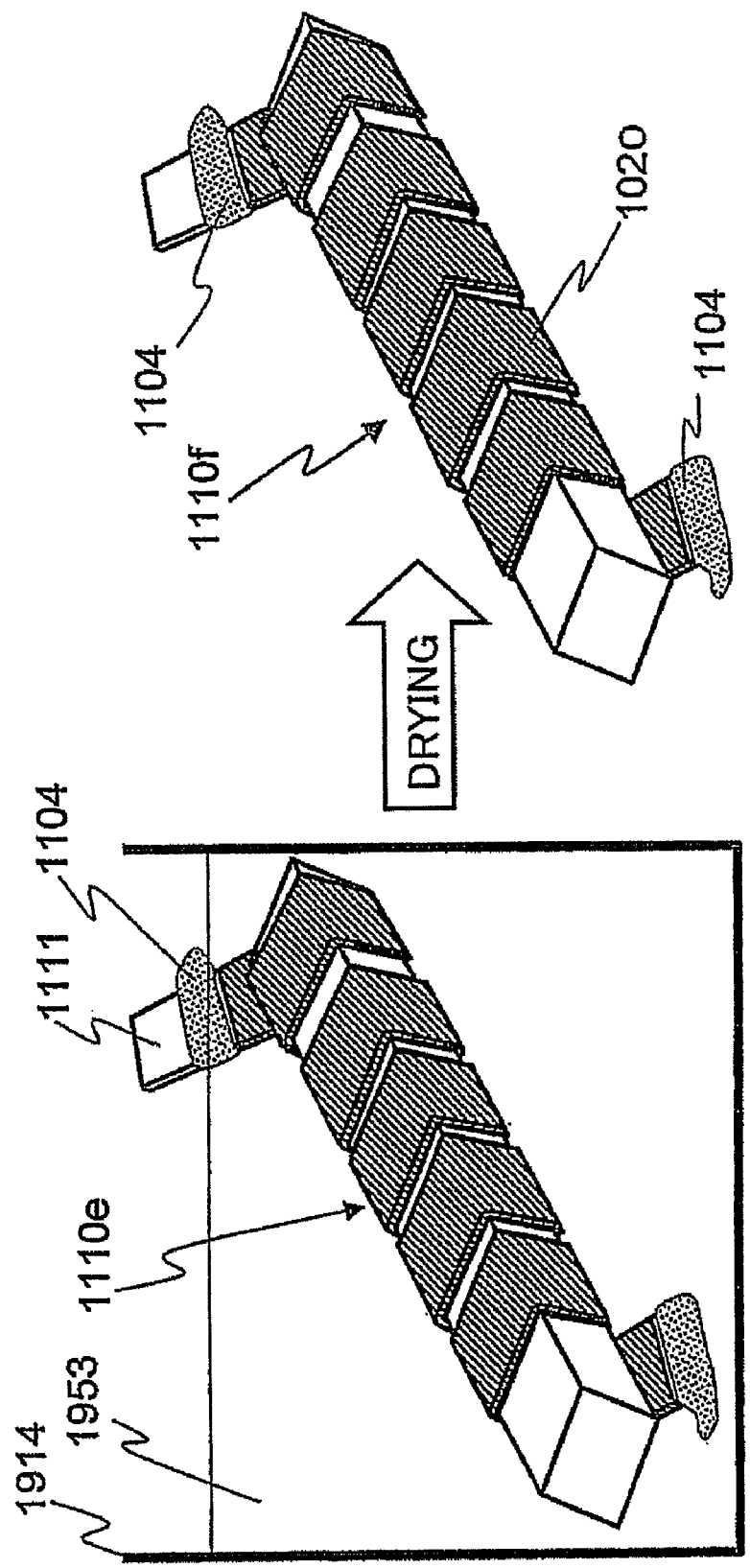
FIG. 13 is a view for illustrating a manufacturing step of the helical capacitor of the first embodiment of the present invention.

FIG. 13 is a view showing this step.

An ethanol solution including 10 percent by mass concentration of ferric dodecylbenzenesulfonate is adjusted to be an oxidant 1953.

As shown in FIG. 13, the container 1914 is filled with the oxidant 1953 and the structure body 1110*e* is dipped into the oxidant 1953. The structure body 1110*e* is taken out from the oxidant 1953, dried in air at room temperature for 30 minutes, and the structure body 1110*f* in which the oxidant 1953 is attached to the surface of the dielectric layer 1020 is obtained.

[Step of Forming an Electrically Conductive Polymer (Step S18)]

Figure 14:
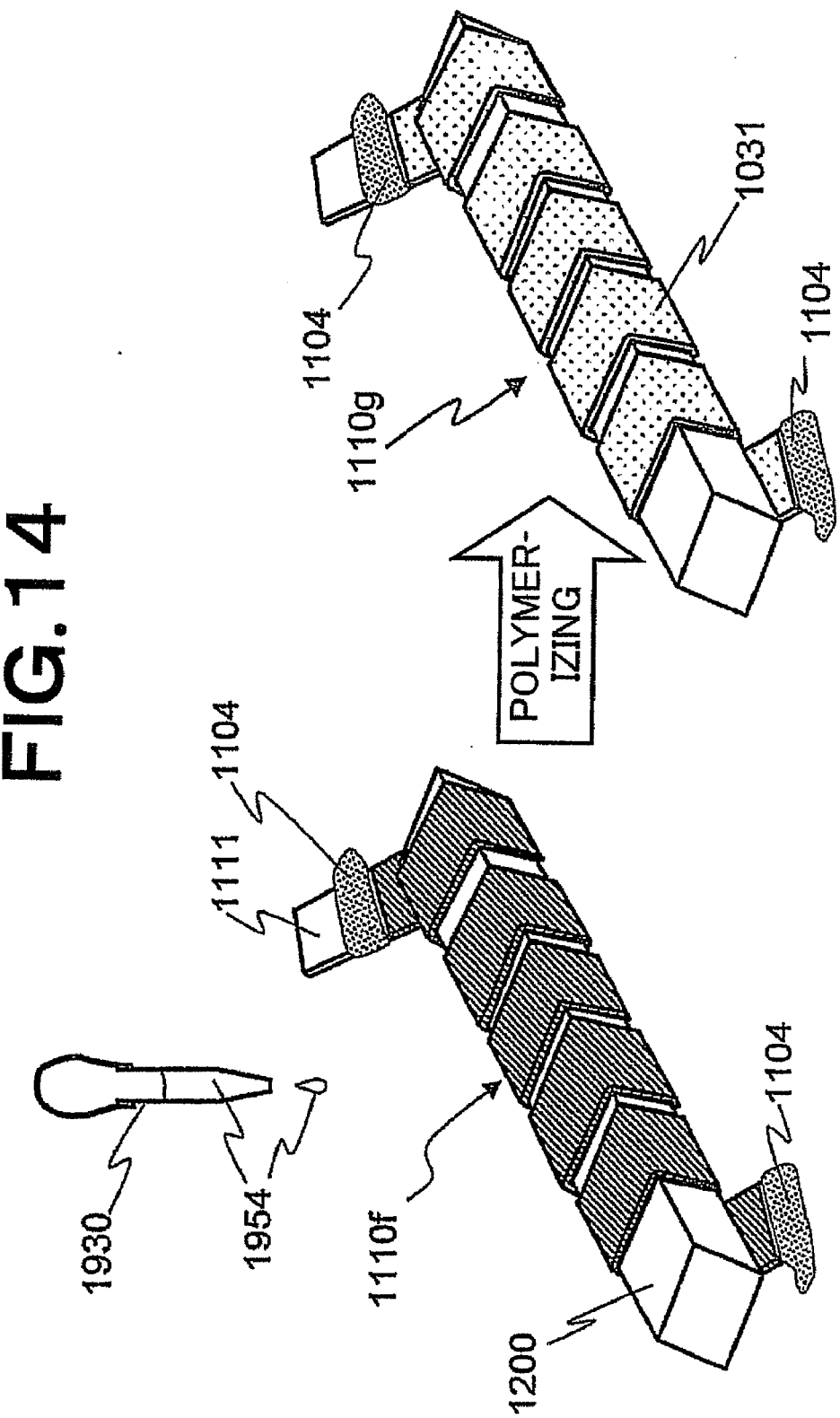
FIG. 14 is a view for illustrating a manufacturing step of the helical capacitor of the first embodiment of the present invention.

FIG. 14 is a view showing this step.

An ethanol solution (monomer solution 1954) including 10 percent by mass concentration of ethylenedioxythiophene is dropped on the dielectric layer 1020 of the structure body 1110*f* by using the dropper 1930, held in air for 30 minutes as it is, and polyethylenedioxythiophene is polymerized.

In this way, the structure body 1110*g*, on whose surface the electrically conductive polymer 1031 is formed, is obtained.

[Step of Cleaning and Drying (Step S19)]

Figure 15:
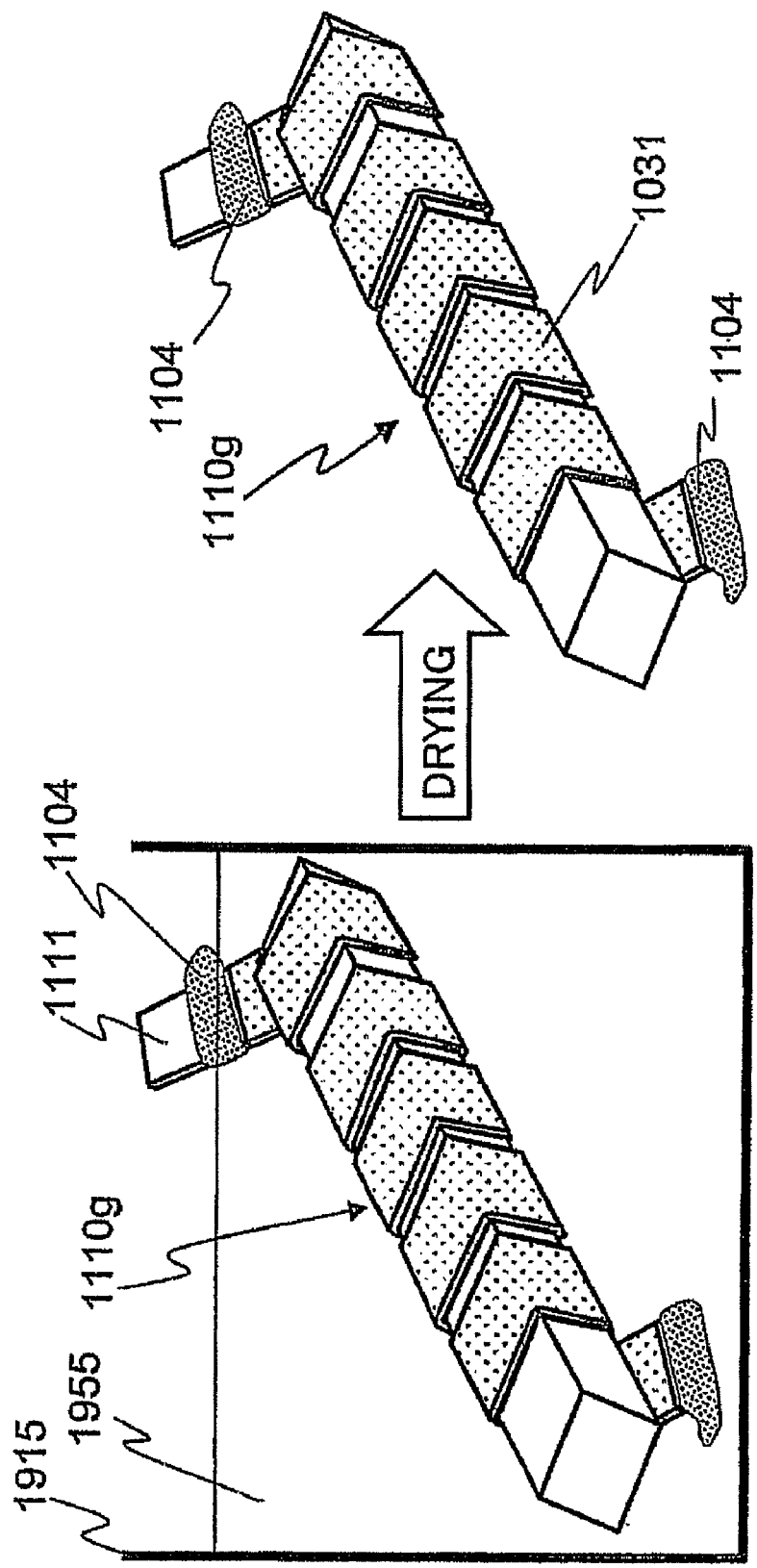
FIG. 15 is a view for illustrating a manufacturing step of the helical capacitor of the first embodiment of the present invention.

FIG. 15 is a view showing this step.

The structure body 1110*g* is put into the container 1915 which is filled with the cleaning fluid 1955 whose main ingredient is ethanol, and materials which are not polymerized are washed away.

Anything can be used as the cleaning fluid 1955 if it can remove materials which are not polymerized and by-product materials, and it is not limited to ethanol.

To evaporate the cleaning fluid 1955, the structure body 1110*g* is dried in a dry oven adjusted to 80 degrees Celsius.

As shown in FIG. 6, the operation from Step S17 to Step S19 is repeated four times until the electrically conductive polymer 1031 is sufficiently formed, so that the dielectric layer 1020 is covered by the electrically conductive polymer.

The right hand view in FIG. 15 shows the structure body 1110*g* where the electrically conductive polymer 1031 is formed.

Although the number of repeating times is four in this embodiment, the number is not limited.

However, when the number of repeating times is small, areas where the electrically conductive polymer is not formed will remain.

When a pinhole is formed in the dielectric layer in these areas, a failure due to a short circuit between an electrode and the opposite electrode and an increase in leak current will occur.

When the operation is repeated four times, the failure due to the short circuit will not occur, and the leak current can be reduced to an acceptable level.

However, the result will be different depending upon materials of the electrically conductive polymer and manufacturing conditions. Therefore, the operation should be repeated appropriate times until reaching a level in which there is no short circuit defect in manufactured products.

The electrically conductive polymer formed in this embodiment is heated when a large current flows, and performs a function to insulate the large current path. As a result, the electrically conductive polymer performs functions to repair defect and prevent short circuit.

In this way, the belt shape capacitor line 1001 having the electrically conductive polymer layer 1031 which does not include an insulating layer defect is obtained.

[Step of Applying a Carbon Paste (Step S21)]

Figure 16:
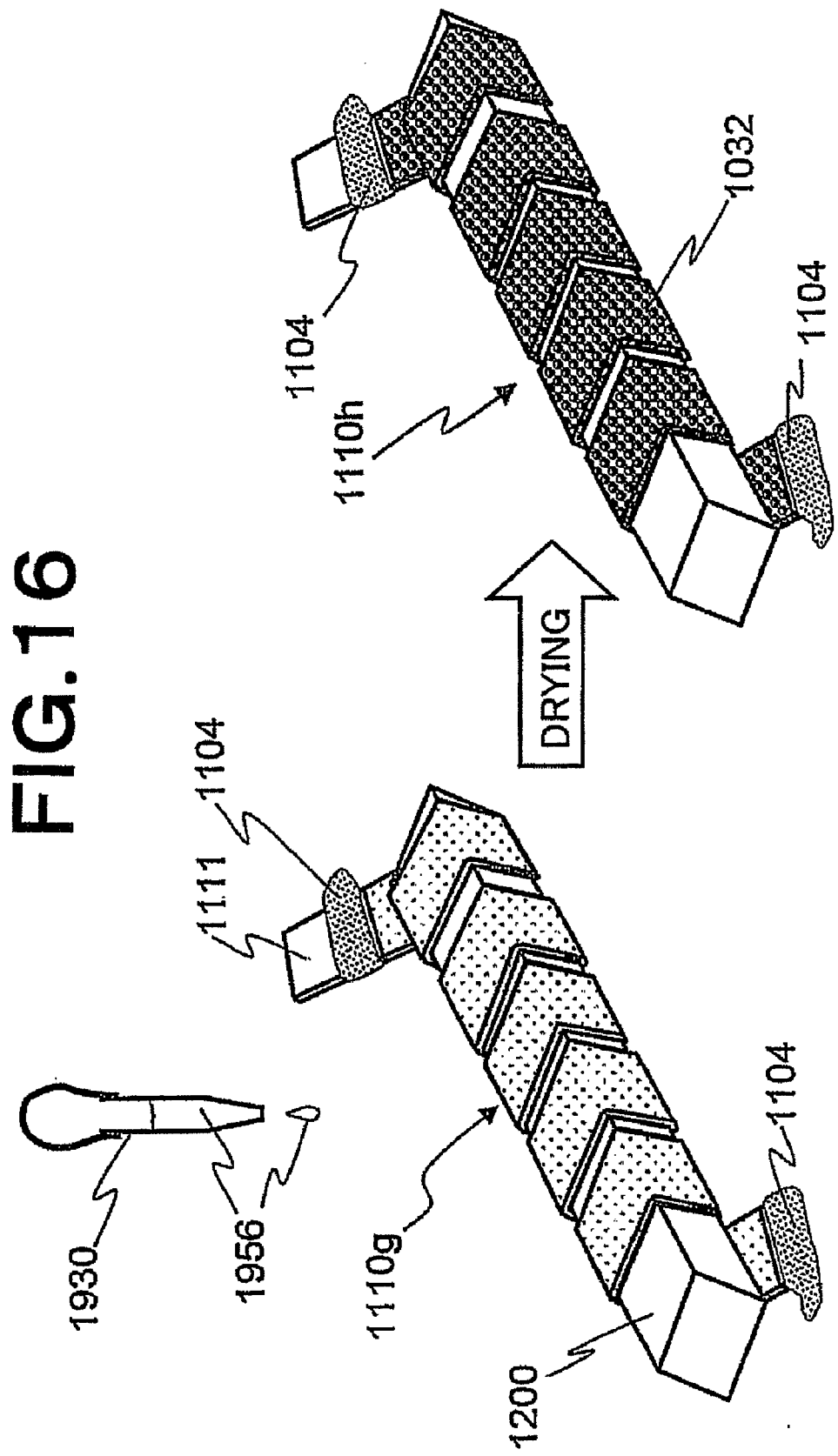
FIG. 16 is a view for illustrating a manufacturing step of the helical capacitor of the first embodiment of the present invention.

FIG. 16 is a view showing this step.

The carbon paste liquid 1956 including carbon graphite is applied by the dropper 1930 to the belt shape capacitor line 1001 (area where the electrically conductive polymer layer 1031 is formed) of the structure body 1110*g* in which the electrically conductive polymer layer 1031 is formed and dried.

In this way, the structure body 1110*h*, on whose surface the carbon paste layer 1032 is applied, is obtained.

[Step of Applying a Silver Paste (Step S22)]

Figure 17:
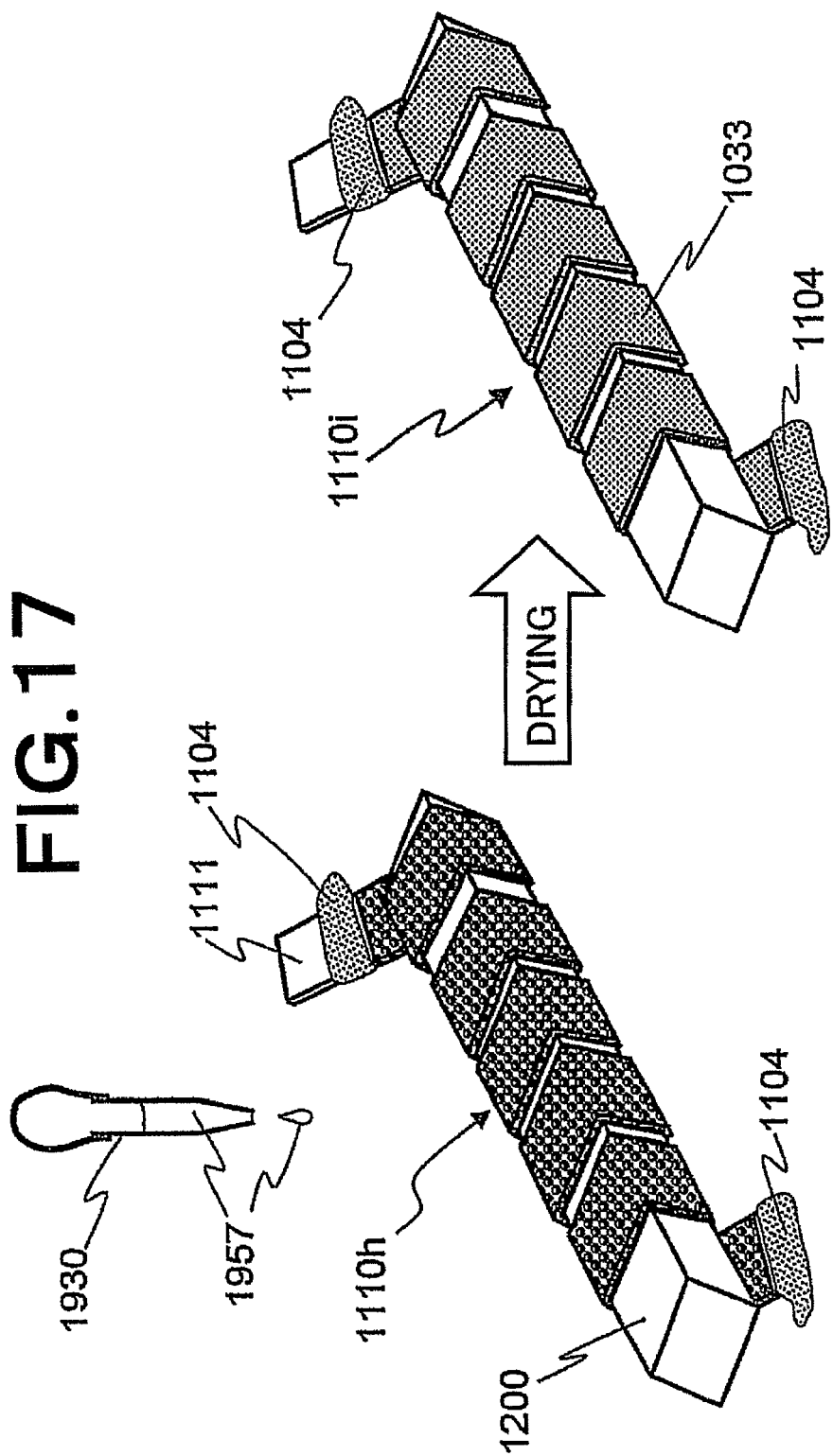
FIG. 17 is a view for illustrating a manufacturing step of the helical capacitor of the first embodiment of the present invention.

FIG. 17 is a view showing this step.

The silver past liquid 1957 is applied to the structure body 1110*h* by using the dropper 1930. After that, the structure body 1110*h* is dried at 60° C. for 15 minutes. And the structure body 1110*h* is left as it is at room temperature for 24 hours.

Up to here, the structure body 1110*i* in which the electrically conductive material layer 1030 is formed on the dielectric film 1020 is obtained. The electrically conductive material layer 1030 includes the electrically conductive polymer layer 1031, the carbon paste layer 1032, and the silver paste layer 1033.

[Attaching Electrically Conductive Material Layer Lead Terminals (Step S23)]

Figure 18:
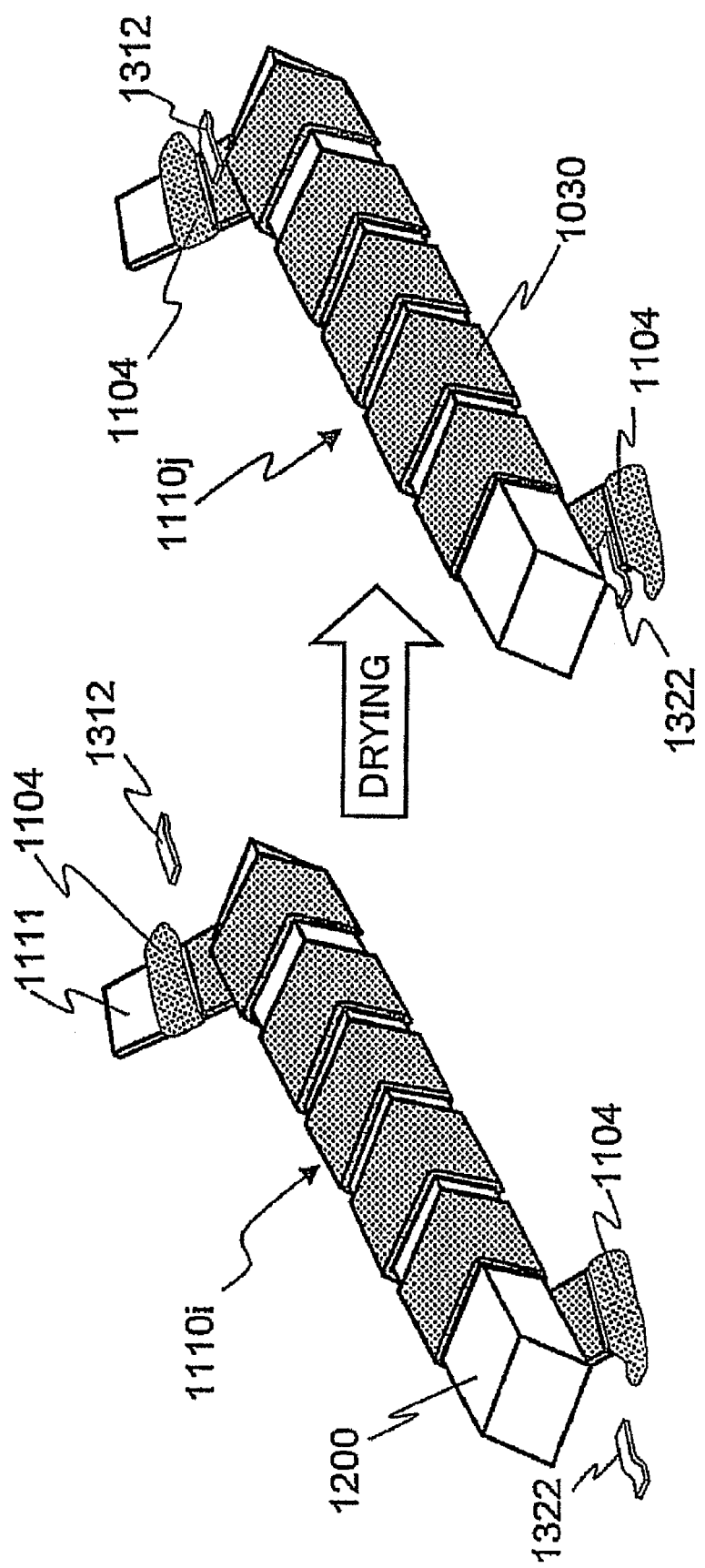
FIG. 18 is a view for illustrating a manufacturing step of the helical capacitor of the first embodiment of the present invention.

FIG. 18 is a view showing this step.

The electrically conductive material layer lead terminals 1312, 1322 are prepared, and these terminals are attached to the surface of the electrically conductive material layer 1030 of the structure body 1110*i*.

Here, these terminals are attached to the surface of the electrically conductive material layer 1030 by the same silver paste liquid 1957 as that of Step S22.

The curing condition of the silver paste liquid 1957 is the same as that of Step S22.

In this way, the structure body 1110*j* which includes the electrically conductive material layer lead terminals 1312, 1322 is obtained.

The paste liquid only has to be an electrically conductive adhesive, and it is not limited to the same silver paste liquid 1957 as that of Step S22.

[Chemical Re-Conversion (Repairing Dielectric Film) (Step S24)]

Figure 19:
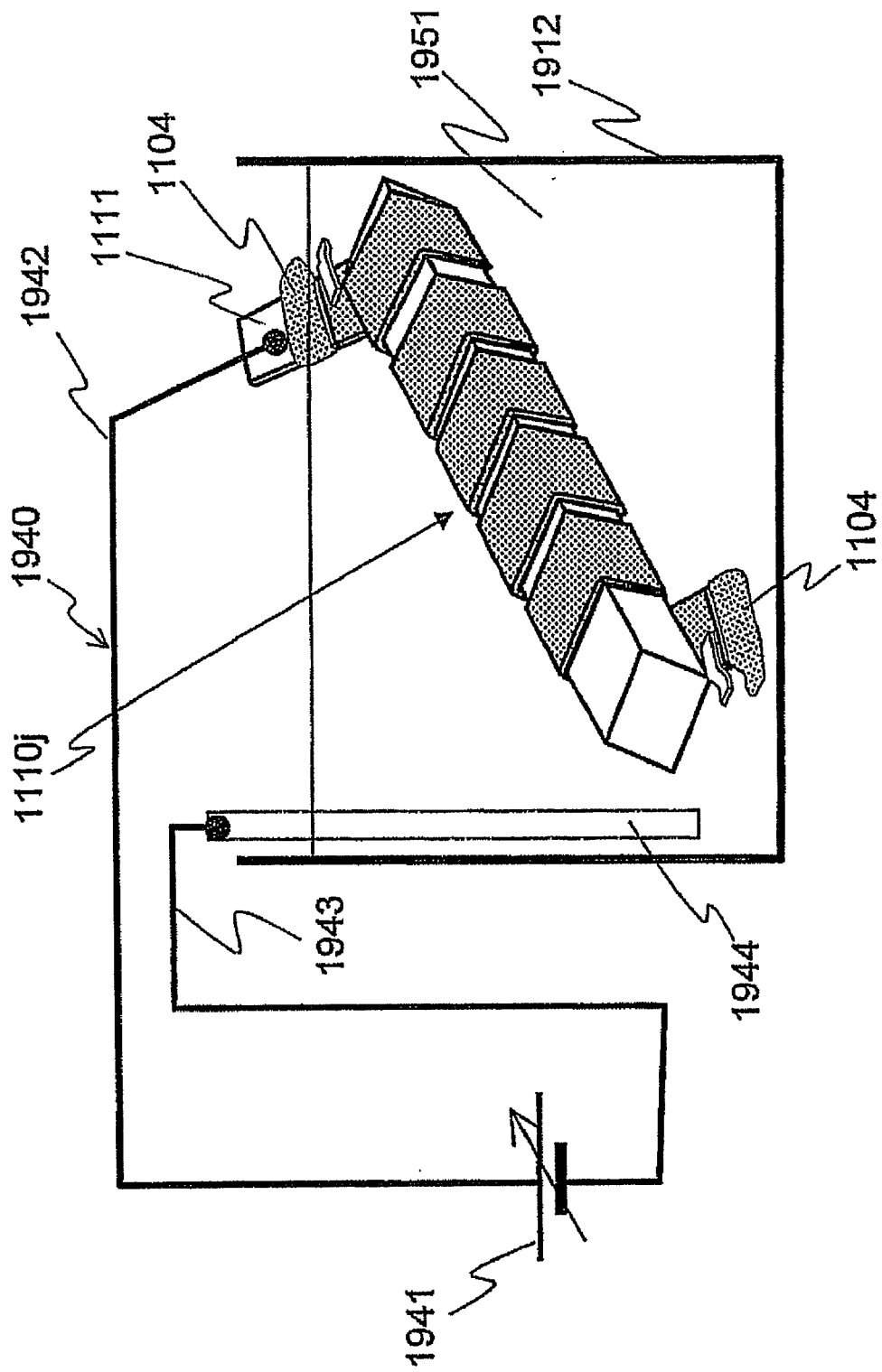
FIG. 19 is a view for illustrating a manufacturing step of the helical capacitor of the first embodiment of the present invention.

FIG. 19 is a view showing this step.

To repair a damaged dielectric film 1020, the structure body 1110*j* is put into the same chemical conversion bath 1912 as that of Step S15, the applied voltage is gradually increased in the same way as Step S15, and ultimately 4 volt is applied.

In this way, the structure body 1110*k* which is the dielectric film 1020 having small damage is obtained.

[Step of Cleaning and Drying (Step S25)]

Figure 20:
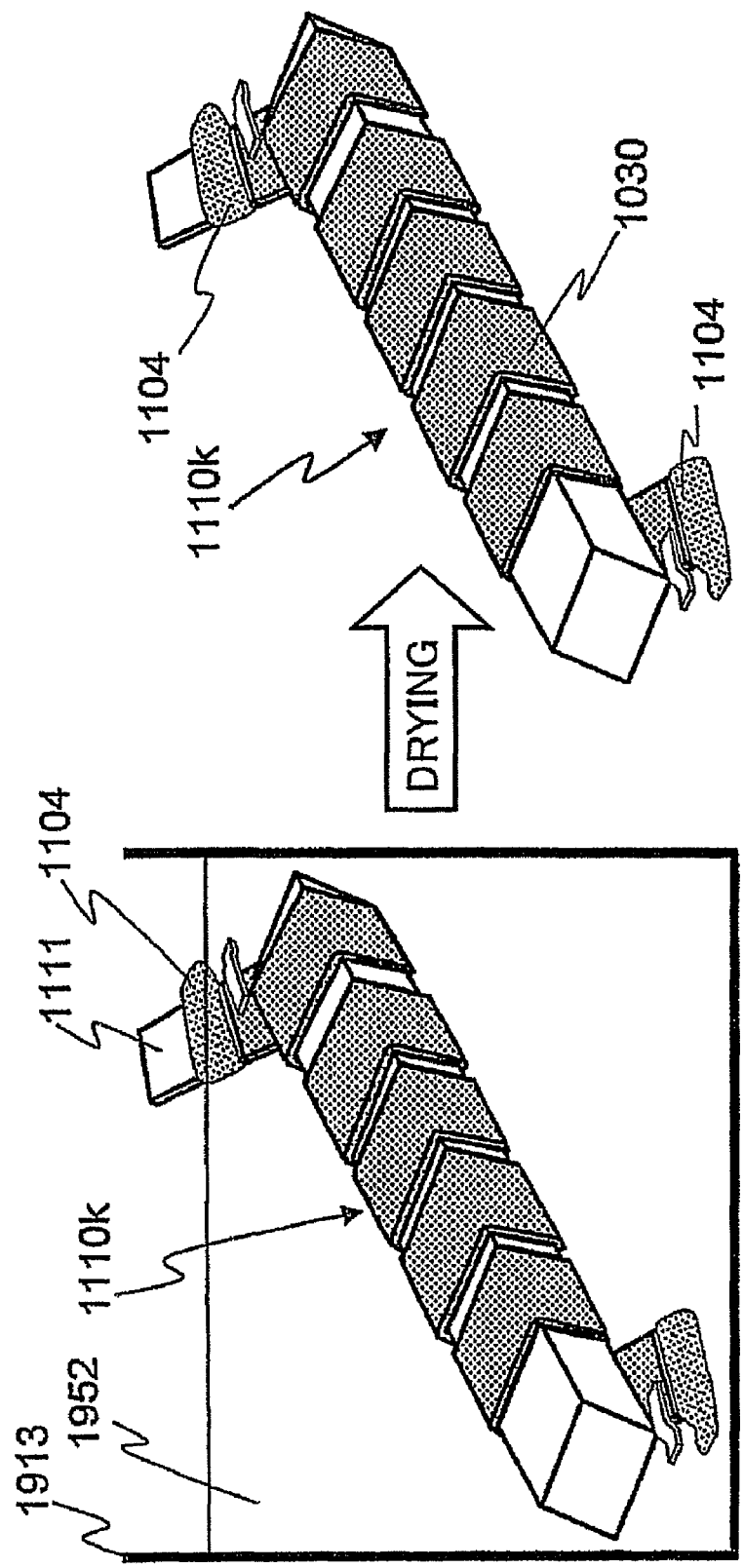
FIG. 20 is a view for illustrating a manufacturing step of the helical capacitor of the first embodiment of the present invention.

FIG. 20 is a view showing this step.

In the same way as Step S16, the chemical conversion solution 1951 attached to the structure body 1110*k* is cleaned by the cleaning fluid 1952, and the cleaning fluid 1952 attached to the structure body 1110*k* is evaporated.

[Step of Removing Mask Resin (Step S26)]

Figure 21:
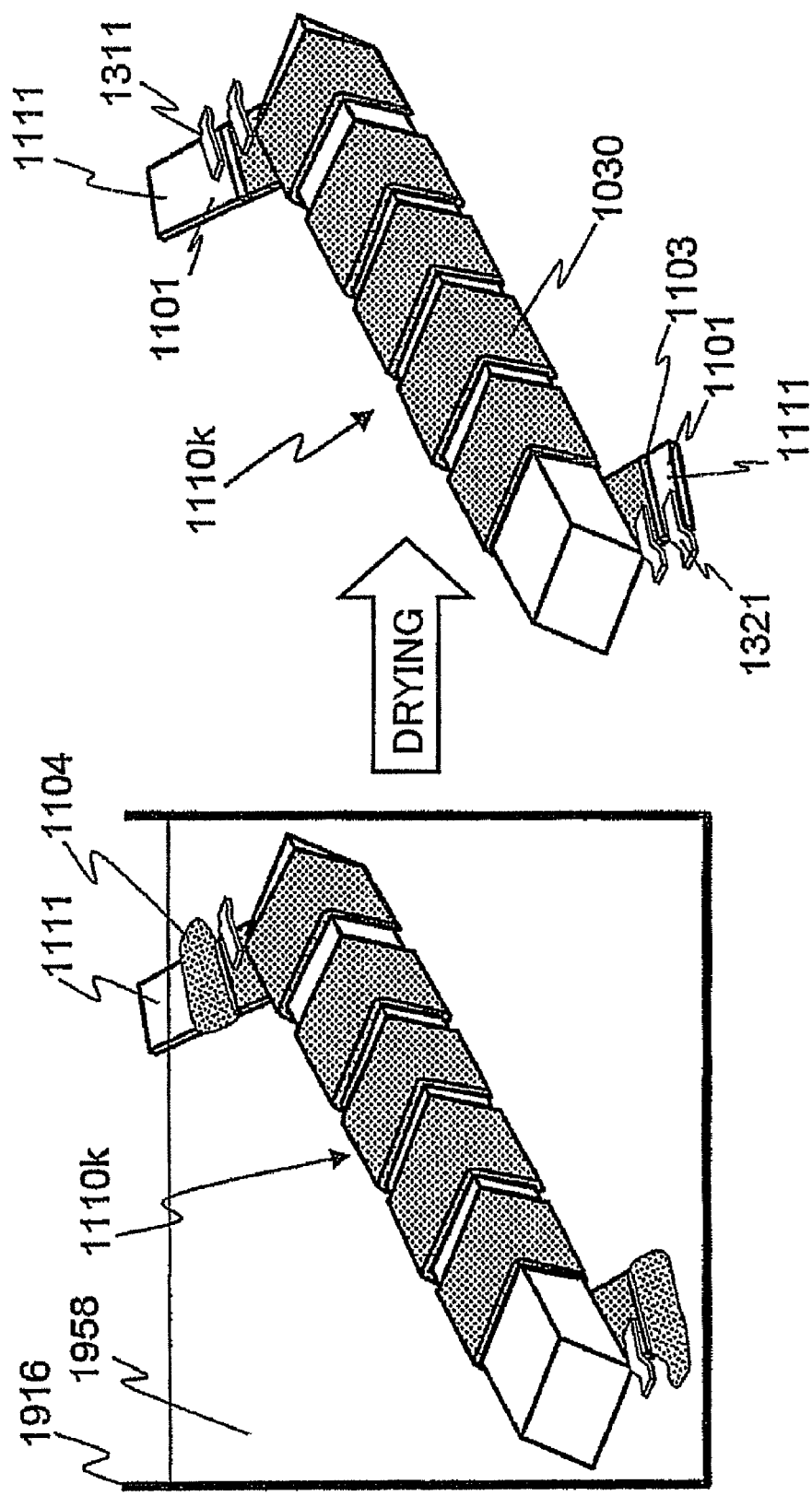
FIG. 21 is a view for illustrating a manufacturing step of the helical capacitor of the first embodiment of the present invention.

FIG. 21 is a view showing this step.

The structure body 1110*k* is dipped into removing liquid 1958 including tetrahydrofuran in the container 1916, and hexafluoropropylene forming the mask 1104 is dissolved.

The internal metal body exposure part 1101, the internal metal body lead terminals 1311, 1321, and the isolation dike 1103 become exposed.

The electrically conductive polymer layer 1031, the carbon paste 1032, and the silver paste 1033 which are attached to the surface of the mask 1104 are removed with the mask 1104.

[Step of Cutting Unnecessary Electrode Part (Step S27)]

Figure 22:
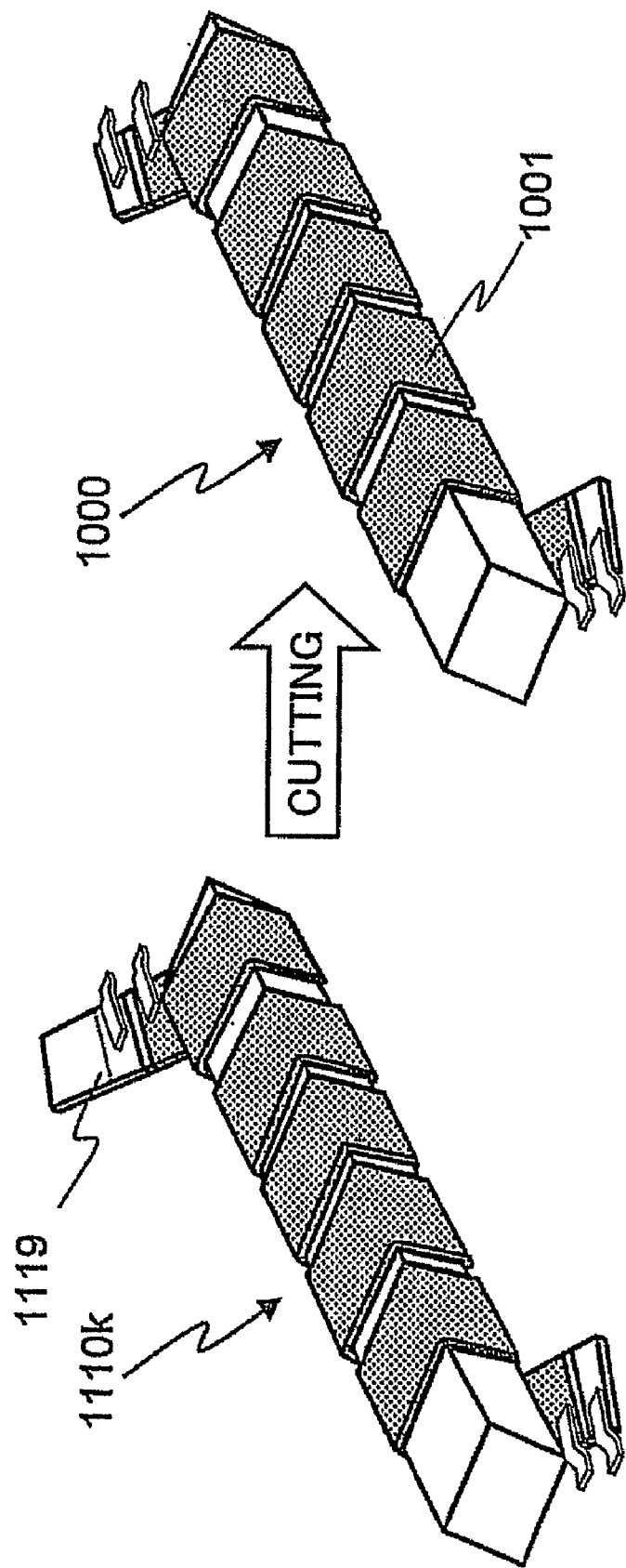
FIG. 22 is a view for illustrating a manufacturing step of the helical capacitor of the first embodiment of the present invention.
Figure 23:
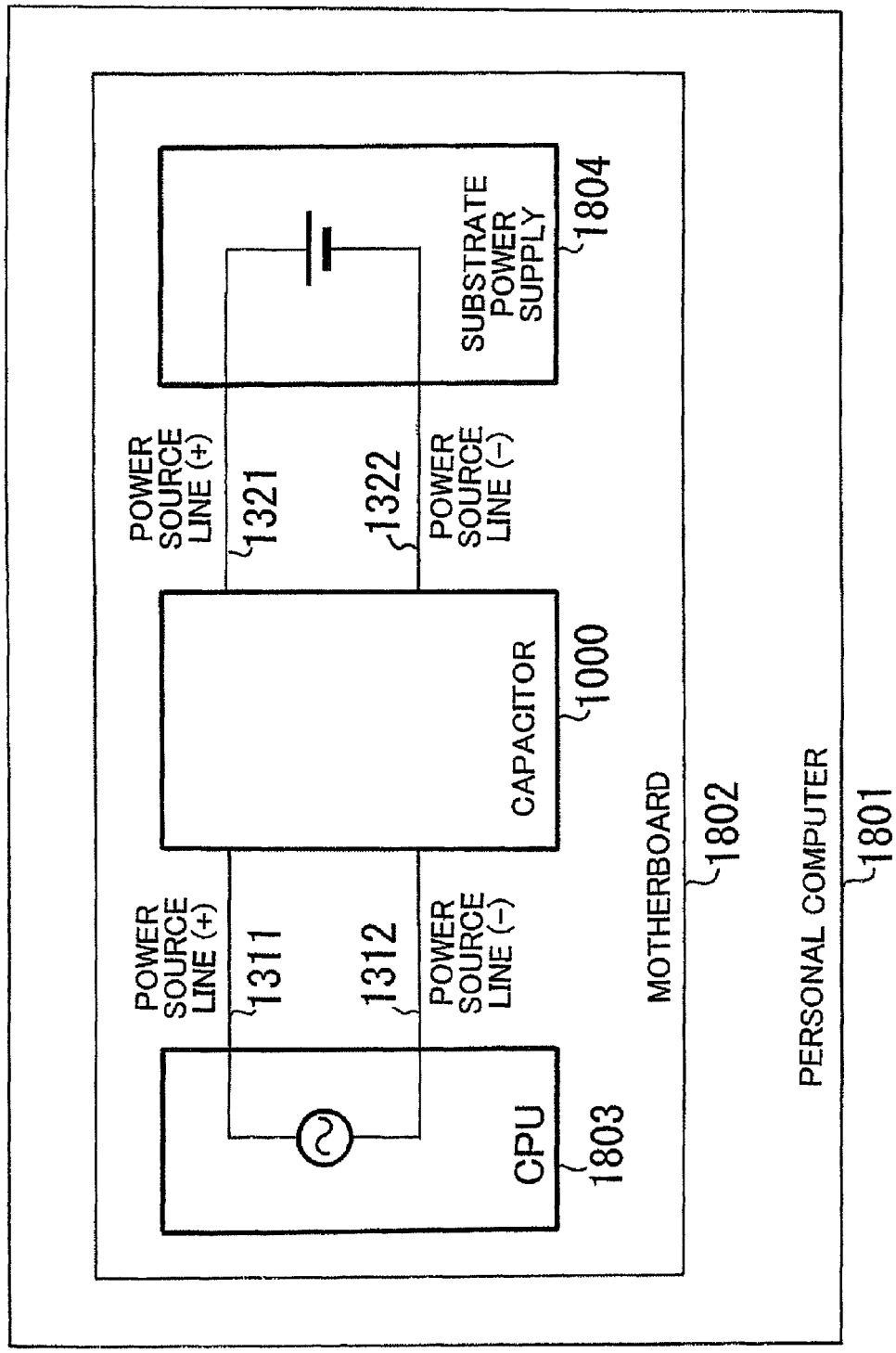
FIG. 23 is a block diagram showing an example in which the helical capacitor of the first embodiment of the present invention is connected to an electrical circuit such as a DC power source.

FIG. 22 is a view showing this step.

The aluminum tape end part 1111 which was not cut but left is cut off along the unnecessary electrode part boundary line 1119, and the helical capacitor 1000 is obtained.

Here, the dielectric layer need not necessarily be a metal oxide film, but it can be an insulating dielectric film made of a resin, and the material is not particularly limited.

Although a metal (aluminum) having a valve action is used for the internal metal body 1100 in order to obtain a metal oxide film, the internal metal body 1100 can be a metal which does not have the valve action or can be a material which has an electrical conductivity by selecting the dielectric layer.

Here, the valve action means: having a voltage resistance when applying a voltage in one direction, and losing the voltage resistance when applying the voltage in the opposite direction. And the metal having a valve action means a metal which can form a metal oxide film showing the valve action.

As other than metals having the valve action, metals such as copper, iron, and brass can be used.

In this case, by using copper as an electrode, a copper oxide can be formed as a dielectric body on a surface.

In addition, by using copper, iron, or brass as an electrode, a tartaric acid system ferroelectric material, a phosphate system ferroelectric material, and a titanate system ferroelectric material can be used as a dielectric body.

In titanate system ferroelectric materials, a barium titanate, a barium titanate ceramics, a barium titanate system solid solution ceramics (strontium titanate "$SrTiO_3$", barium titanate "$BaTiO_3$", or the like) show good characteristics as a dielectric body.

For the electrically conductive material layer 1030, it is not necessary to select a material which has functions to repair defect and prevent short circuit, if defects in the dielectric film 1020 are acceptable, and the material only has to have an electrical conductivity.

The electrically conductive polymer can be not only polyethylenedioxythiophene but also at least one compound selected from the group consisting of polypyrrole, polythiophene, and polyaniline, or a derivative of the compound. The electrically conductive material layer 1030 and the internal metal body 1100 can be constituted by a plurality of electrically conductive materials.

The electrically conductive material layer 1030 can be constituted in a multi-layer structure by using an electrically conductive polymer, a carbon paste, and a silver paste, like this embodiment.

Of course, the electrically conductive material layer 1030 can be constituted by a single material.

The internal metal body 1100 can be an electrode having a multi-layer structure. For example, for internal metal body 1100, copper can be used as its core and aluminum can be used as its surface.

As a metal having the valve action, a metal selected from the group consisting of aluminum, tantalum, niobium and titanium is industrially stable, and it is also possible to use other metals which have the valve action because necessary electrical characteristics can be obtained.

The mask resin and a resin for the mask only have to be electrically insulating and protect the electrode surface against chemicals, and any material can be used as the resin if thermal and mechanical requirements are satisfied.

The internal metal body lead terminals 1311, 1321 are not necessarily newly added, and the lead terminals can be substituted by parts of the surface of the internal metal body 1100. In the same way, the electrically conductive material layer lead terminals 1312, 1322 can be substituted by parts of the surface of the electrically conductive material layer 1030.

In this embodiment, for the internal metal body 1100, an aluminum foil on which an etching processing is performed is used as the aluminum tape 1110.

By performing the etching processing, the surface of the aluminum foil is roughened and there are a huge number of fine concavities and convexities which are invisible to the naked eye.

In the figures, to easily understand the configuration, detailed drawings are omitted and the internal metal body 1100 is represented as a simple plate.

Therefore, as a shape of the internal metal body 1100, instead of using a plate having a smooth surface, for the purpose of increasing the surface area, it is effective to use a plate which has fine concavities and convexities, a plate which has large concavities and convexities visible to the naked eye, a plate which has a cross-section shaped like that of a corrugated plate, and a combination of these plates and shapes.

Figure 51:
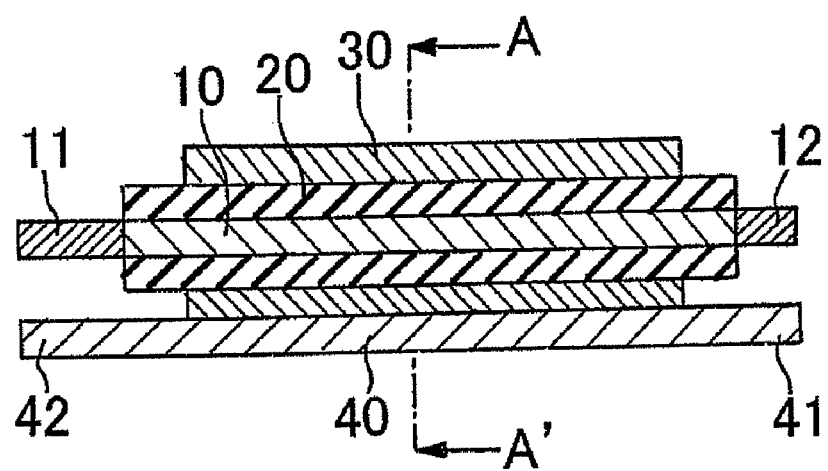
FIG. 51 is a diagram showing a background art.
Figure 52:
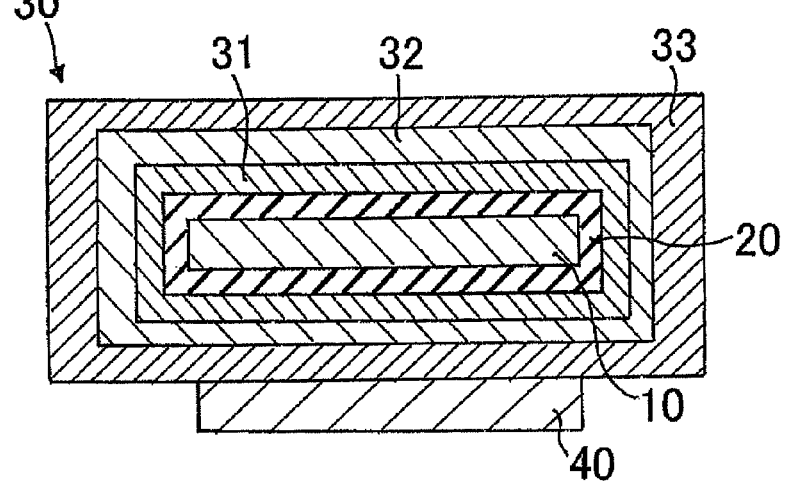
FIG. 52 is a diagram showing a background art.
Figure 53A:
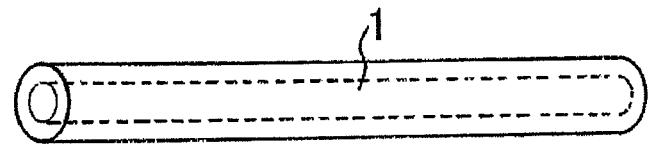
FIG. 53 is a perspective view and cross-sectional views for showing another background art.
Figure 53B:
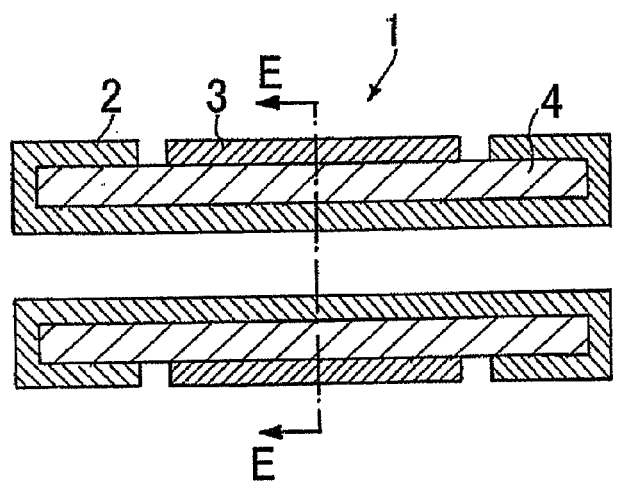
Figure 53C:
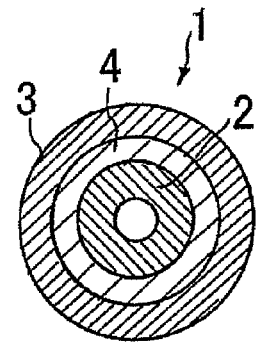
Figure 54:
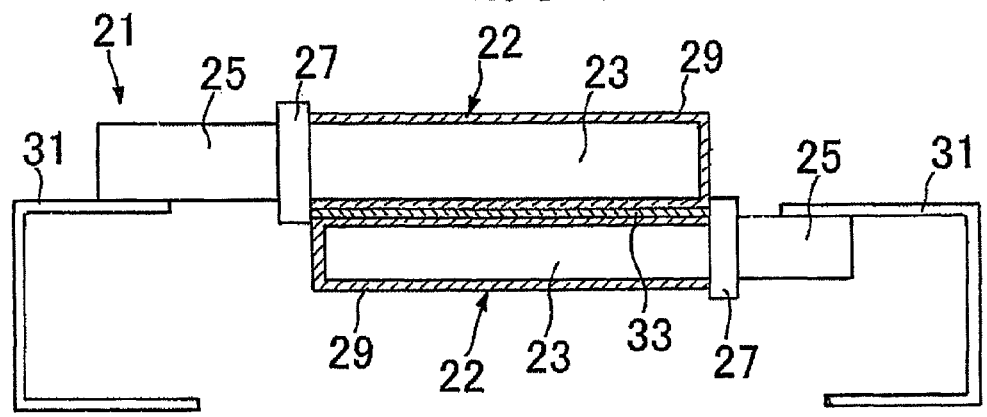
FIG. 54 is a diagram showing another background art.

Compared with the single plate structure of the plain shape element of FIGS. 51 and 52, as known from FIG. 2, the element of the present invention has about double the size of surface area which is formed by the dielectric film 1020 because of the structure of the cross-section taken along the line A-A of the FIG. 1.

It is the same as a case in which two elements are overlapped. Furthermore, the length of electric current path from the end part 1300 of the internal metal body lead terminals 1311 to the end part 1300 of the internal metal body lead terminal 1321 becomes about double. The transmission attenuation at 1 GHz of frequency indicated a value 30 dB greater than that of a linear single plate line capacitor.

FIG. 23 is a block diagram showing an example in which the helical capacitor of this embodiment is connected to an electrical circuit such as a DC power source.

When connecting the helical capacitor of this embodiment to an electrical circuit such as a DC power source, the electric circuit is connected to the external circuit connection parts 1321b, 1322b.

When arranging the helical capacitor 1000 of this embodiment to the CPU 1803 on the motherboard 1802 being a printed circuit board, which is used in the personal computer 1801, the helical capacitor 1000 is placed between the CPU 1803 and the substrate power supply 1804.

The internal metal body lead terminal 1311 of the helical capacitor 1000 and the CPU 1803 are connected via the power source line (+). The electrically conductive material layer lead terminal 1312 of the helical capacitor 1000 and the CPU 1803 are connected via the power source line (−).

The internal metal body lead terminal 1321 of the helical capacitor 1000 and the substrate power supply 1804 via the power source line (+). The electrically conductive material layer lead terminal 1322 of the helical capacitor 1000 and the substrate power supply 1804 are connected via the power source line (−).

Since the helical capacitor 1000 is located between the CPU 1803 and the substrate power supply 1804 and the helical capacitor 1000 suppresses the high-frequency power generated from the CPU 1803, a propagation of the high-frequency power to the substrate power supply 1804 is effectively suppressed.

A Second Embodiment

Next, in the second embodiment, the helical capacitor 1000 is sealed by a thermosetting resin.

Figure 24:
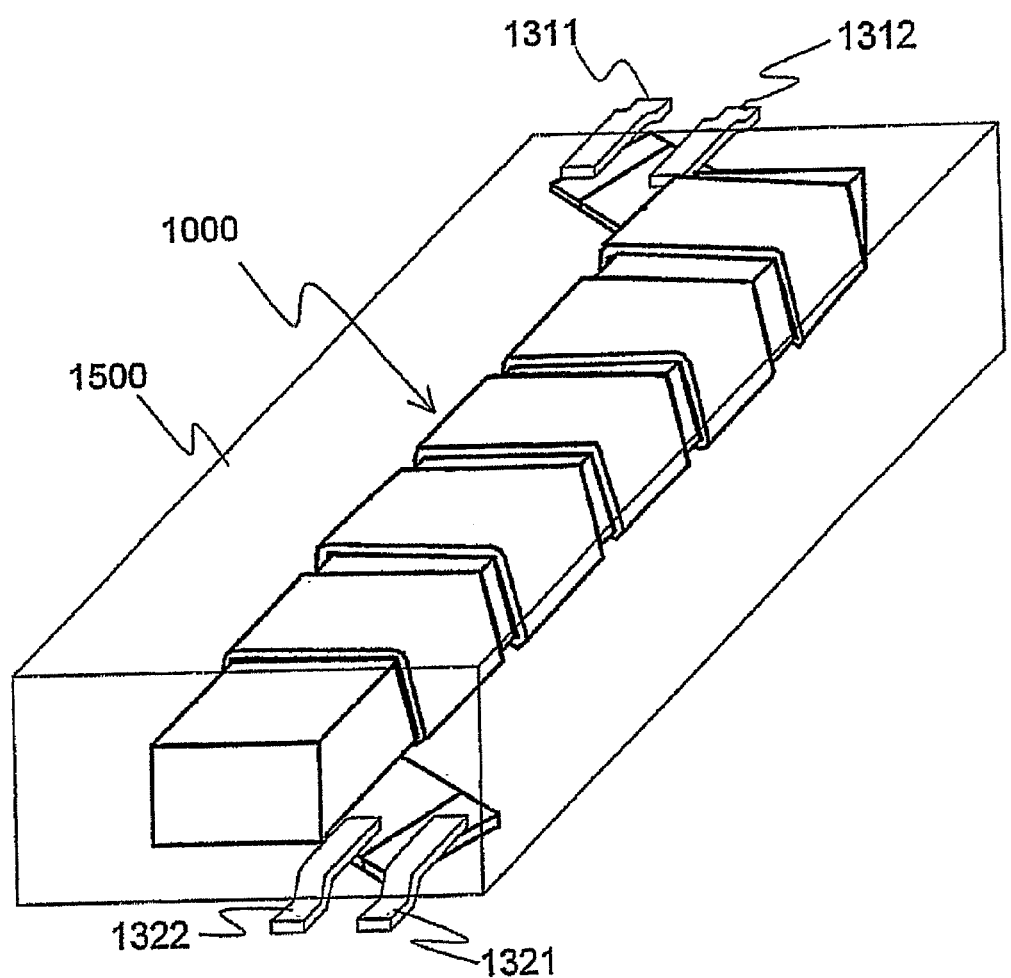
FIG. 24 is a perspective view showing a helical capacitor of a second embodiment of the present invention.
Figure 25:
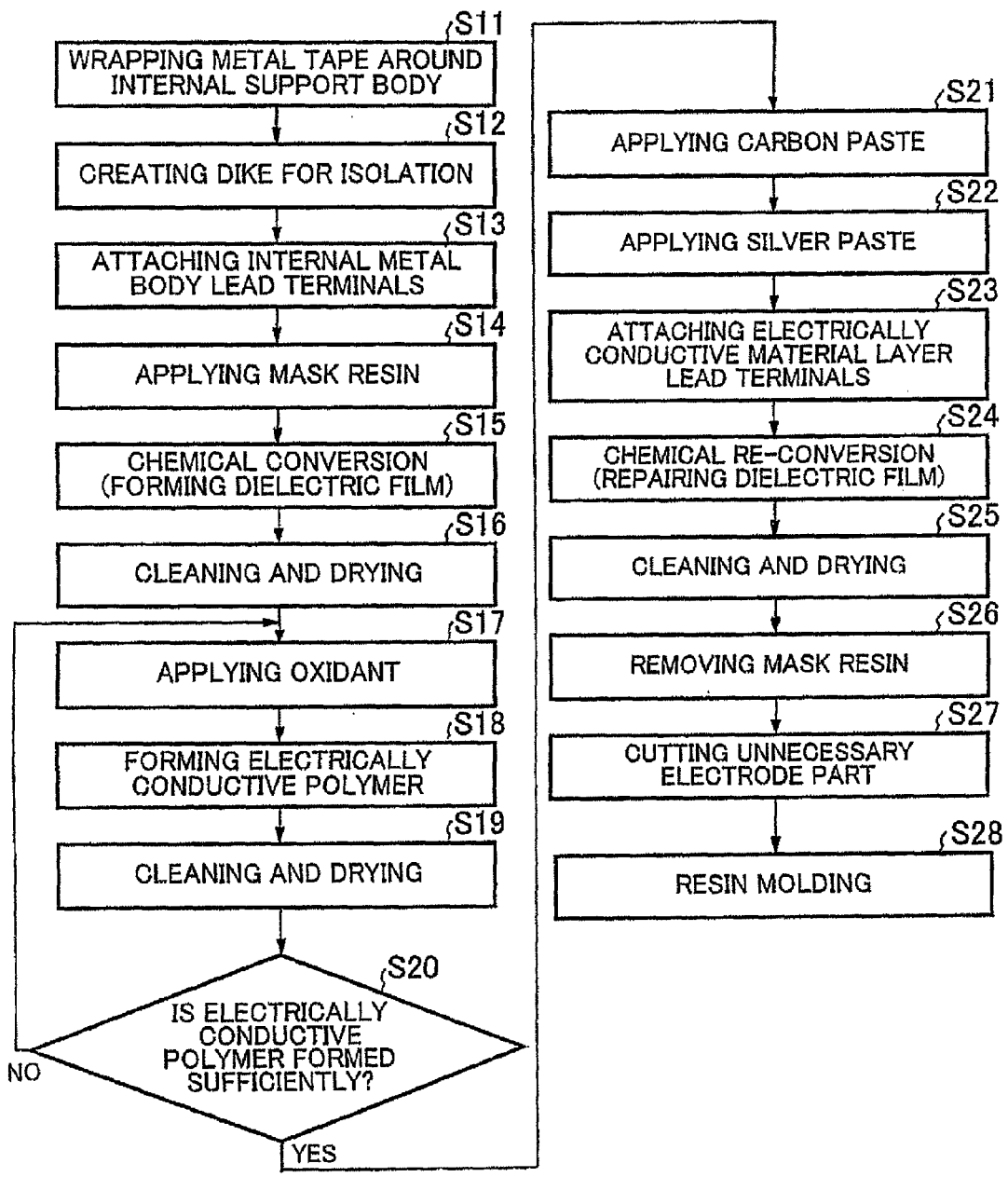
FIG. 25 is a flowchart showing a manufacturing step of the helical capacitor of the second embodiment of the present invention.
Figure 26:
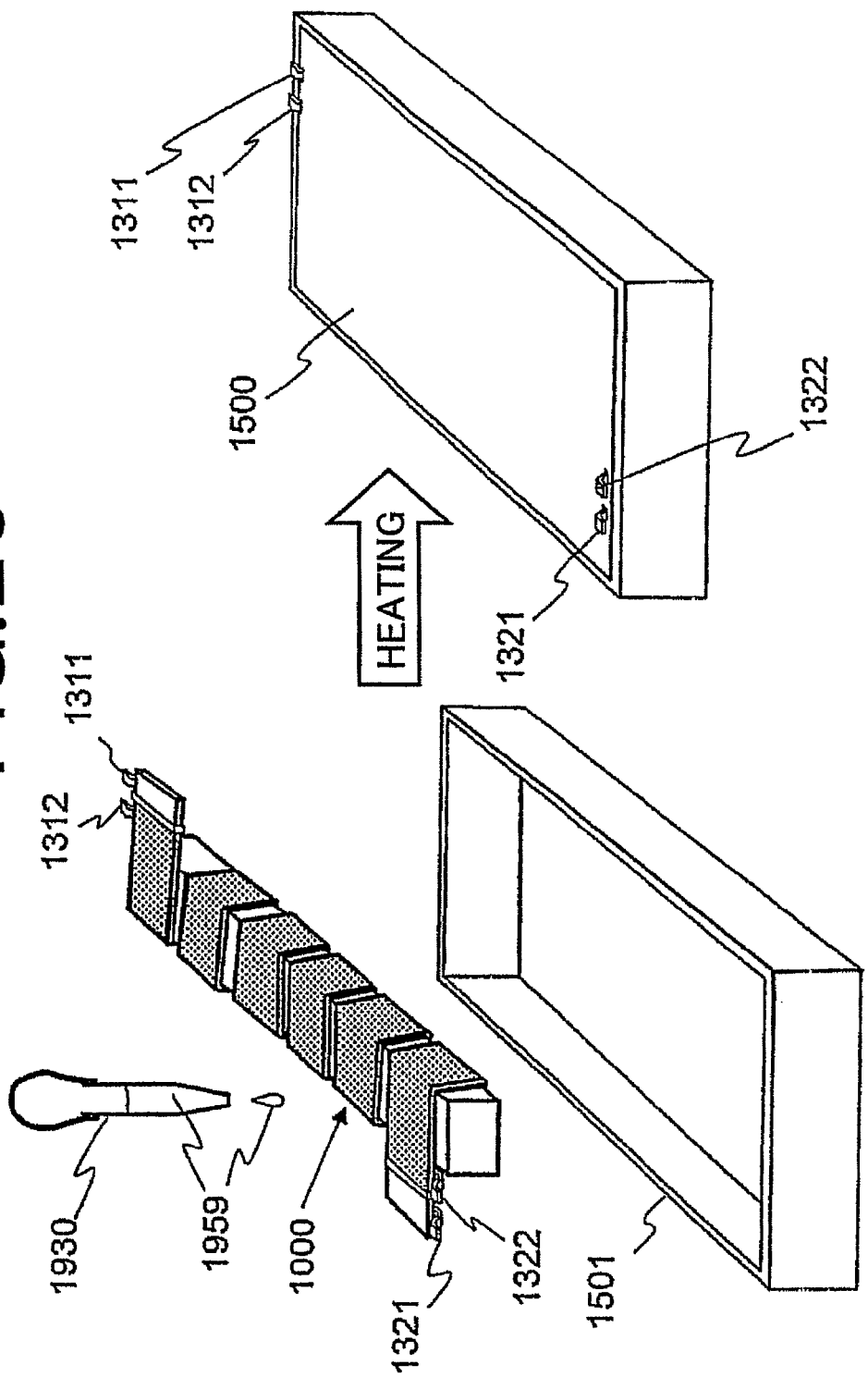
FIG. 26 is a view for illustrating a manufacturing step of the helical capacitor of the second embodiment of the present invention.

FIG. 24 is a perspective view showing a helical capacitor of the second embodiment of the present invention. FIG. 25 is a flowchart showing a manufacturing step of this embodiment. FIGS. 26 is an illustration for illustrating a manufacturing step of the helical capacitor.

As shown in FIG. 24, the line capacitor 1000 is covered by the mold 1500. The manufacturing step is almost the same as that of the first embodiment, and after Step S27 "Cutting unnecessary electrode part", the capacitor is molded by a resin.

[Resin Molding (Step S28)]

FIG. 26 is a view showing this step.

The case 1501 formed by an epoxy system resin is prepared.

The helical capacitor 1000 is put upside down into the case 1501, and a silicone resin system potting liquid is poured to fill the case 1501.

The potting liquid is heated to promote curing.

The potting liquid is cured to form the mold 1500.

The mold 1500 has only to be a material which does not prevent the insulation between the lead terminals 1311, 1312, 1321, and 1322, and it is possible to make a combination of two kinds of materials or more.

The capacitor can be covered by a metal avoiding the areas around the lead terminals 1311, 1312, 1321, and 1322.

Or, it is also possible to use a resin only for the areas around the lead terminals 1311, 1312, 1321, and 1322, and to use a metal or an electrically conductive material for other areas. For example, a metal can be used for the case 1501 to form the mold 1500.

A Third Embodiment

Next, it is possible to transform the cross-sectional shape of the internal support body 1200 of the first embodiment into a hexagonal shape to manufacture the helical capacitor.

Figure 27:
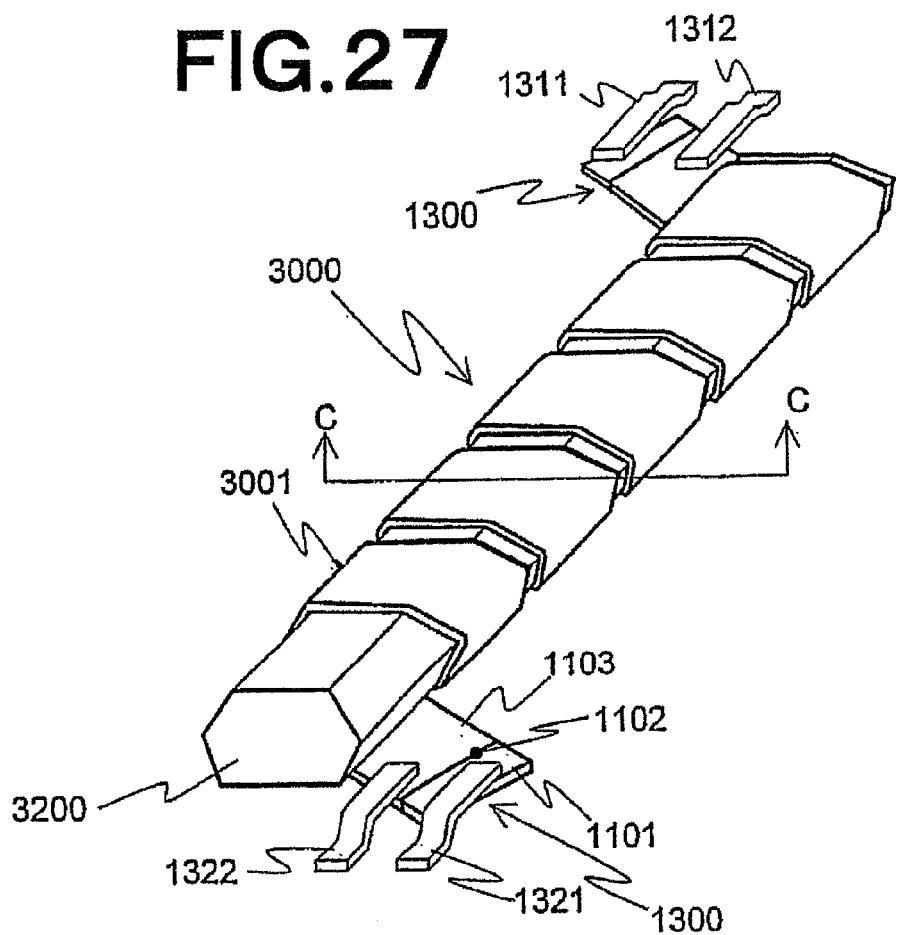
FIG. 27 is a perspective view showing a helical capacitor of a third embodiment of the present invention.
Figure 28:
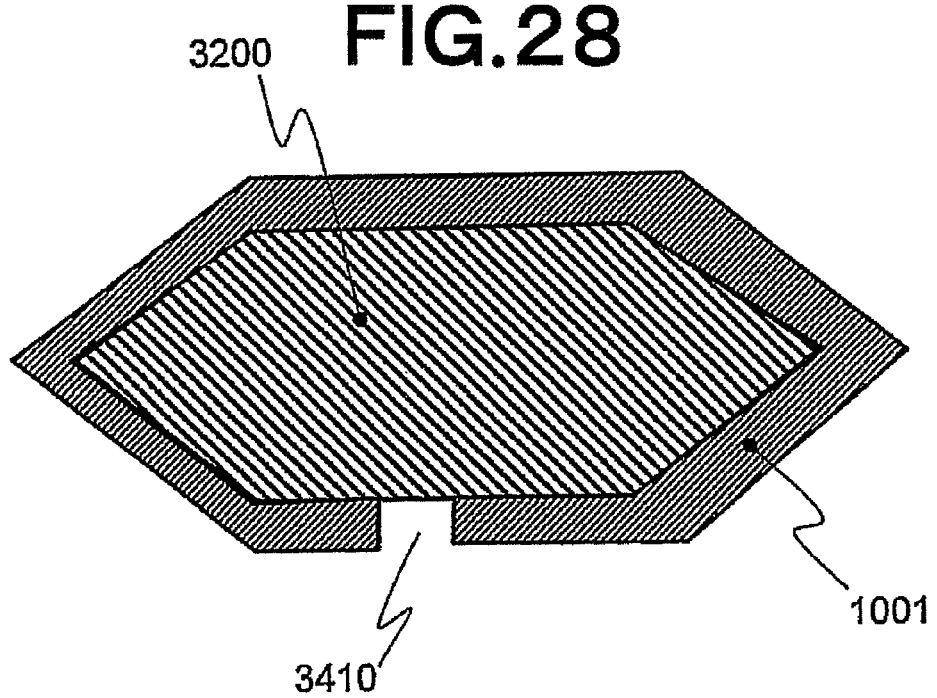
FIG. 28 is a cross-sectional view taken along the line C-C of FIG. 27.

FIG. 27 is a perspective view showing a helical capacitor of the third embodiment of the present invention. FIG. 28 is a cross-sectional view taken along the line C-C of FIG. 27. The third embodiment has the same configuration as that of the first embodiment except that the cross-sectional shape of the internal support body 3200 is hexagonal, and also the manufacturing step is the same as that of FIG. 6. The belt shape capacitor line 3001 is wrapped around the internal support body 3200. The cross-sectional shape is not limited to hexagonal, but can be any polygonal shape. When employing such a structure, there is a merit that the helical capacitor 3000 becomes steady and hard to roll. Here, the polygonal shape means a closed plane figure bounded by three or more line segments, including also triangle, quadrangle, pentagon, and heptagon or more.

A Fourth Embodiment

Next, it is possible to transform the cross-sectional shape of the internal support body 1200 of the first embodiment into an ellipse to manufacture the helical capacitor.

Figure 29:
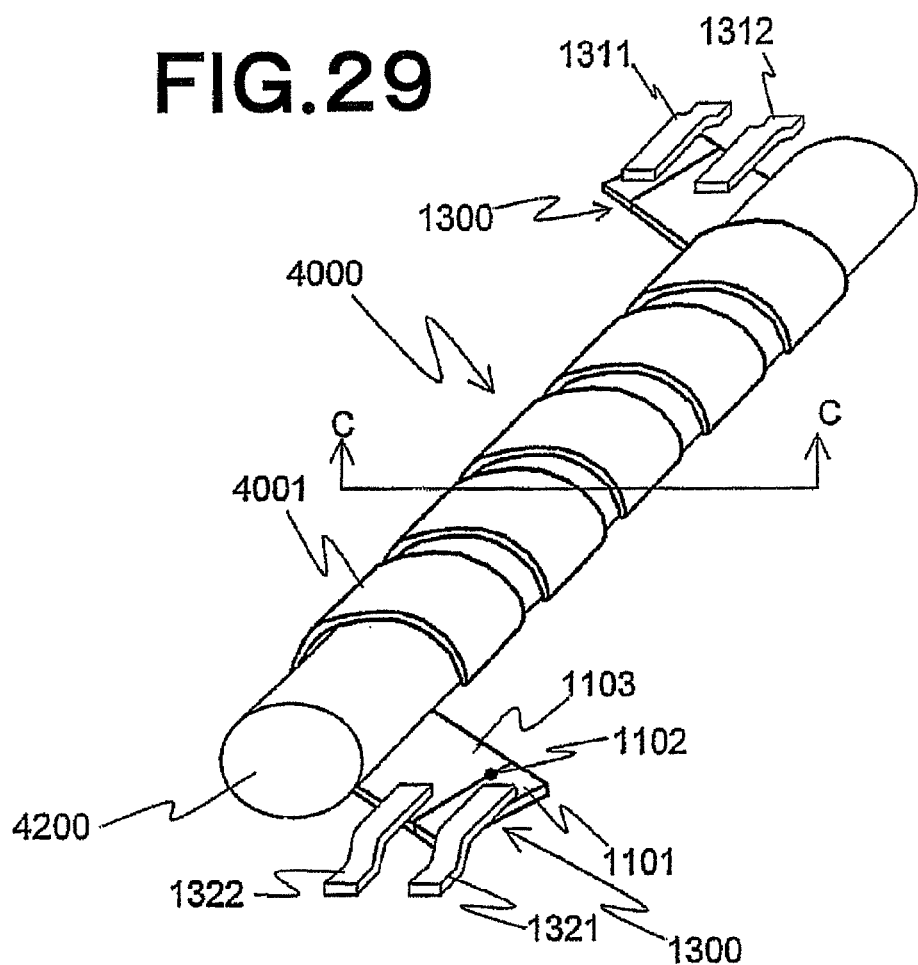
FIG. 29 is a perspective view showing a helical capacitor of a fourth embodiment of the present invention.
Figure 30:
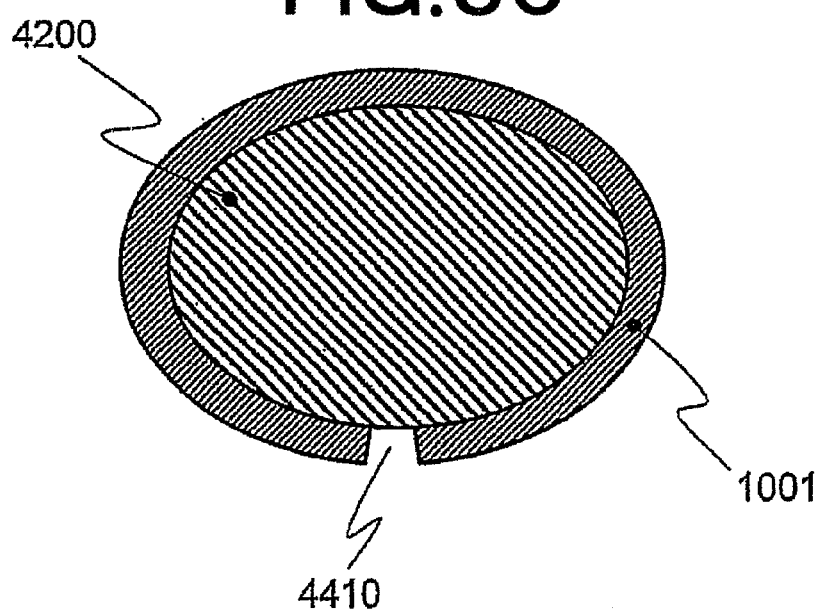
FIG. 30 is a cross-sectional view taken along the line C-C of FIG. 29.

FIG. 29 is a perspective view showing a helical capacitor of the fourth embodiment of the present invention. FIG. 30 is a cross-sectional view taken along the line C-C of FIG. 29. The fourth embodiment has the same configuration as that of the first embodiment except that the cross-sectional shape of the internal support body 4200 of the helical capacitor 4000 is ellipse, and also the manufacturing step is the same as that of FIG. 6.

The cross-sectional shape is not limited to ellipse, but can be any shape having no corner, including a perfect circle. When employing such a structure, a belt-shape line element is not bent sharply, so that there is a merit that a bending-stress to the belt shape capacitor line 4001 is reduced.

A Fifth Embodiment

Next, in this embodiment, the internal support body 2200 is manufactured using copper, and a resin made of hexafluoropropylene to be a mask resin is pasted on a part of corners and surfaces of the internal support body 2200 to form spacers 2401, 2402.

This mask resin is provided so that the internal support body 2200 and internal metal body 1011 are not electrically connected. Except for this process, the helical capacitor 2000 is formed according to the above mentioned procedure. In this way, by providing spacers, an electrically conductive internal support body can be used, so that a flexibility of material selection increases and the resistance value can be reduced.

FIG. 31 is a perspective view showing the helical capacitor of the fifth embodiment of the present invention. FIG. 32 is a cross-sectional view taken along the line C-C of FIG. 31. FIG. 33 is a view for illustrating a manufacturing step of the helical capacitor of this embodiment.

A different point from the first embodiment is to provide spacers 2401, 2402 in Step S11 "Wrapping a metal tape around an internal support body".

When forming the electrically conductive material layer 2130 which is an equivalent of the electrically conductive material layer 1030 of the first embodiment, the internal support body 2200 and the electrically conductive material layer 2030 are electrically connected.

Since a path having a small resistance is created because of this, it becomes advantageous when connecting the electrically conductive material layer lead terminals 1312, 1322 to a power line, especially to a ground line.

All or a part of the mask resin pasted on the internal support body 2200 is dissolved and removed when dipped into tetrahydrofuran after the capacitor line of belt shape 2100 is formed.

The material of the spacers 2401, 2402 need not be removed, and the material can be a material having plasticity characteristics when the material secures insulation.

A Sixth Embodiment

FIG. 34 is a perspective view showing a helical capacitor of the sixth embodiment of the present invention.

A helical capacitor 6000 is manufactured by replacing the internal support body 1200 of the first embodiment with a support body made of a transparent or semi-transparent resin.

Because of this, the helical shape of the belt shape capacitor 1001 can be visually grasped, and it is possible to represent symbols and three-dimensional patterns inside the internal support body 6200 so that usage/application, production information, and other information items can be effectively written and a calling for attention can be possible by coloring.

Specifically, the internal support body 6200 is made of glass, and the helical capacitor 6000 is manufactured in the same way as the first embodiment.

In this case, the mask resin is filled in the slit 6410, and the mask resin only has to be removed after the electrically conductive material layer 3031 is formed.

A Seventh Embodiment

Next, when manufacturing the internal support body 1200 of the first embodiment using a resin made of hexafluoropropylene which is a mask resin, a helical capacitor 7000 having no internal support body is obtained.

FIG. 35 is a perspective view showing a helical capacitor of the seventh embodiment of the present invention. The helical capacitor can be manufactured by the flowchart shown in FIG. 6, except for using a soluble material as an internal support body.

If the internal support body is made of a resin including hexafluoropropylene, when the internal support body is dipped into tetrahydrofuran in Step S26 "Step of removing mask resin" and the hexafluoropropylene which is the mask resin is dissolved, the internal support body is also dissolved and the helical capacitor 7000 having a hollow shape is obtained.

Other materials or members can be sealed in the hollow part.

An Eighth Embodiment

Figure 36:
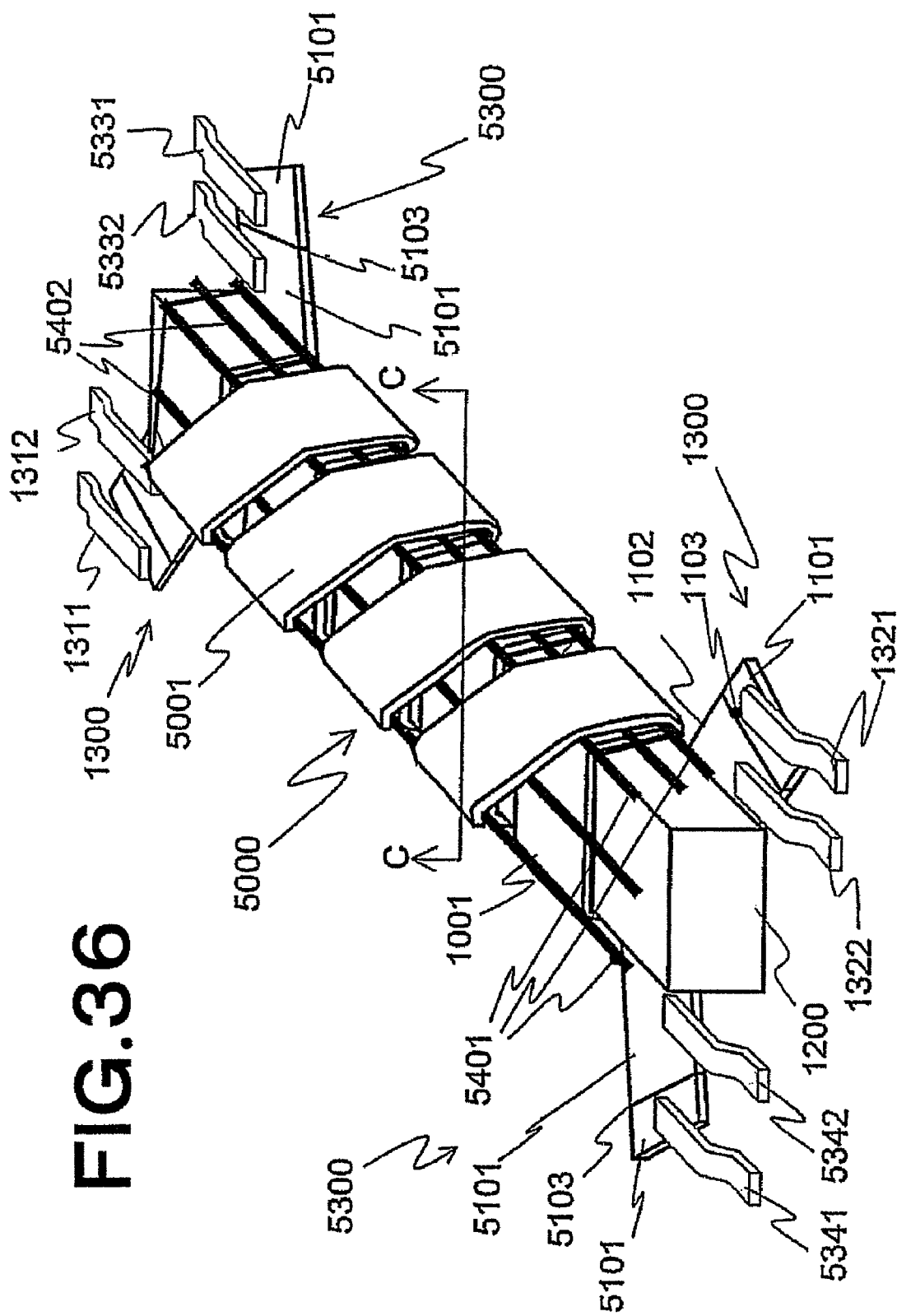
FIG. 36 is a perspective view showing a helical capacitor of an eighth embodiment of the present invention.
Figure 37:
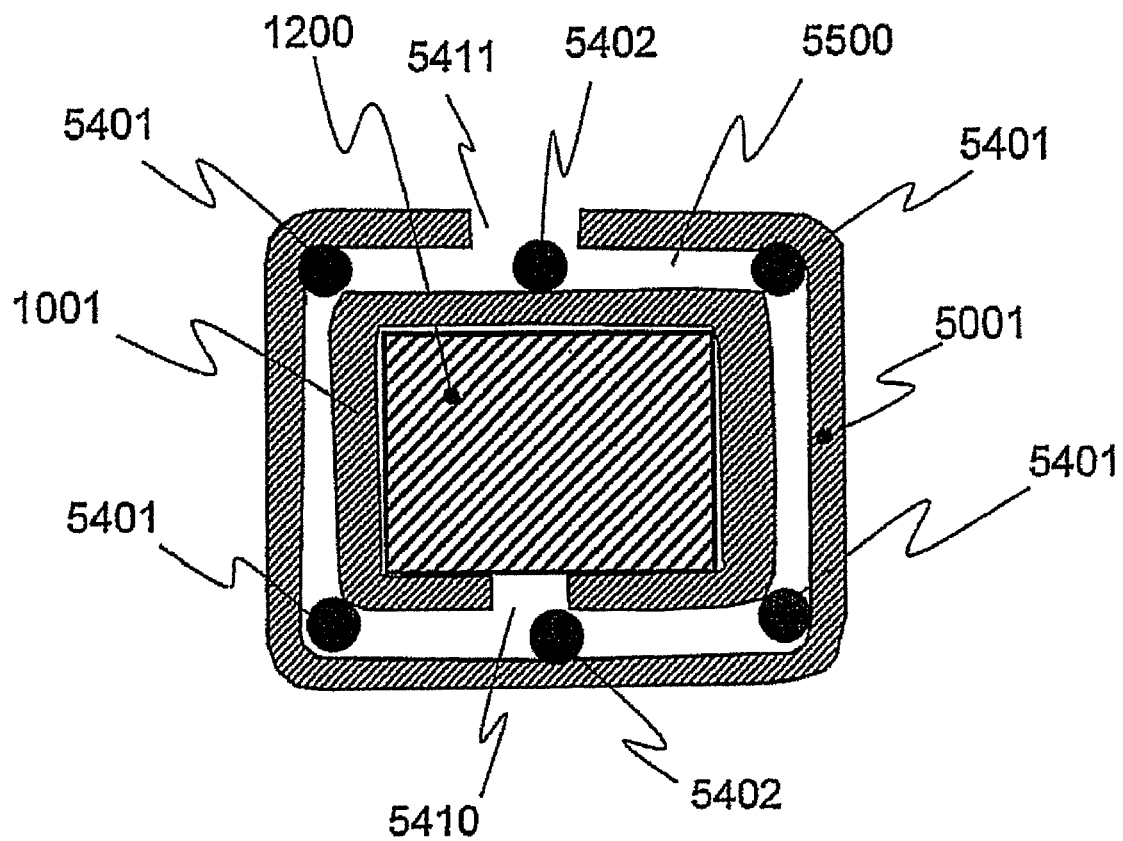
FIG. 37 is a cross-sectional view taken along the line C-C of FIG. 36.
Figure 38:
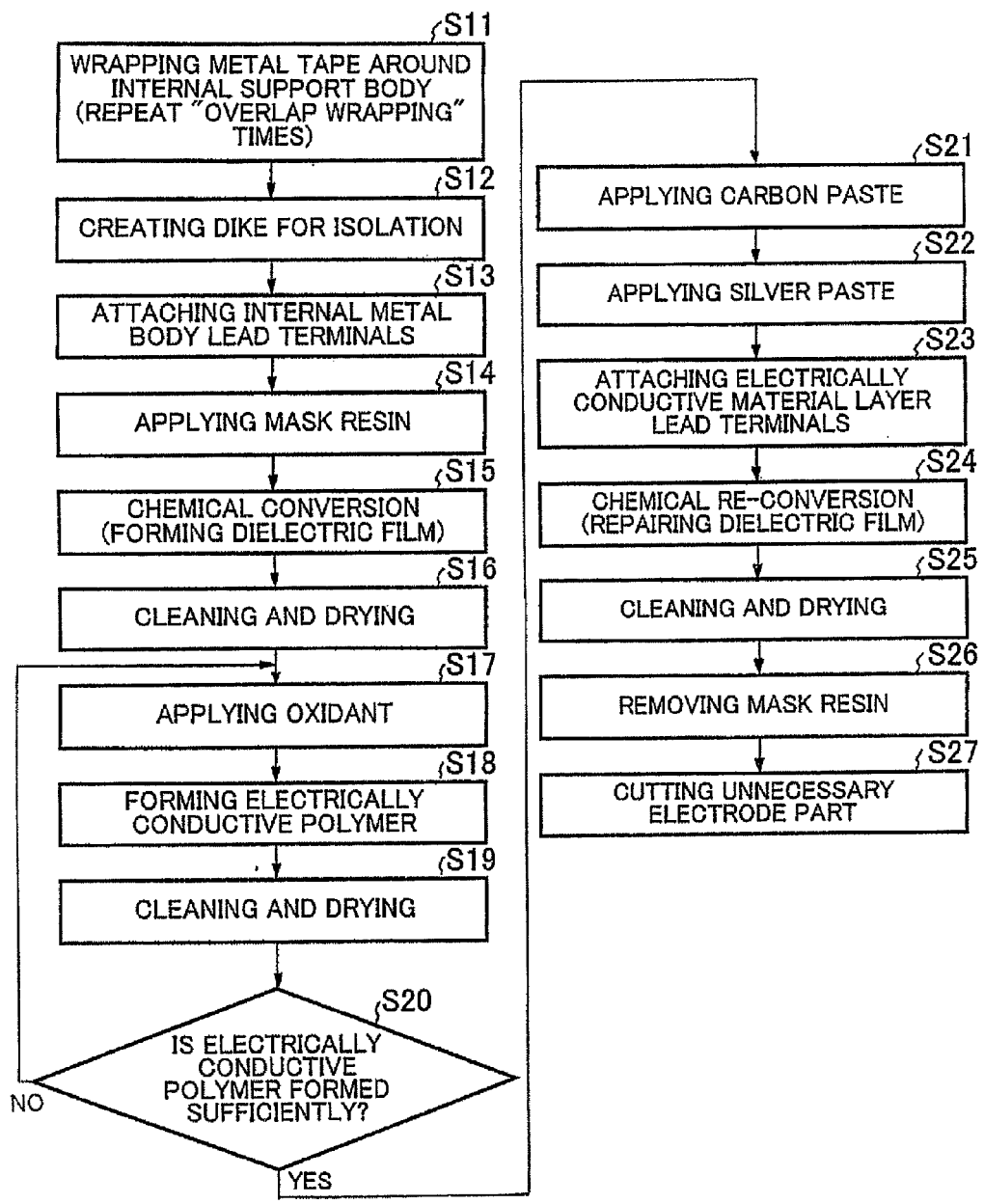
FIG. 38 is a flowchart showing a manufacturing step of the helical capacitor of the eighth embodiment of the present invention.
Figure 39:
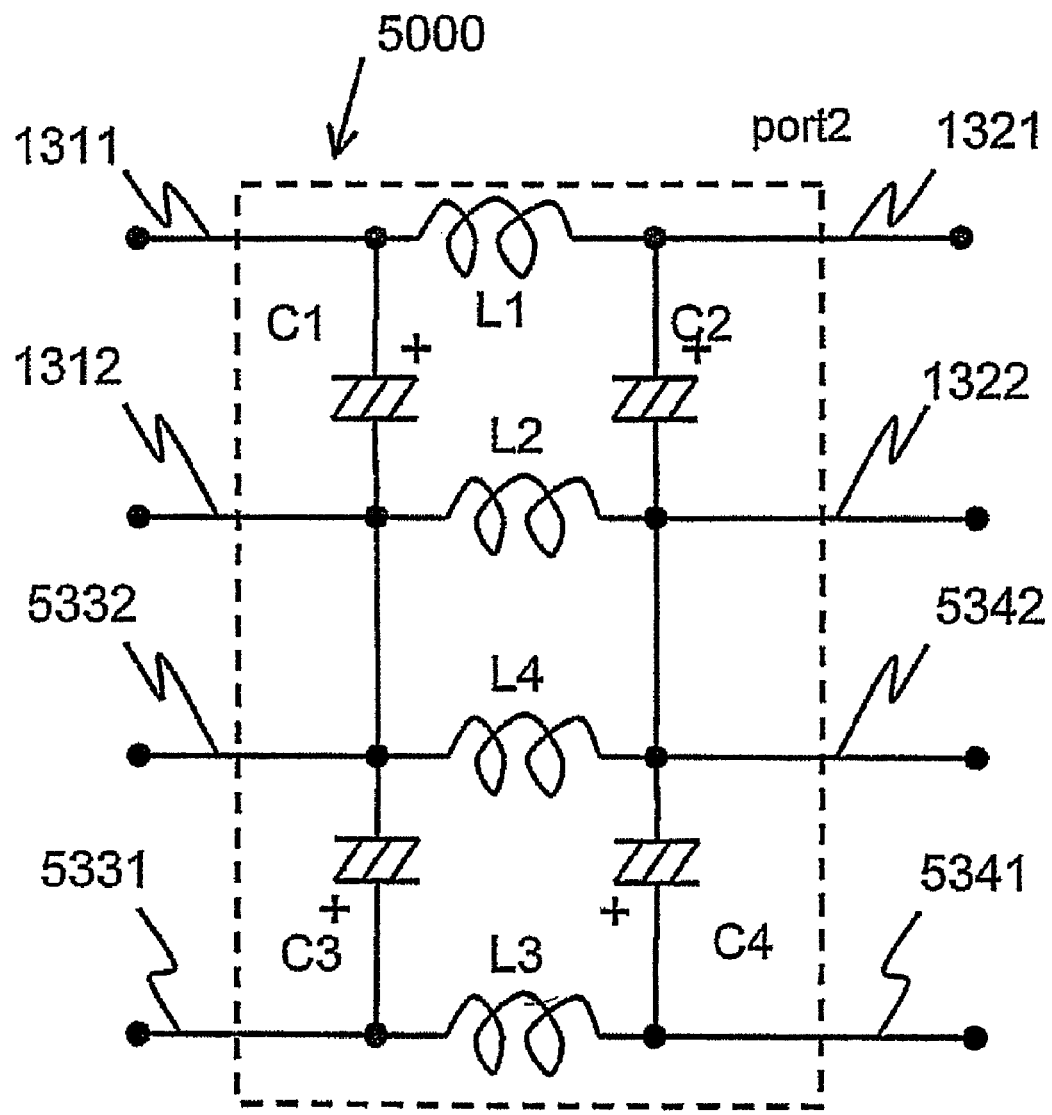
FIG. 39 is an equivalent circuit diagram showing a configuration of the helical capacitor of the eighth embodiment of the present invention.

FIG. 36 is a perspective view showing a helical capacitor of the eighth embodiment of the present invention. FIG. 37 is a cross-sectional view of the cross-section taken along the line C-C of FIG. 36. FIG. 38 is a flowchart of a manufacturing step of this embodiment. FIG. 39 is an equivalent circuit diagram showing a configuration of this embodiment.

In this embodiment, a first belt shape capacitor 1001 having a plate thickness of 0.1 mm is wrapped around the internal support body 5200 having width of about 4 mm, height of about 2 mm, and length of about 20 cm, and spacers 5401, 5402 are provided to the internal support body 5200, and further a second belt shape capacitor 5001 is wrapped around the internal support body 5200.

The internal metal body lead terminals 1311, 1321 and the electrically conductive material layer lead terminals 1312, 1322 are provided at the end parts 1300 of the first belt shape capacitor line 1001.

The internal metal body lead terminals 5311, 5321 and the electrically conductive material layer lead terminals 5312, 5322 are provided at the end parts 5300 of the second belt shape capacitor line 5001.

As shown in FIG. 37, the slit 5410 is formed by the first belt shape capacitor 1001, and the slit 5411 is formed by the second belt shape capacitor 5001. When wrapping the metal tape around the internal metal body, spacers are provided so that the internal metal body 1100 of the first belt shape capacitor 1001 does not touch the second internal metal body 5100. If spacers are further provided outside the second belt shape capacitor 5001, a third belt shape capacitor can be formed.

After the step of forming the electrically conductive polymer, the electrically conductive material layer 1030 of the first belt shape capacitor 1001 and the electrically conductive material layer 5030 of the second belt shape capacitor 5001 are electrically conducted. This is the same for the third, fourth, and more belt shape capacitor.

As a result, an element of the equivalent circuit shown in FIG. 39 can be realized.

The terminal 1312 and the terminal 5332 have a common electrical potential, and the circuit functions when either of the terminals is connected.

Since the connection from the terminal 1312 to the terminal 1322 is a parallel connection of L2 and L4, the series inductance from the terminal 1312 to the terminal 1322 becomes just a half.

When connecting the terminal 1311 and the terminal 5332 to separate electrical circuits (power sources) respectively, one element can be used for two kinds of voltages.

In addition, when the terminals 1312, 5332 are not connected and a voltage is applied between the terminal 1311 and the terminal 5331, the element can be used as a nonpolar element.

As mentioned above, by wrapping one or more capacitor lines of belt shape as covering a capacitor line of belt shape, the capacitor by itself can be used for a plurality of power supply voltages and signal circuits. Therefore, when changing the connection terminals, it is possible to perform a function as a nonpolar element. In addition, by changing the connection method, it is possible to apply the element to power supply lines and signal lines in which the direction of power source voltage is not determined.

A Ninth Embodiment

Figure 40:
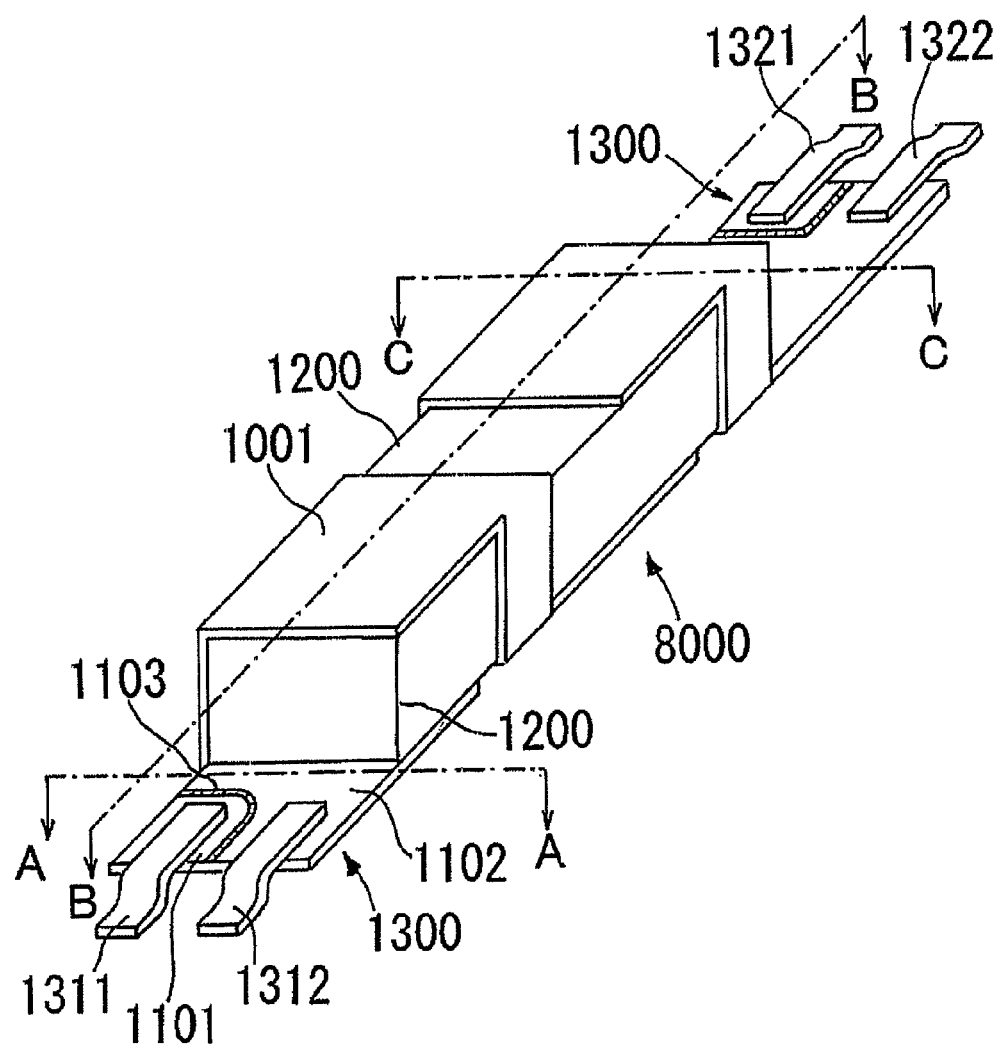
FIG. 40 is a perspective view showing a helical capacitor of a ninth embodiment of the present invention.
Figure 41:
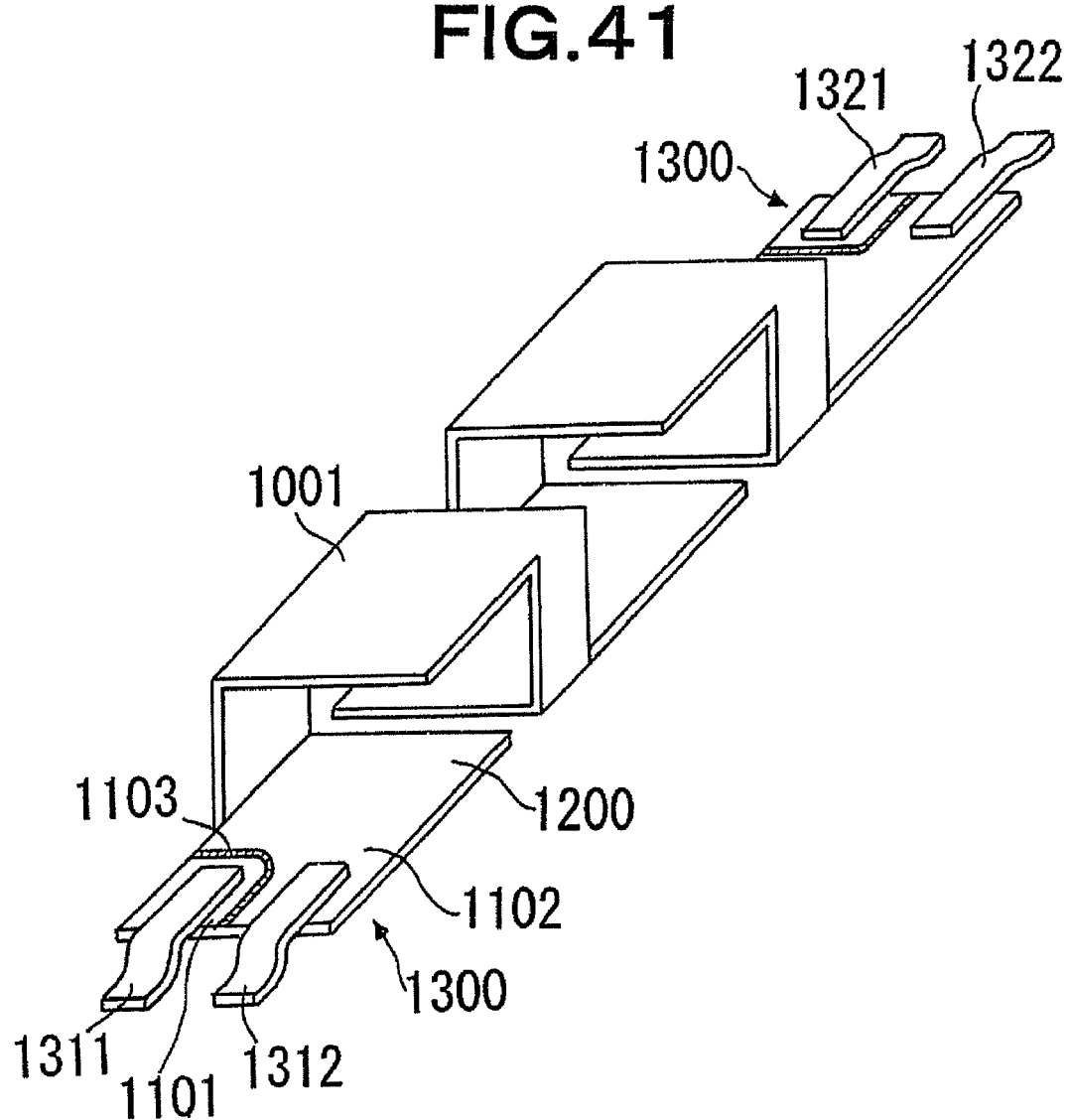
FIG. 41 is a perspective view showing the helical capacitor of the ninth embodiment of the present invention, excluding a support body.
Figure 42:
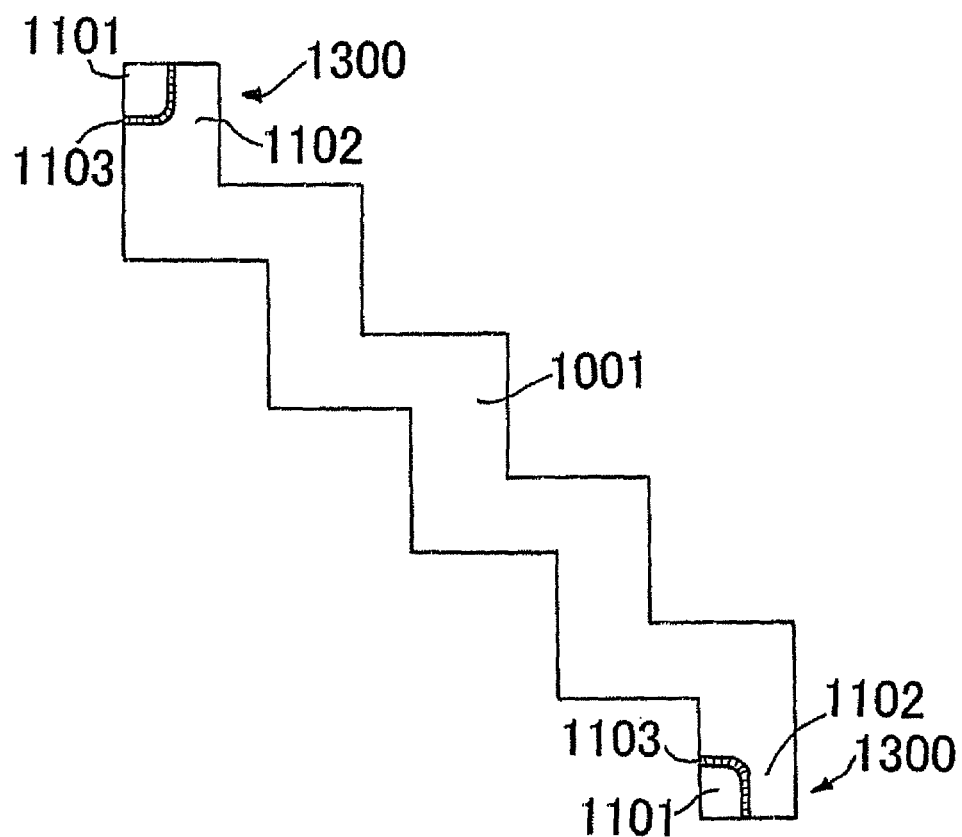
FIG. 42 is a developed view of an internal metal body of the helical capacitor of the ninth embodiment of the present invention.
Figure 43:
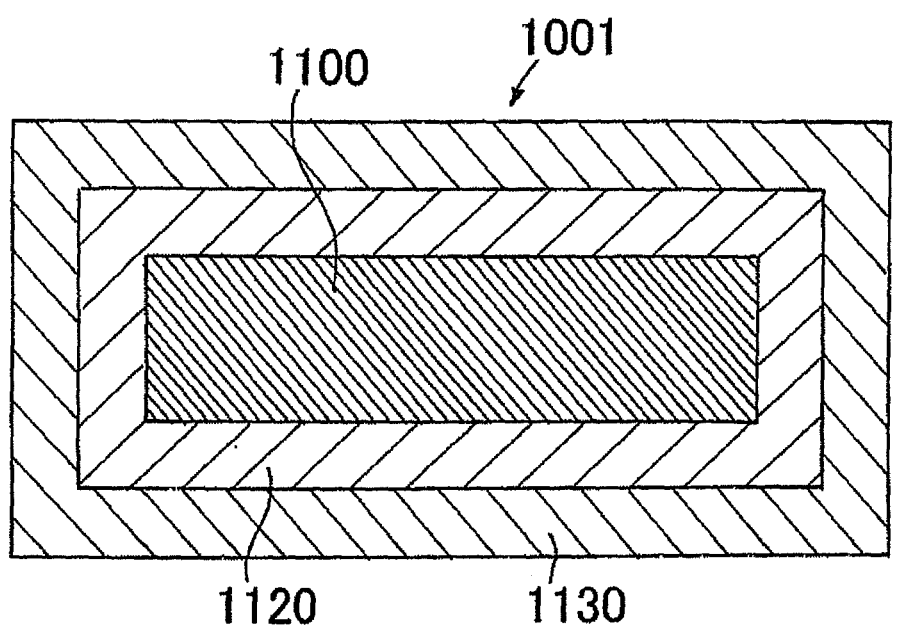
FIG. 43 is a cross-sectional view taken along the line A-A of FIG. 40.
Figure 44:
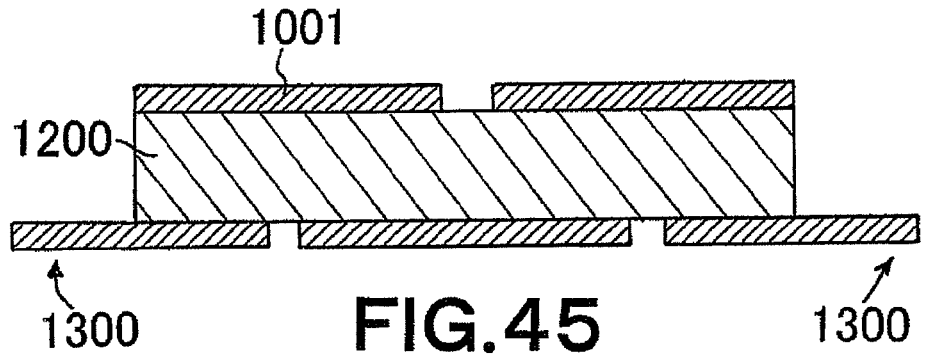
FIG. 44 is a cross-sectional view taken along the line B-B of FIG. 40.
Figure 45:
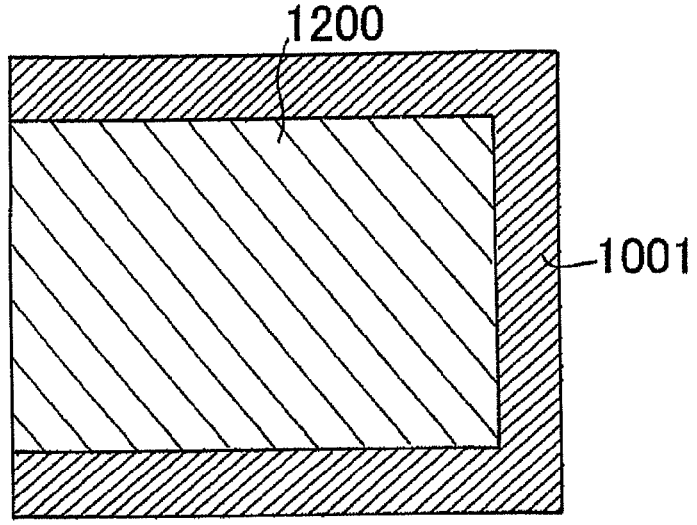
FIG. 45 is a cross-sectional view taken along the line C-C of FIG. 40.

FIG. 40 is a perspective view of a helical capacitor of the ninth embodiment of the present invention. FIGS. 41 is a perspective view of the helical capacitor excluding the support body. FIG. 42 is a developed view of the internal metal body, FIG. 43 is a cross-sectional view taken along the line A-A of FIG. 40, FIG. 44 is a cross-sectional view taken along the line B-B of FIG. 40, and FIG. 45 is a cross-sectional view taken along the line C-C of FIG. 40. In this embodiment, as shown in FIGS. 40 to 42, the internal metal body 1100 having a plate thickness of 0.1 mm is wrapped around the internal support body 1200 having width of about 4 mm, height of about 2 mm, and length of about 20 cm, and the internal metal body exposure part 1101 which is separated by the isolation wall (wall for isolation) 1103 is provided at both end parts 1300 of the internal metal body 1100. After forming the dielectric film 1120 on an area other than the internal metal body exposure part 1101 on the internal metal body 1100, the electrically conductive material layer 1130 is provided, so that the belt shape capacitor line 1001 is constituted. The internal metal body lead terminals 1311, 1321 are provided at the internal metal body exposure part 1101, and the electrically conductive material layer lead terminals 1312, 1322 are provided at the electrically conductive material layer exposure part 1102.

A manufacturing step of this embodiment will be described in order. A polyethylene terephthalate (PET) is fabricated to obtain the internal support body 1200. Next, after an aluminum plate having a plate thickness of 0.1 mm is fabricated into a shape shown in FIG. 42, and the isolation wall 1103 is formed by a thermosetting resin, a resin including hexafluoropropylene which is a mask resin is pasted on an area of the internal metal body exposure part 1101. Before the mask resin is pasted, a line for applying a chemical conversion voltage is connected to one point of the area of the internal metal body exposure part 1101. After dipping the internal metal body 1100 into an ammonium borate aqueous solution, an anodic oxidation is performed by applying a voltage of 10 V. By cleaning and drying, the dielectric film 1120 made of a metal oxide layer (aluminum oxide) is formed on the surface of the internal metal body 1100.

Next, the internal metal body 1100 on the surface of which the dielectric film 1120 is formed is wrapped around the internal support body 1200, and then, the internal support body 1200 wrapped by the internal metal body 1100 is dipped into an ammonium borate aqueous solution, and a chemical re-conversion is performed by applying a voltage of 10 V. By doing so, the damaged dielectric film is repaired. After cleaning and drying, an ethanol solution including 10 percent by mass concentration of ferric dodecylbenzenesulfonate is adjusted, and the internal metal body 1100 wrapping around the internal support body 1200 is dipped into this solution, and then taken out. After drying this in air at room temperature for 30 minutes, it is dipped into a water solution including 50 percent by mass concentration of ethylenedioxythiophene, taken out, held in air for 30 minutes, to perform a polymerization of ethylenedioxythiophene.

After that, it is cleaned with methanol and water, and dried at 80° C. This operation is repeated 4 times so that the dielectric film 1120 is covered by an electrically conductive polymer. This electrically conductive polymer includes polyethylenedioxythiophene including dodecylbenzenesulfonate as a dopant. The electrically conductive polymer has a function in which when a large current flows, it is heated to insulate the large current path. In short, it has functions to repair defect and prevent short circuit. In this way, the belt shape capacitor line 1001 having an electrically conductive polymer layer without defect is obtained. This belt shape capacitor line 1001 is dipped into a solvent solution including carbon graphite, taken out, and dried at room temperature. And then when a surface of the carbon graphite is dried, the belt shape capacitor line 1001 is dipped into a silver paste, taken out, and dried at 60° C. for 15 minutes. And the belt shape capacitor line 1001 is left as it is at room temperature for 3 hours. So far, the belt shape capacitor line 1001 on which the electrically conductive material layer 1130 including the electrically conductive polymer, the carbon graphite, and the silver paste is pasted has been obtained. FIG. 43 shows a cross-sectional view of the capacitor line of belt shape. This is a cross-sectional view taken along the line B-B of FIG. 40.

This belt shape capacitor line 1001 is dipped into tetrahydrofuran to dissolve the hexafluoropropylene which is a mask resin, and the hexafluoropropylene is removed along with the electrically conductive polymer, the carbon graphite, and the silver paste on the internal metal body exposure part 1101, and then the internal metal body lead terminals 1311, 1321 are attached by resistance welding. The electrically conductive material layer lead terminals 1312, 1322 are attached to the electrically conductive material layer exposure part 1102 by using a thermosetting silver paste, and the thermosetting silver paste is thermally cured at 100° C. for 90 minutes, and then the helical capacitor 8000 equipped with the lead terminals is obtained. A positional relationship between the belt shape capacitor line 1001 and the internal support body 1200 is shown in FIGS. 44 and 45.

Here, the dielectric film need not necessarily be a metal oxide film, but it can be an insulating dielectric film made of a resin, and the material is not particularly limited. Although a metal (aluminum) having a valve action is used for the internal metal body 1100 in order to obtain the metal oxide film, the internal metal body 1100 can be a metal which does not have the valve action or can be a material which has an electrical conductivity by selecting the dielectric film. For the electrically conductive material layer 1130, it is not necessary to select a material which has functions to repair defect and prevent short circuit, if defects in the dielectric film 1120 are acceptable, and the material only has to have an electrical conductivity. The electrically conductive polymer can be not only polyethylenedioxythiophene but also at least one compound selected from the group consisting of polypyrrole, polythiophene, and polyaniline, or a derivative of the compound. As a metal having the valve action, a metal selected from the group consisting of aluminum, tantalum, niobium and titanium is industrially stable, and it is also possible to use other metals which have the valve action because necessary electrical characteristics can be obtained. The internal support body only has to support the capacitor line of belt shape in a three-dimensional form, and any material can be used as the internal support body if thermal and mechanical requirements are satisfied.

The element of this embodiment has about double the size of surface area where the dielectric film 1020 is formed, compared with the element shown in FIG. 52 whose metal plate 10 has a linear shape, when their element lengths are the same. Furthermore, the length of electric current path from one end part 1300 to the other end part 1300 becomes about double. The transmission attenuation at 1 GHz of frequency indicated a value 30 dB greater than that of a linear single plate line capacitor.

A Tenth Embodiment

The internal support body 1200 is manufactured using copper, and a resin made of hexafluoropropylene which is a mask resin is pasted on a part of corners and surfaces of the internal support body 1200. This mask resin is provided so that the internal support body 1200 and internal metal body 1100 are not electrically connected. Except for this process, the helical capacitor 8000 is formed by the same procedure as that of the ninth embodiment mentioned above. After the belt shape capacitor line 1001 is formed, the mask resin pasted on the internal support body 1200 is dissolved and removed when dipped into tetrahydrofuran. Since the mask resin is pasted on only a part of the surface, when forming the belt shape capacitor line 1001, the electrically conductive material layer 1130 and the internal support body 1200 are electrically connected, and the helical capacitor having the internal support body made of metal which is connected to the electrically conductive material layer 1130 is obtained.

An Eleventh Embodiment

Figure 46:
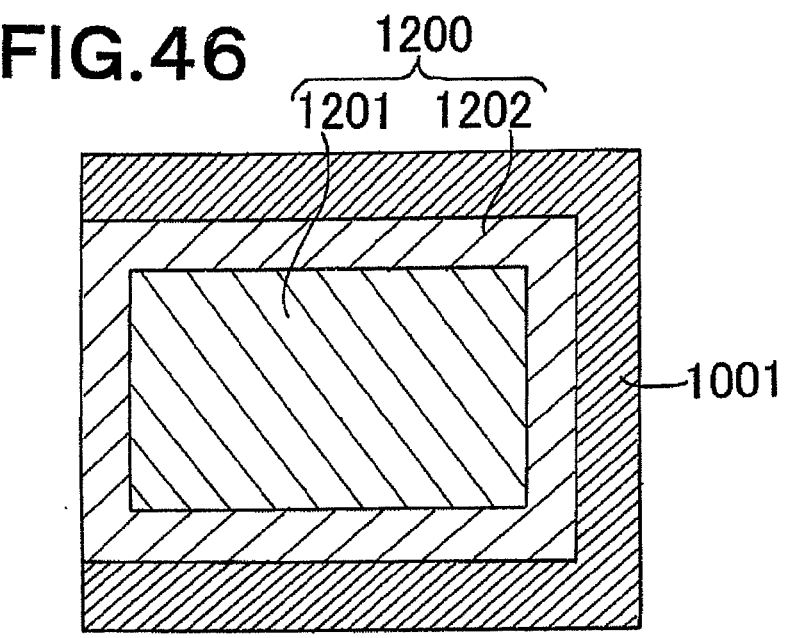
FIG. 46 is a cross-sectional view showing a helical capacitor of an eleventh embodiment of the present invention.

FIG. 46 is a cross-sectional view showing a helical capacitor of an eleventh embodiment of the present invention. The internal support body 1200 is formed by covering the aluminum quadratic prism 1201 with the fluorine resin film 1202. Next, in the same way as the ninth embodiment, after the isolation wall 1103 is formed by a thermosetting resin on the internal metal body 1100, and the mask resin is pasted on an area of the internal metal body exposure part 1101, an etching is performed to increase the surface area. After that, the helical capacitor 8000 is manufactured in the same procedure as that of the ninth embodiment. In this way, the helical capacitor 8000 having a large capacity and including the internal support body 1200 which includes two or more kinds of materials and has a cross-section shown in FIG. 46 is obtained. Here, the materials constituting the internal support body 1200 only have to be two or more kinds of materials, and there is no limit to a combination of the materials. For example, when the combination is an air 1201 and a resin 1202, it can be light in weight, and when the combination is an aluminum core 1201 and a resin film 1202, it will have an advantage in strength.

A Twelfth Embodiment

An internal support body 1200 having the same shape as that of the ninth embodiment is formed by using a Mn—Zn system ferrite. After that, the helical capacitor 8000 is manufactured in the same procedure as that of the ninth embodiment. In this way, the inductance value of the capacitor line of belt shape 1100 having a helical shape is improved, and a transmission attenuation in high-frequency can be further increased compared with when using an internal support body made of a nonmagnetic material. The magnetic material which can be used is not limited to the above ferrite, but any highly magnetically permeable material can be arbitrarily employed. In addition, also, the shape and structure are not limited to the above. Therefore, a structure in which a tube body and a nonmagnetic body core are covered with a magnetic body, a structure in which a magnetic body core is covered with a nonmagnetic body, and a structure in which a plurality of magnetic body bars are put into a nonmagnetic body base material can be possible.

A Thirteenth Embodiment

Figure 47:
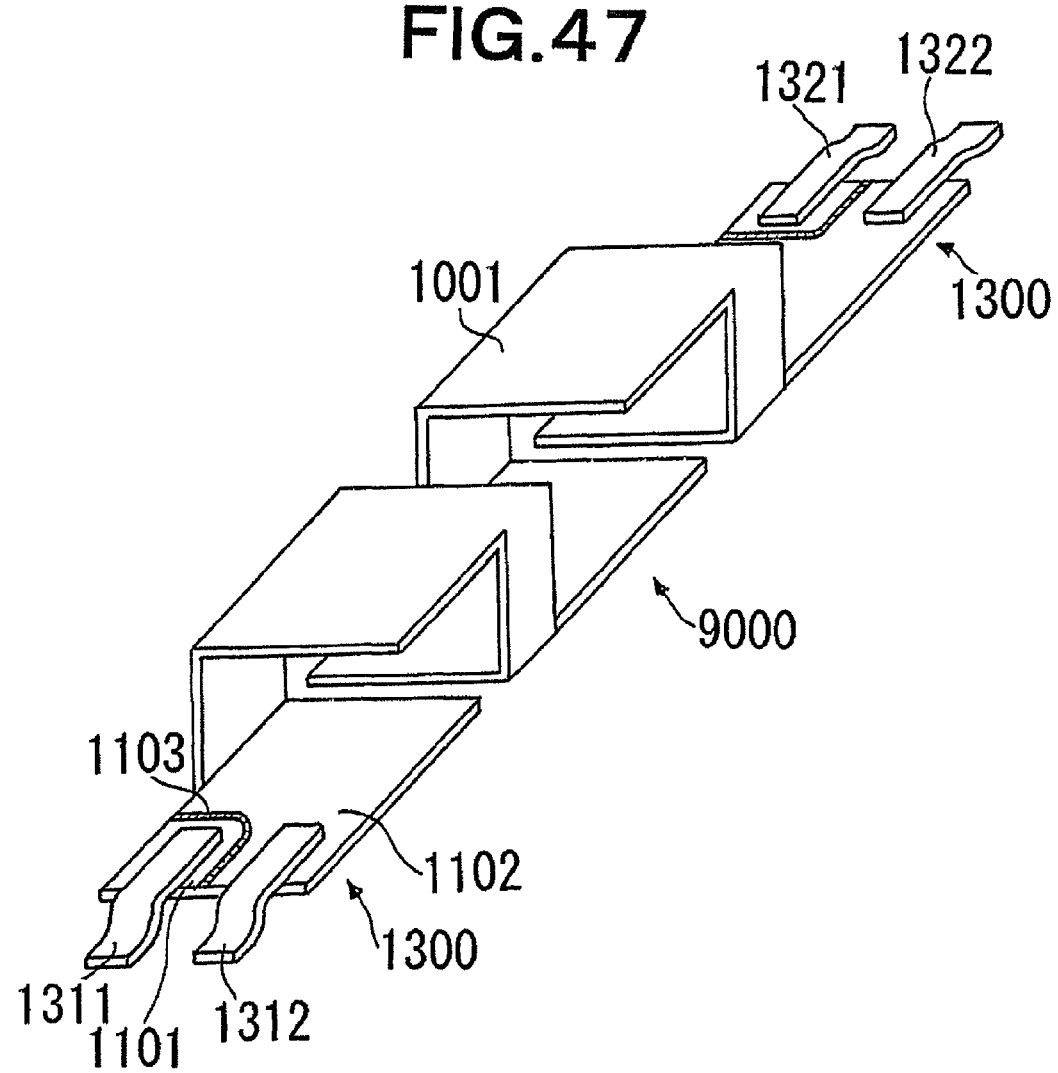
FIG. 47 is a perspective view showing a helical capacitor of a thirteenth embodiment of the present invention.

FIG. 47 is a perspective view showing a helical capacitor of the thirteenth embodiment of the present invention. After the internal support body 1200 is manufactured using a resin including hexafluoropropylene which is a mask resin, and the capacitor line of belt shape 1100 is formed according to the above mentioned procedure, the capacitor line of belt shape 1100 is dipped into tetrahydrofuran to dissolve the hexafluoropropylene which is the mask resin, and the hexafluoropropylene is removed along with the electrically conductive polymer, the carbon graphite, and the silver paste on the internal support body 1200 and the internal metal body exposure part 1101. The internal metal body lead terminals 1311, 1321 are attached to the internal metal body exposure part 1101 by resistance welding. The electrically conductive material layer lead terminals 1312, 1322 are attached to the electrically conductive material layer exposure part 1103 by using a thermosetting silver paste, and the thermosetting silver paste is thermally cured at 100° C. for 90 minutes, and then the helical capacitor 9000 (FIG. 47) having a hollow shape is obtained.

A Fourteenth Embodiment

A temporary support body having the same structure as that of the internal support body 1200 of the ninth embodiment is manufactured. Next, after an aluminum plate having a plate thickness of 0.2 mm is fabricated into a shape shown in FIG. 42, and the isolation wall 1103 is formed by a thermosetting resin, and further a resin including hexafluoropropylene which is a mask resin is pasted on an area of the internal metal body exposure part 1101, an anodic oxidation is performed to make the dielectric film 1120 made of an aluminum oxide on the surface of the internal metal body 1110. Next, after wrapping the internal metal body 1100 on the surface of which the dielectric film 1120 is formed around the temporary support body which is fabricated beforehand, and performing a chemical re-conversion to the temporary support body wrapped by the internal metal body 1100 in an ammonium borate aqueous solution, the temporary support body is pulled out from the internal metal body 1100 having the dielectric film 1120. After that, in the same procedure as that of the ninth embodiment, the electrically conductive material layer 1130 including the electrically conductive polymer layer, the carbon graphite layer, and the silver paste layer is formed. These materials in this process are dipped into tetrahydrofuran to dissolve the hexafluoropropylene which is a mask resin, and the hexafluoropropylene is removed along with the electrically conductive polymer, the carbon graphite, and the silver paste on the internal metal body exposure part 1101. The internal metal body lead terminals 1311, 1321 are attached to the internal metal body exposure part 1101 by resistance welding, and the electrically conductive material layer lead terminals 1312, 1322 are attached to the electrically conductive material layer exposure part 1102 by using a thermosetting silver paste to be thermally cured, and then the helical capacitor having a hollow shape and having all the dielectric film 1120 covered with the electrically conductive material layer 1130 is obtained.

A Fifteenth Embodiment

Figure 48:
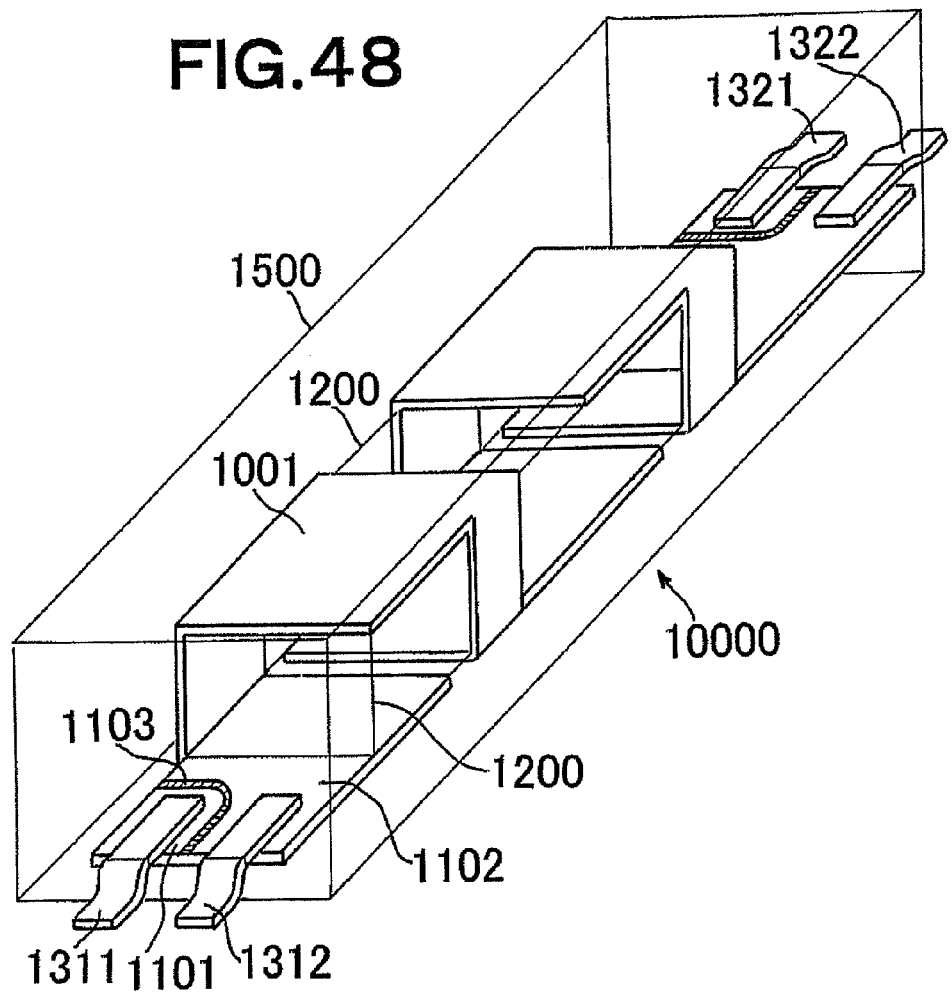
FIG. 48 is a perspective view showing a helical capacitor of a fifteenth embodiment of the present invention.

FIG. 48 is a perspective view showing a helical capacitor of the fifteenth embodiment of the present invention. The helical capacitor 8000 manufactured in the ninth embodiment is sealed by a thermosetting resin, to obtain the helical capacitor 10000 (FIG. 48) having the resin mold 1500. The helical capacitors manufactured in other embodiments, such as the helical capacitor 9000 manufactured in the thirteenth embodiment, can also be sealed. The resin mold 1500 has only to be a material which does not prevent the insulation between the lead terminals 1311, 1312, 1321, and 1322, and it is possible to make a combination of two kinds of materials or more. For example, the helical capacitor can be sealed by a resin and further covered by a metal avoiding the areas around the lead terminals 1311, 1312, 1321, and 1322 on the resin outer surface. Or, it is also possible to use a resin only for the areas around the lead terminals 1311, 1312, 1321, and 1322, and to use a metal or an electrically conductive material for other areas.

A Sixteenth Embodiment

Figure 49:
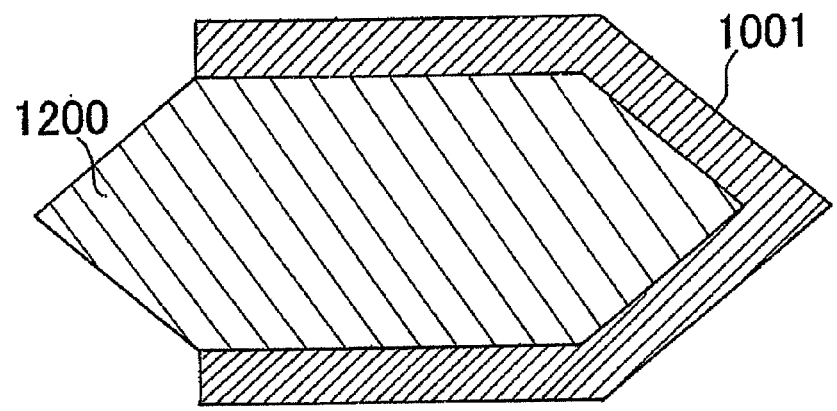
FIG. 49 is a cross-sectional view showing a helical capacitor of a sixteenth embodiment of the present invention.

FIG. 49 is a cross-sectional view showing a helical capacitor of a sixteenth embodiment of the present invention. FIG.

49 is a cross-sectional view of a part corresponding to the part taken along the line C-C of FIG. 40.

In this embodiment, the cross-sectional shape of the internal support body 1200 is formed to a flattened hexagonal, and the helical capacitor 8000 is manufactured according to the procedure of the above mentioned ninth embodiment. The cross-sectional shape is not necessarily a hexagonal shape, but can be any polygonal shape. When employing such a structure, there are merits that the helical capacitor 8000 becomes steady, hard to roll, and easy to mount.

A Seventeenth Embodiment

Figure 50:
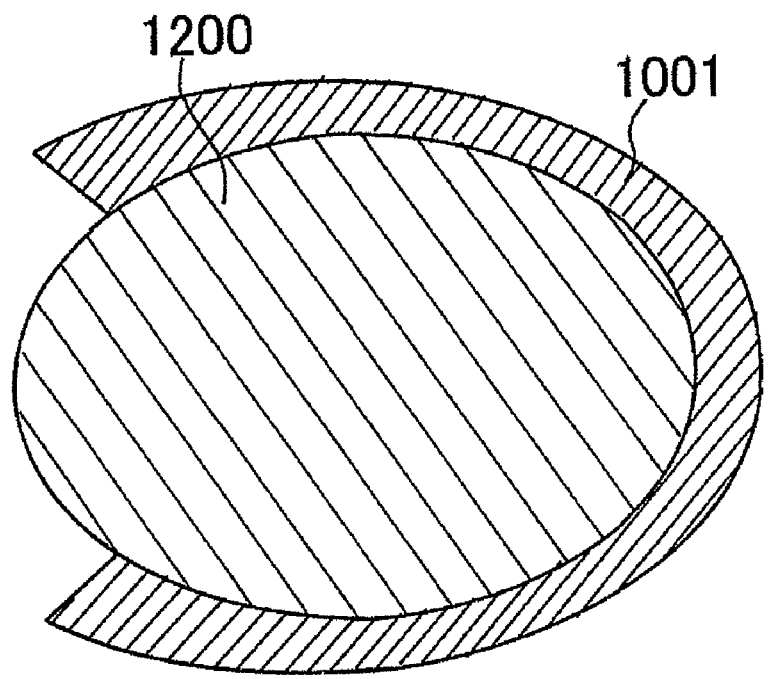
FIG. 50 is a cross-sectional view showing a helical capacitor of a seventeenth embodiment of the present invention.

FIG. 50 is a cross-sectional view showing a helical capacitor of a seventeenth embodiment of the present invention. FIG. 50 is a cross-sectional view of a part corresponding to the part taken along the line C-C of FIG. 40. In this embodiment, the cross-sectional shape of the internal support body 1200 is formed to an ellipse, and the helical capacitor 8000 is manufactured according to the procedure of the above mentioned ninth embodiment. The cross-sectional shape is not necessarily an ellipse, but can be a perfect circle. When employing such a structure, there is a merit that a bending-stress to the belt shape capacitor line 1001 is reduced.

An Eighteenth Embodiment

Figure 55:
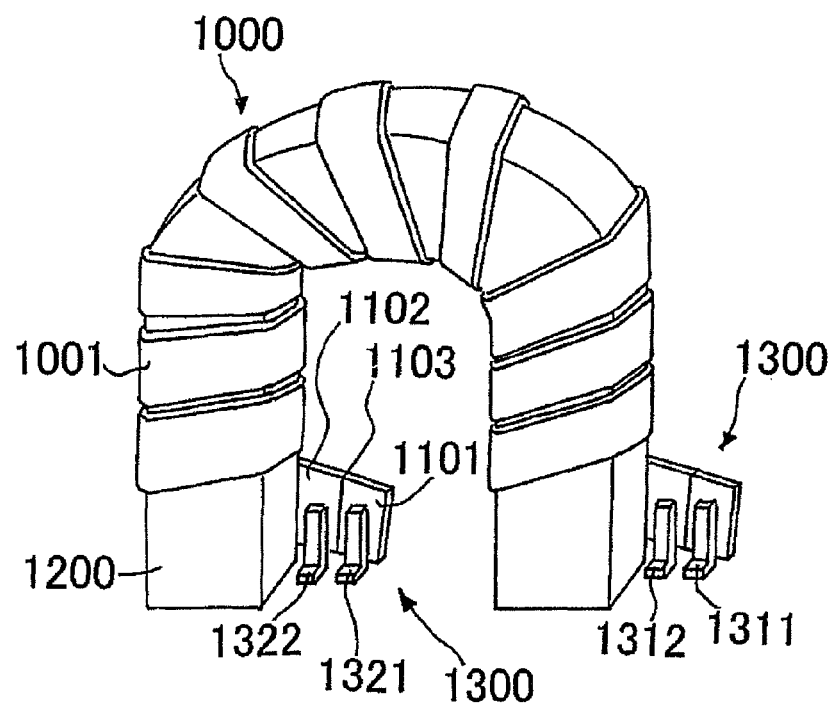
FIG. 55 is a perspective view showing a helical capacitor of an eighteenth embodiment of the present invention.

In the embodiments described above, the internal support body has a column shape (bar shape). However, the internal support body does not necessarily have a column shape, but can have other shapes. FIG. 55 is a perspective view showing a helical capacitor of the eighteenth embodiment of the present invention. In this embodiment, the internal support body 1200 is U-shaped, and the belt shape capacitor line 1001 is wrapped around the U-shaped internal support body 1200.

When the internal support body is formed to be U-shaped, it is possible to mount the helical capacitor vertically on a substrate such as a printed circuit board, not mounting it parallel to the substrate. Therefore, it is possible to further increase the packaging density.

In the embodiments described above, the internal support body does not necessarily have a column shape, but can have a tube shape. Furthermore, the internal support body can have a ring shape and a horseshoe shape, other than a column shape and a U-shape. When the internal support body is formed to a ring shape or a horseshoe shape, in the same way as the U-shape, it is possible to mount the helical capacitor vertically on a substrate such as a printed circuit board, not mounting it parallel to the substrate. Therefore, it is possible to further increase the packaging density. Furthermore, although the internal metal body is used as an internal electrical conductor, the internal electrical conductor has only to have an electrical conductivity, and a metal material does not necessarily have to be used.

The embodiments described above can be arbitrarily combined and used. For example, the etching processing of the internal metal body can be performed not only in the eleventh embodiment but also in any other embodiment.

Although representative embodiments of the present invention have been described above, the present invention can be performed in other various forms without departing from the spirit or main features defined by the claims of this application. Therefore, each embodiment described above is only an example, and should not be interpreted to a limited extent. The scope of the present invention is shown by the claims and not restricted by the description in DESCRIPTION and ABSTRACT. In addition, modifications and variations belonging to an equivalent scope of the claims are within the scope of the present invention.

INDUSTRIAL APPLICABILITY

The present invention is applicable to a capacitor which is applied to power source distribution lines and used for a power source decoupling which suppresses high-frequency electromagnetic waves (current, voltage) which are generated in an LSI, a digital electronic circuit, and an analog electronic circuit, and diffused via power source distribution lines. Specific examples of the utility are a high-frequency cutoff filer and a smoothing circuit in a DC power supply which has to cut off high-frequency noises, and a smoothing circuit and a power supply circuit where the direction of applied voltage is unknown or undetermined.

The invention claimed is:
1. A helical capacitor comprising:
a helical belt-shape internal electrical conductor,
a dielectric film covering the internal electrical conductor, and
an electrically conductive layer covering the dielectric film,
wherein the helical capacitor is helically wrapped around a support body,
an internal electrical conductor lead terminal is formed at each of both ends of the internal electrical conductor,
an electrically conductive layer lead terminal is formed at one end of the electrically conductive layer,
at least a surface of the support body is formed by an electrically conductive material,
the helical capacitor is helically wrapped so as to leave a space from the support body and
the surface of the support body and the other end of the electrically conductive layer re electrically coupled.
2. The helical capacitor according to claim 1, wherein a width of the internal electrical conductor is uniform.
3. The helical capacitor according to claim 1, wherein an internal electrical conductor lead terminal is formed at each of both ends of the internal electrical conductor, and an electrically conductive layer lead terminal is formed at each of both ends of the electrically conductive layer.
4. The helical capacitor according to claim 1, wherein the internal electrical conductor is made of a metal having a valve action.
5. The helical capacitor according to claim 4, wherein a surface of the internal electrical conductor has concavities and convexities by etching.
6. The helical capacitor according to claim 1, wherein the internal electrical conductor is made of a metal material, and the dielectric film is a metal oxide film.
7. The helical capacitor according to claim 1, wherein a cross-sectional shape of the support body is a circle or an ellipse.
8. The helical capacitor according to claim 1, wherein a cross-sectional shape of the support body is a polygon.
9. The helical capacitor according to claims 1, wherein at least a part of the support body is made of a high magnetic permeability material.
10. The helical capacitor according to claims 1, wherein the support body has a tube shape.
11. The helical capacitor according to claim 1, wherein the electrically conductive layer comprises a plurality of electrically conductive material layers.
12. The helical capacitor according to claim 1, wherein a part of the electrically conductive layer is made of an electri- cally conductive polymer, the part of the electrically conductive layer contacting the dielectric film.

13. A helical capacitor comprising at least two helical capacitors according to claim 1, wherein a first helical capacitor is wrapped around a second helical capacitor via a spacer, as the first helical capacitor covers the second helical capacitor.

14. The helical capacitor according to of claim 1, wherein the helical capacitor is accommodated in a case and end parts of the internal electrical conductor lead terminals and electrically conductive layer lead terminals are exposed from the case.

15. The helical capacitor according to claim 14, wherein the helical capacitor is resin-molded in the case.

16. A helical capacitor comprising:
a helical belt-shape internal electrical conductor;
a dielectric film covering the internal electrical conductor, and
an electrically conductive layer covering the dielectric film,
wherein a first helical capacitor is wrapped around a second helical capacitor via a spacer, as the first helical capacitor covers the second helical capacitor.

17. The helical capacitor according to claim 16, wherein the helical capacitor is helically wrapped around a support body.

18. The helical capacitor according to claim 17, wherein a cross-sectional shape of the support body is a circle or an ellipse.

19. The helical capacitor according to claim 17, wherein a cross-sectional shape of the support body is a polygon.

20. The helical capacitor according to claim 17, wherein at least the surface of the support body is made of an electrically conductive material.

21. The helical capacitor according to claim 17, wherein at least the surface of the support body is made of an insulating material.

22. The helical capacitor according to claim 17, wherein at least a part of the support body is made of a high magnetic permeability material.

23. The helical capacitor according to claim 17, wherein the support body has a tube shape.

24. The helical capacitor according to claim 16, wherein a width of the internal electrical conductor is uniform.

25. The helical capacitor according to claim 16, wherein an internal electrical conductor lead terminal is formed at each of both ends of the internal electrical conductor, and an electrically conductive layer lead terminal is formed at each of both ends of the electrically conductive layer.

26. The helical capacitor according to claim 16, wherein the internal electrical conductor is made of a metal having a valve action.

27. The helical capacitor according to claim 26, wherein a surface of the internal electrical conductor has concavities and convexities by etching.

28. The helical capacitor according to claim 16, wherein the internal electrical conductor is made of a metal material, and the dielectric film is a metal oxide film.

29. The helical capacitor according to claim 16, wherein the electrically conductive layer comprises a plurality of electrically conductive material layers.

30. The helical capacitor according to claim 16, wherein a part of the electrically conductive layer is made of an electrically conductive polymer, the part of the electrically conductive layer contacting the dielectric film.

31. The helical capacitor according to claim 16, wherein the helical capacitor is accommodated in a case and end parts of the internal electrical conductor lead terminals and electrically conductive layer lead terminals are exposed from the case.

32. The helical capacitor according to claim 31, wherein the helical capacitor is resin-molded in the case.

* * * * *